(12) United States Patent
Akiyama et al.

(10) Patent No.: US 6,650,752 B2
(45) Date of Patent: *Nov. 18, 2003

(54) BROADCAST RECEPTION DEVICE AND CONTRACT MANAGEMENT DEVICE USING COMMON MASTER KEY IN CONDITIONAL ACCESS BROADCAST SYSTEM

(75) Inventors: Koichiro Akiyama, Kanagawa (JP); Toru Kambayashi, Kanagawa (JP); Shuichi Tsujimoto, Kanagawa (JP); Naoki Endoh, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/206,763

(22) Filed: Jul. 29, 2002

(65) Prior Publication Data

US 2003/0002679 A1 Jan. 2, 2003

Related U.S. Application Data

(62) Division of application No. 09/219,889, filed on Dec. 24, 1998, now Pat. No. 6,463,155.

(30) Foreign Application Priority Data

Dec. 26, 1997 (JP) .............................. 9-366812
Aug. 12, 1998 (JP) ............................ 10-228287

(51) Int. Cl.[7] ............................. H04M 7/167
(52) U.S. Cl. ..................................... 380/228
(58) Field of Search ............................... 380/278, 277, 380/279, 281, 211; 713/162, 163, 171

(56) References Cited

U.S. PATENT DOCUMENTS 4,613,901 A * 9/1986 Gilhousen et al. .......... 380/239
6,041,408 A * 3/2000 Nishioka et al. ............ 713/171
6,073,235 A * 6/2000 Foladare et al. ............ 713/163

* cited by examiner

*Primary Examiner*—Matthew Smithers
(74) *Attorney, Agent, or Firm*—Oblon, Spivak, McClelland, Maier & Neustadt, P.C.

(57) ABSTRACT

A conditional access broadcast system for realizing conditional access while maintaining the safety level is disclosed. A contract management device at a broadcast station side delivers a reception contract information containing at least a contract information for controlling decryption of encrypted contents information delivered from a broadcast station by broadcast and a reception device ID in correspondence, which is encrypted using a master key which is commonly provided with respect to all the broadcast reception devices. At each broadcast reception device, whether or not to give a channel key for decrypting the encrypted contents information to the decryption unit is controlled according to the contract information for own broadcast reception device which is acquired from the encrypted reception contract information.

23 Claims, 56 Drawing Sheets

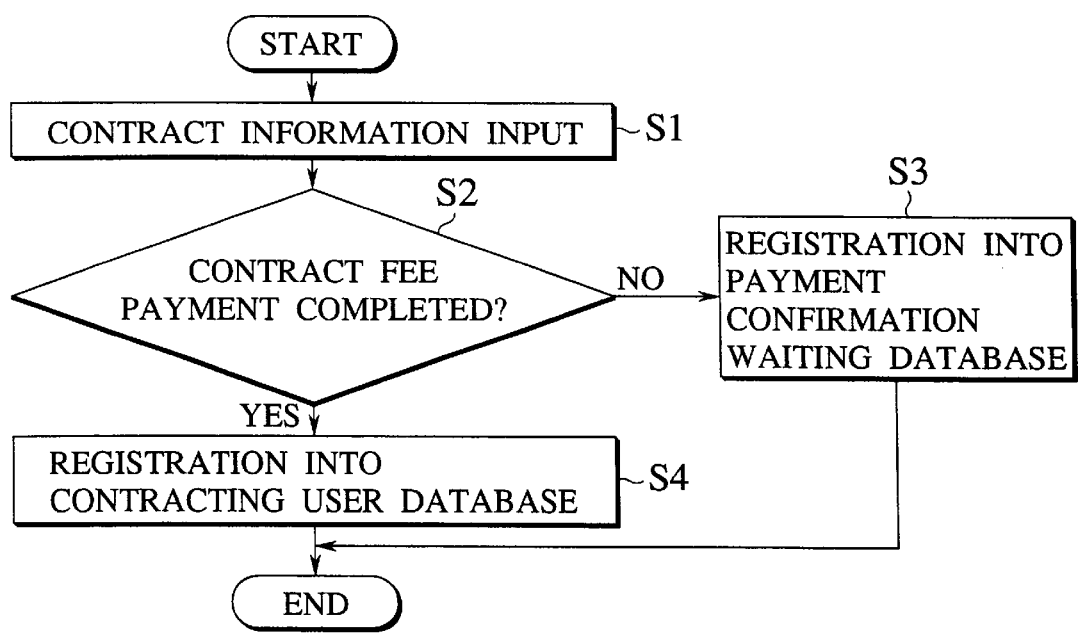

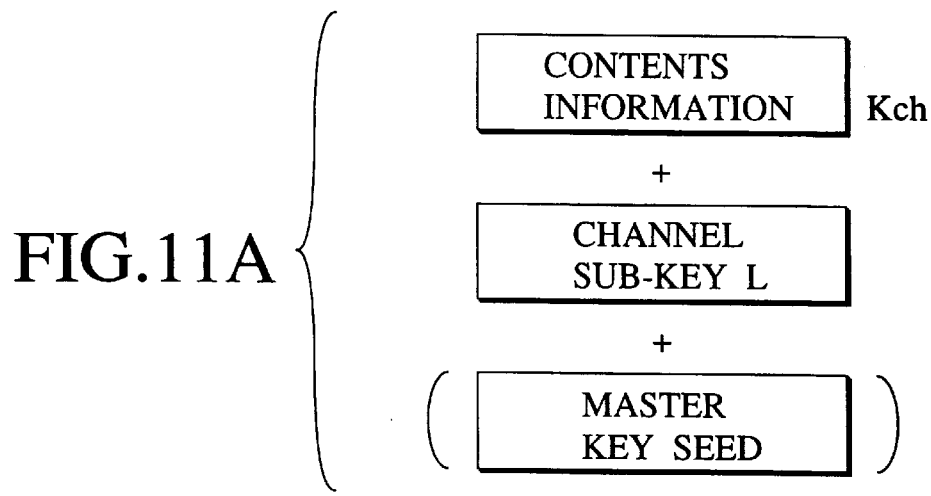
FIG.11A
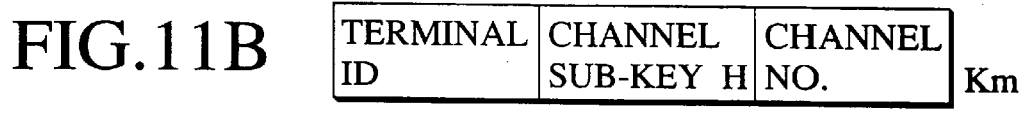
FIG.11B
FIG.12
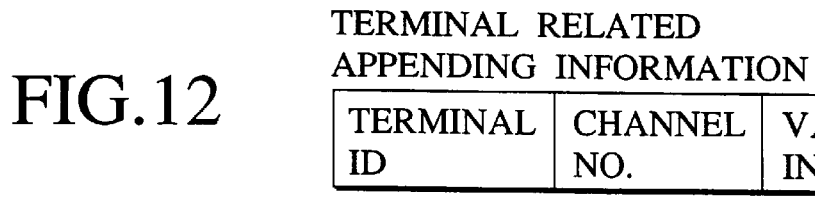
FIG.13
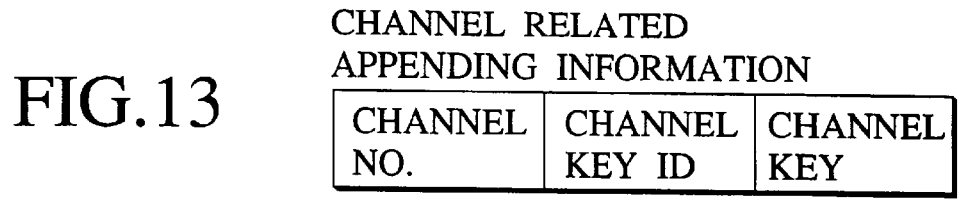

| TERMINAL ID | a b c |
|---|---|
| CHANNEL NO. | X  Y |
| CHANNEL SUB-KEY | $H_{x1}$  $H_{y1}$ |

Km2

| TERMINAL ID | a b c |
|---|---|
| CHANNEL NO. | X  Y |
| CHANNEL SUB-KEY | $H_{x2}$  $H_{y2}$ |

Km3

| TERMINAL ID | a b c |
|---|---|
| CHANNEL NO. | X  Y |
| CHANNEL SUB-KEY | $H_{x3}$  $H_{y3}$ |

| TERMINAL ID | a b c | | |
|---|---|---|---|
| CHANNEL NO. | X | | Y |
| CHANNEL SUB-KEY ID | $ID_{x1}$ | $ID_{x2}$ | $ID_{y1}$  $ID_{y2}$ |
| CHANNEL SUB-KEY | $H_{x1}$ | $H_{x2}$ | $H_{y1}$  $H_{y2}$ |

Km2

| TERMINAL ID | a b c |
|---|---|
| CHANNEL NO. | X  Y |
| CHANNEL SUB-KEY ID | $ID_{x3}$  $ID_{y3}$ |
| CHANNEL SUB-KEY | $H_{x3}$  $H_{y3}$ |

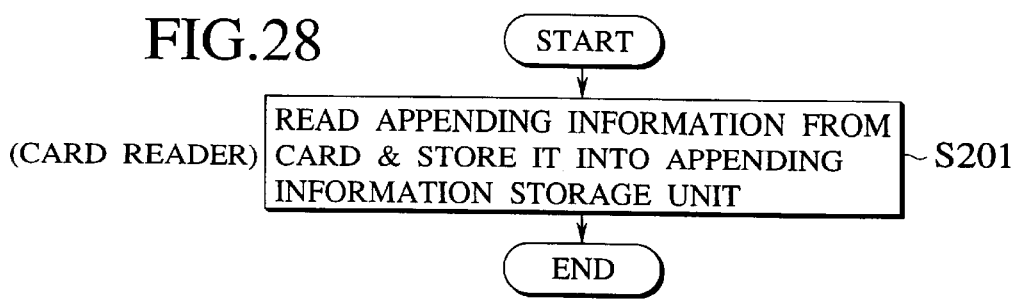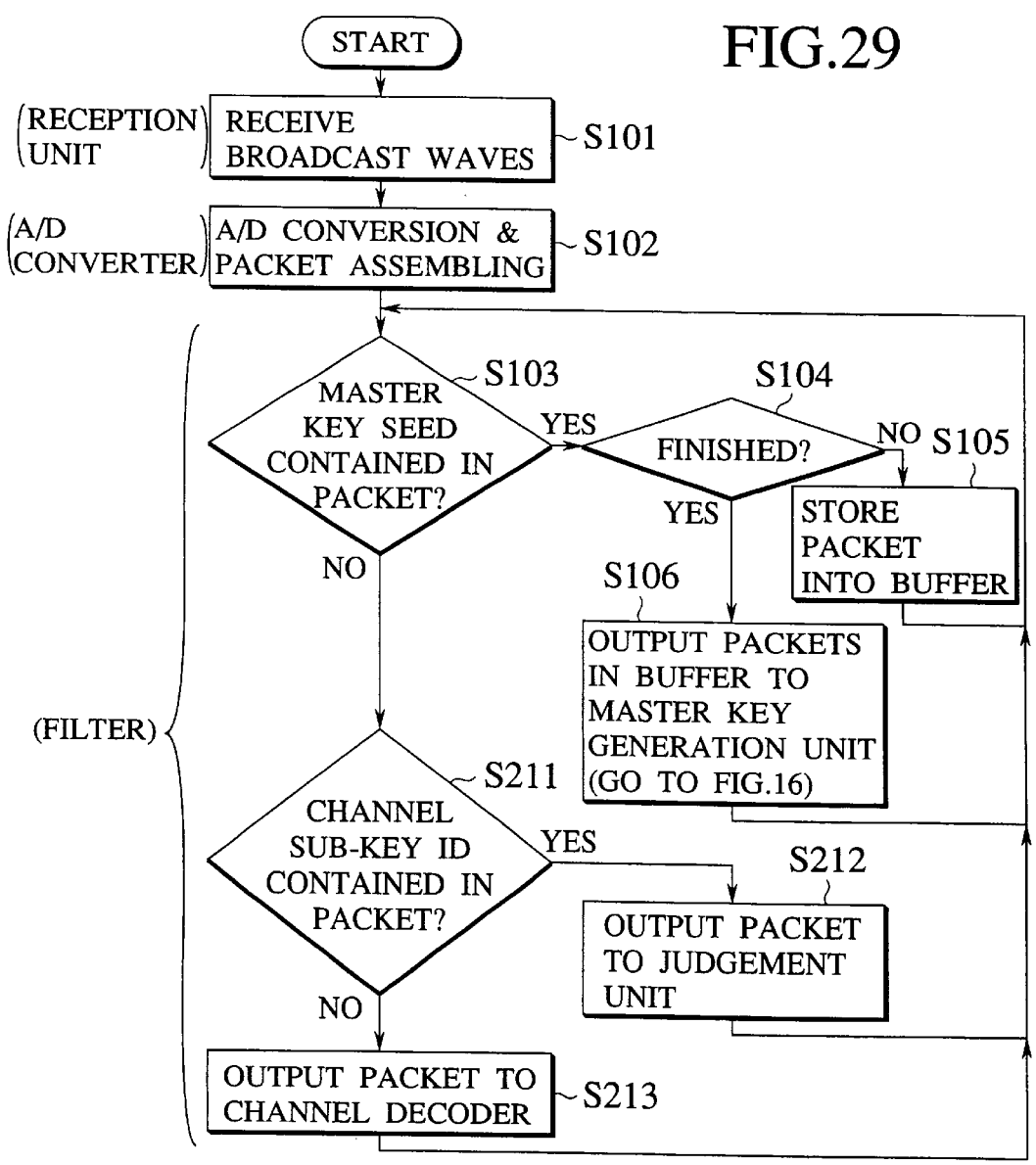

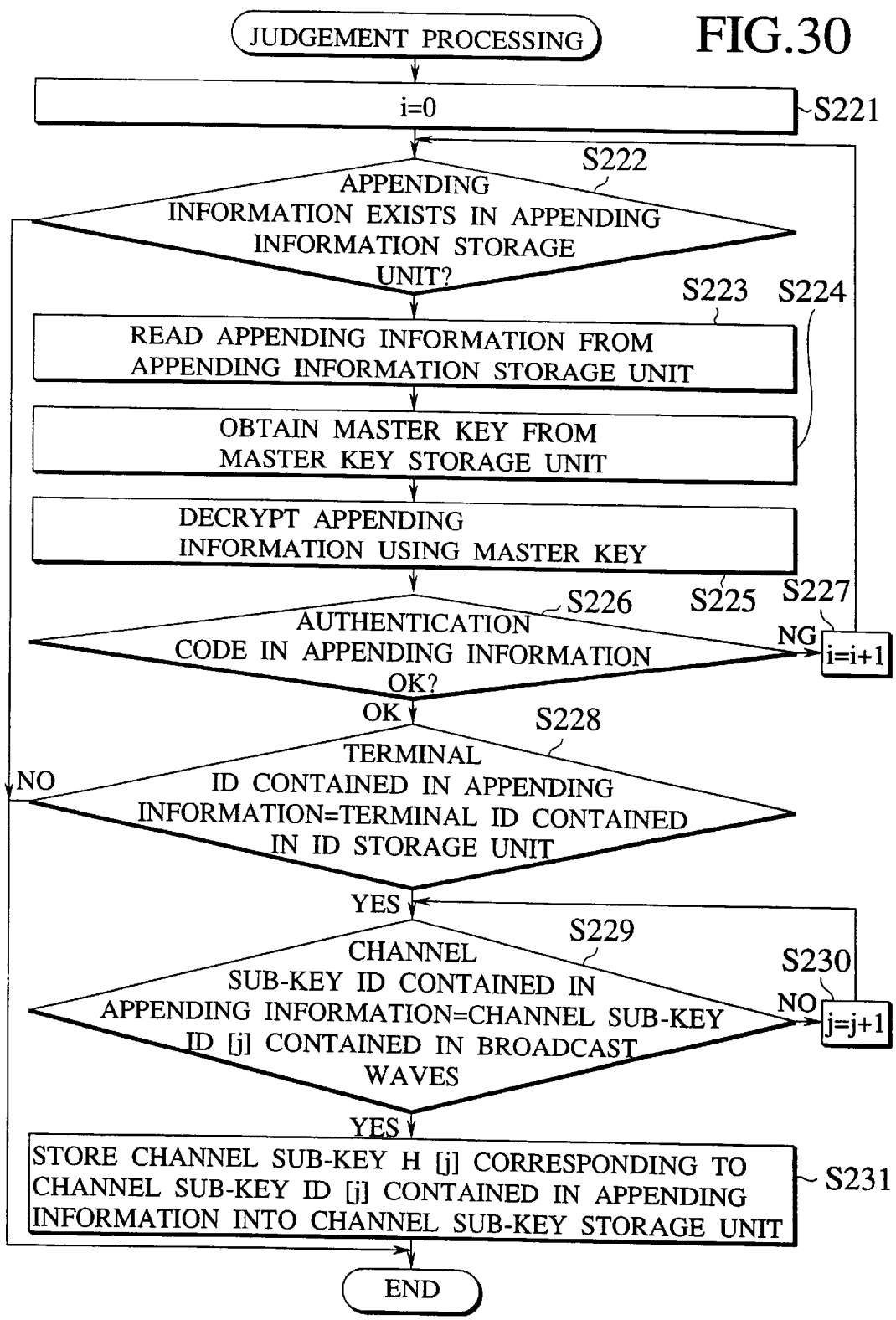

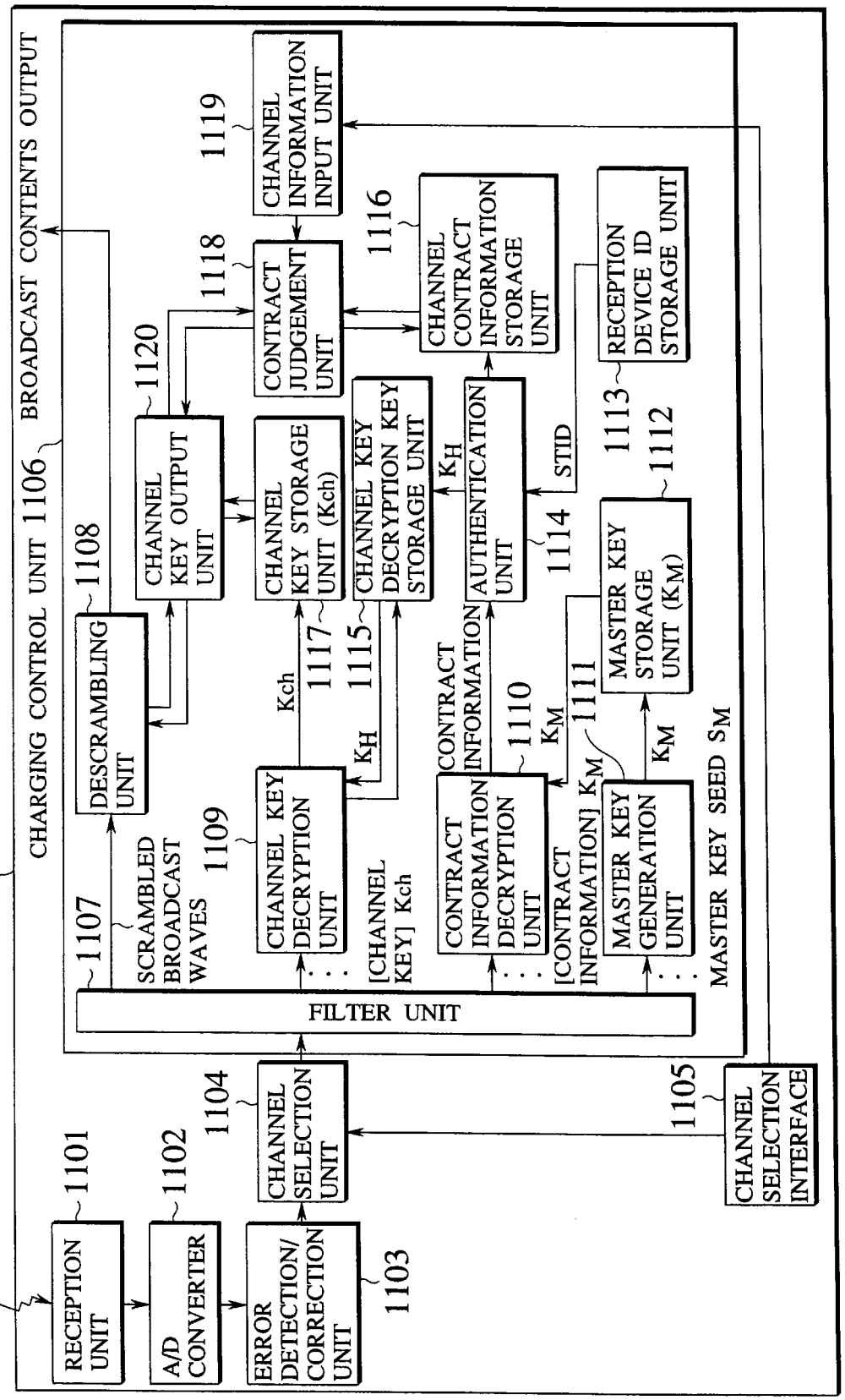

FIG.37
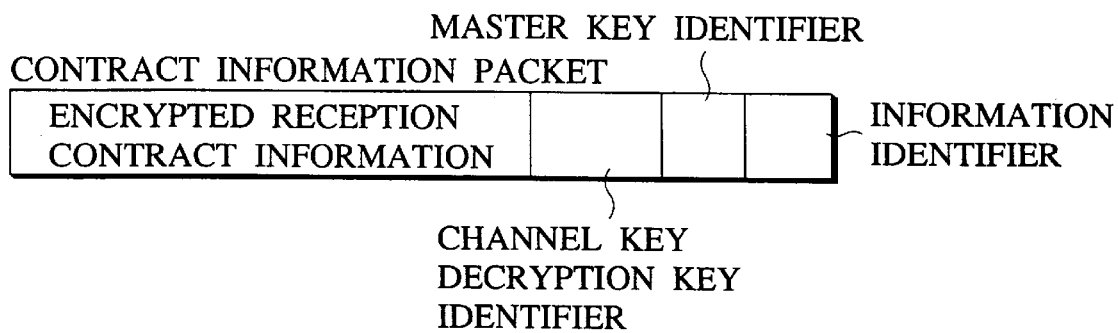
FIG.38
RECEPTION CONTRACT INFORMATION
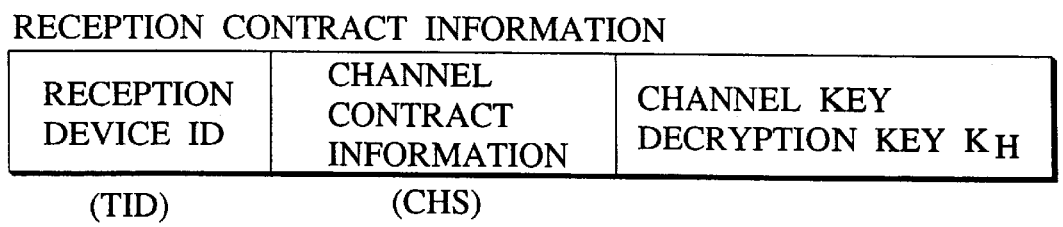
FIG.39
MASTER KEY SEED INFORMATION
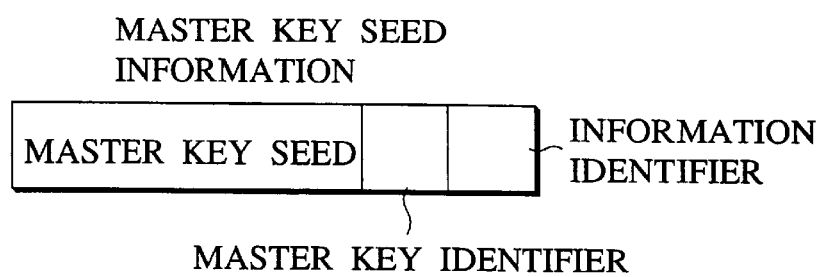
FIG.41
| CHANNEL KEY | 0 |
|---|---|
| CHANNEL KEY | 1 |

TID : RECEPTION DEVICE ID
CHS : CHANNEL CONTRACT INFORMATION

FIG.55

RECEPTION CONTRACT INFORMATION

| RECEPTION DEVICE ID | CHANNEL CONTRACT INFORMATION | CHANNEL KEY |
|---|---|---|

FIG.56

CONTRACT INFORMATION PACKET

| ENCRYPTED RECEPTION CONTRACT INFORMATION |
|---|

FIG.57

MASTER KEY IDENTIFIER

| INFORMATION IDENTIFIER |
|---|

FIG.58

RECEPTION CONTRACT INFORMATION

| RECEPTION DEVICE ID | CHANNEL CONTRACT INFORMATION | CHANNEL KEY | CHANNEL KEY IDENTIFIER | CHANNEL IDENTIFIER |
|---|---|---|---|---|

RECEPTION CONTRACT INFORMATION

| RECEPTION DEVICE ID | CHANNEL CONTRACT INFORMATION | CHANNEL KEY-0 | CHANNEL KEY-1 | CHANNEL IDENTIFIER |
|---|---|---|---|---|

FIG.59

| | CHANNEL KEY IDENTIFIER | CHANNEL NUMBER IDENTIFIER |
|---|---|---|
| CHANNEL KEY | 0 | 1 |
| CHANNEL KEY | 1 | |
| CHANNEL KEY | 0 | 2 |
| CHANNEL KEY | 1 | |
| CHANNEL KEY | 0 | 3 |
| CHANNEL KEY | 1 | |
| ⋮ | | |
| CHANNEL KEY | 0 | 29 |
| CHANNEL KEY | 1 | |
| CHANNEL KEY | 0 | 30 |
| CHANNEL KEY | 1 | |

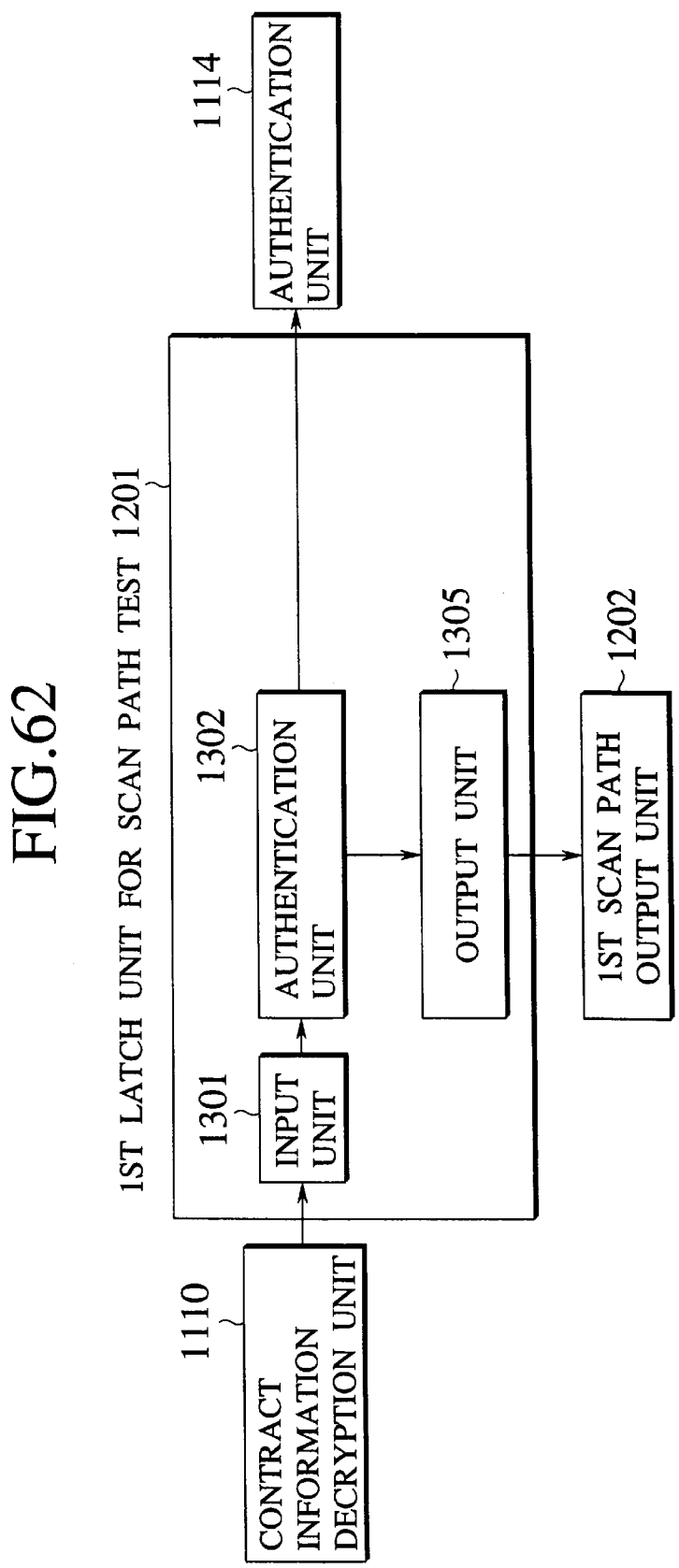

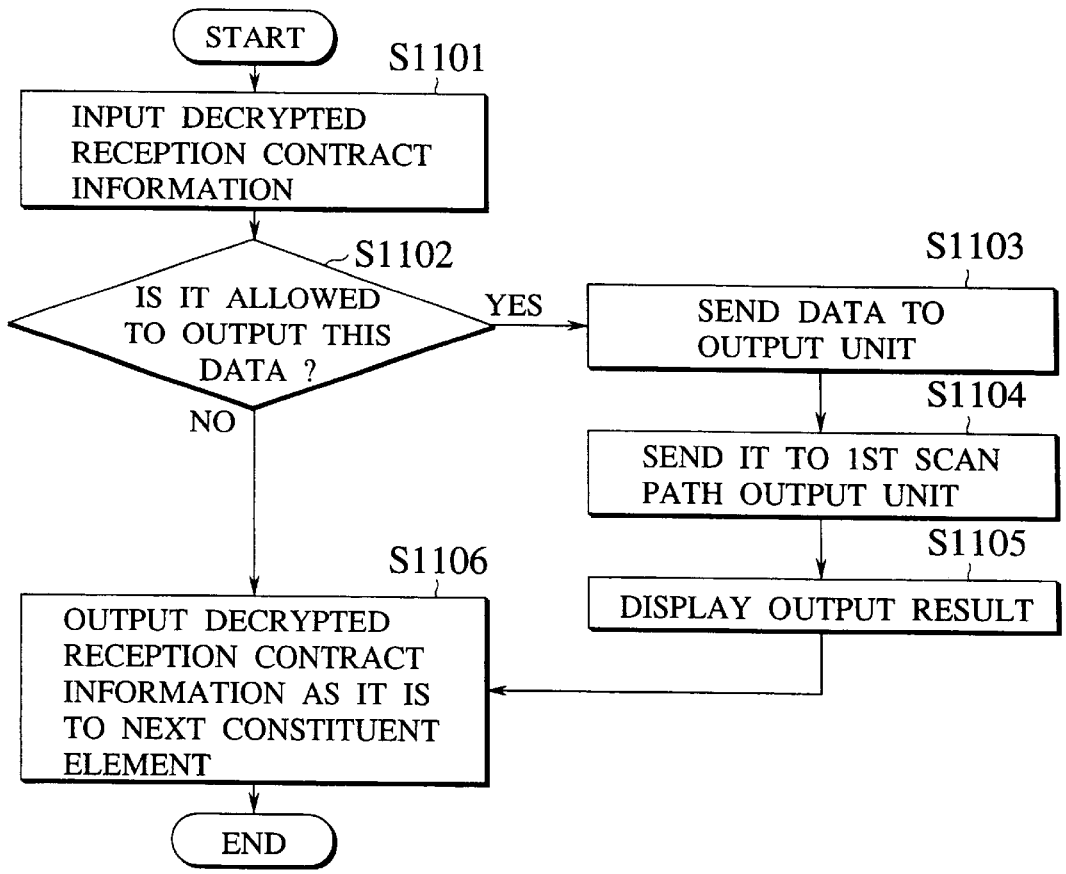

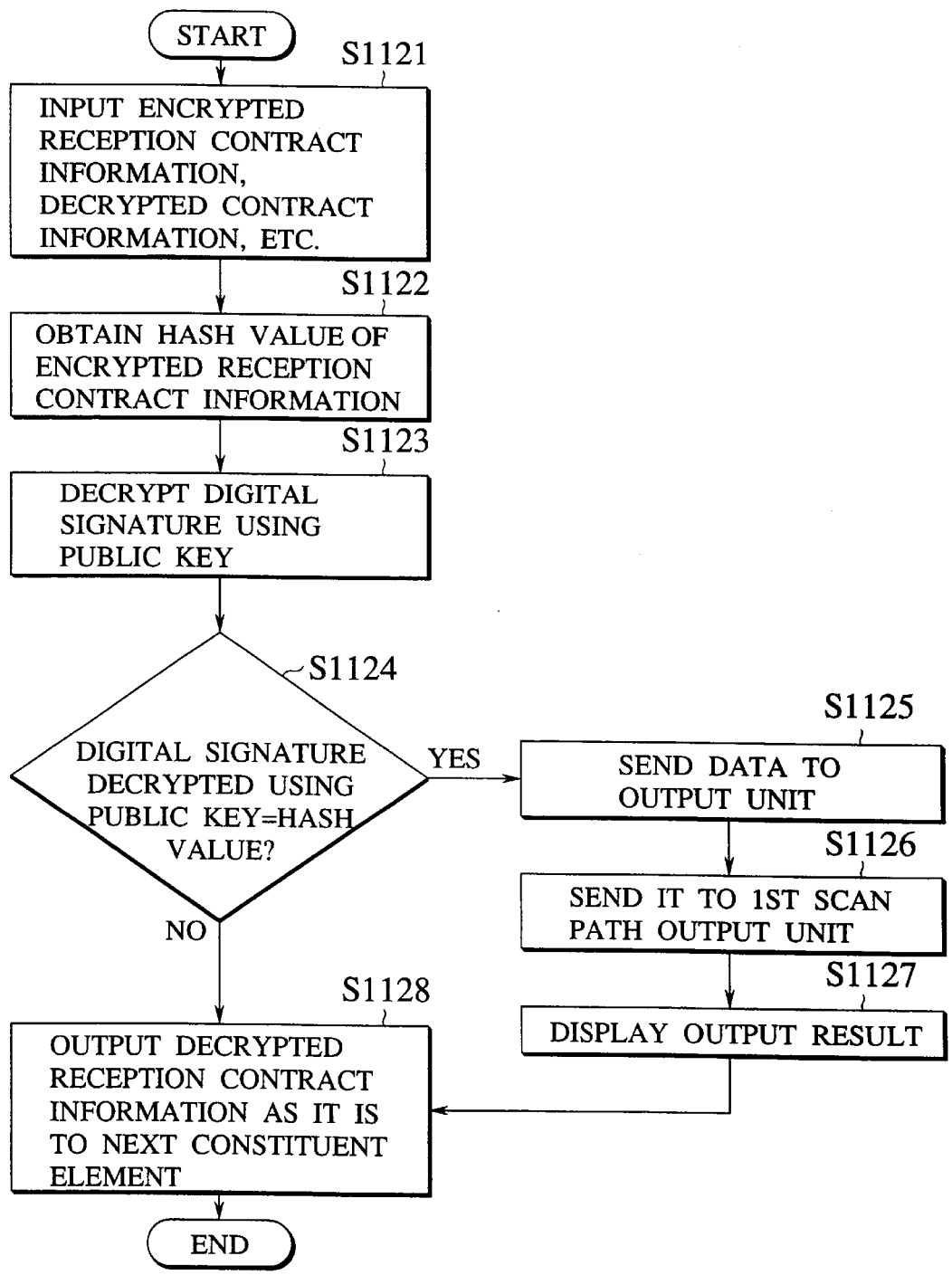

RECEPTION CONTRACT INFORMATION

| RECEPTION TERMINAL ID | CHANNEL CONTRACT INFORMATION | CHANNEL KEY DECRYPTION KEY | DIGITAL SIGNATURE |
|---|---|---|---|

FIG.74

RECEPTION CONTRACT INFORMATION

| RECEPTION TERMINAL ID | CHANNEL CONTRACT INFORMATION | CHANNEL KEY DECRYPTION KEY |
|---|---|---|

FIG.75

RECEPTION CONTRACT INFORMATION

| RECEPTION TERMINAL ID | CHANNEL CONTRACT INFORMATION | CHANNEL KEY DECRYPTION KEY | AUTHENTICATOR |
|---|---|---|---|

FIG.76

RECEPTION CONTRACT INFORMATION

| RECEPTION TERMINAL ID | CHANNEL CONTRACT INFORMATION | CHANNEL KEY DECRYPTION KEY | AUTHENTICATOR | DIGITAL SIGNATURE |
|---|---|---|---|---|

FIG.79

CHANNEL IDENTIFIER | CHANNEL KEY-0 | CHANNEL KEY-1 | TID | CHS | ... | TID | CHS | TID | CHS | ... | TID | CHS | AUTHENTICATOR | DIGITAL SIGNATURE

FIG.80

CHANNEL IDENTIFIER | CHANNEL KEY-0 | CHANNEL KEY-1 | TID | TID | ... | TID | TID | CHS | TID | TID | ... | TID | TID | AUTHENTICATOR | DIGITAL SIGNATURE

BROADCAST RECEPTION DEVICE AND CONTRACT MANAGEMENT DEVICE USING COMMON MASTER KEY IN CONDITIONAL ACCESS BROADCAST SYSTEM The present application is a divisional of U.S. application Ser. No. 09/219,889 filed Dec. 24, 1998, now U.S. Pat. No. 6,463,155, the entire contents of which are incorporated herein by reference.

BACKGROUND OF THE INVENTION

1. Field of the Invention

The present invention relates to a contract management device for use in the charged broadcast service in which broadcast delivered contents are to be decrypted according to contract terms (period, viewable or listenable channels), and a broadcast reception device in which contents decryption is controlled by the contract management device.

2. Description of the Background Art

There are increasing demands for the enhancement of services by the digital broadcasting as the digitalization progresses from the communication satellite (CS) to the cable TV and the terrestrial broadcasting, and it is expected that the digital broadcasting will play the leading role in the future broadcast services.

The most significant feature of the digital broadcasting is that, due to the introduction of the data compression technique, the utilization efficiency of frequencies required in broadcasting programs can be improved and the number of broadcast channels can be increased considerably compared with the analog broadcasting. In addition, as it is possible to apply the highly sophisticated error correction technique, it is possible to provide uniform services in high quality.

By the digitalization of the broadcasting, it becomes possible to provide multimedia services using a variety of information forms (video, audio, text, data, etc.), and many systems for providing such services have been appearing recently.

In such a system, in the case of providing a charged broadcast service in which scrambled contents are to be descrambled or encrypted contents are to be decrypted according to the contract period, there is a need to be able to carry out the customer management in accordance with contract periods. Here, the customer management in accordance with contract periods implies an ability to make programs of contracted channels viewable or listenable only within the contract period for which the required fee has been paid, for example.

In addition, there is a need to provide the key information, which is necessary in decrypting encrypted contents or descrambling scrambled contents at the reception device, only to the proper viewers or listeners (according to the contracted channels and the contract period) and without failure, from a viewpoint of preventing the improper viewing or listening.

In this regard, conventionally, a unique master key is provided for each broadcast reception device separately, and only work keys of the contracted channels are sent to each viewer or listener with a reception contract by encrypting them using the corresponding master key. Here, the work key is a key uniquely defined for each channel, which can decrypt a channel key of that channel that is broadcasted in an encrypted form. The channel key is used in descrambling scrambled broadcast contents.

In addition, this work key is to be set up for each contract period (usually one month), and sent from the broadcast station whenever the contract is renewed, so that there is a need to sent necessary and sufficient amount of work keys to respective contractors at each contract period. This scheme has an advantage in that the contract period can be faithfully obeyed by updating the work key. However, as long as this scheme is adopted, it is necessary to broadcast the work keys to all the contractors every month, which is becoming a severe requirement in view of the required amount of transmission because of the increasing number of contractors and channels for the CS broadcasting. In particular, this requirement is very hard to satisfy in the broadcasting service with respect to mobile reception devices which is expected to be associated with a poor reception state, a short reception time and a narrow bandwidth.

SUMMARY OF THE INVENTION

It is therefore an object of the present invention to provide a conditional access broadcast system using a broadcast reception device and a contract management device which is capable of realizing conditional access while maintaining the safety level even when the broadcast bandwidth available to transmission of information related to the conditional access is narrow or when the number of contractors increased beyond the expectation.

According to one aspect of the present invention there is provided a broadcast reception device, comprising: a memory for storing a master key commonly provided with respect to a plurality of broadcast reception devices and one reception device ID uniquely assigned to said broadcast reception device; a reception unit for receiving encrypted contents information delivered from a broadcast station by broadcast; a decryption unit for decrypting encrypted reception contract information using the master key and the encrypted contents information using a channel key, the encrypted reception contract information being received from the broadcast station and containing at least a contract information for controlling decryption of the encrypted contents information and a reception device ID in correspondence; and a control unit for selectively acquiring one contract information corresponding to a reception device ID that coincides with said one reception device ID, from the encrypted reception contract information decrypted by the decryption unit, and controlling whether or not to give the channel key to the decryption unit according to said one contract information.

According to another aspect of the present invention there is provided a contract management device, comprising: a management unit for managing contract information for controlling decryption of encrypted contents information delivered from a broadcast station by broadcast, with respect to a plurality of broadcast reception devices each of which decrypts the encrypted contents information according to the contract information; and a delivery unit for delivering to said plurality of broadcast reception devices a reception contract information containing at least the contract information and a reception device ID in correspondence, the reception device ID being uniquely assigned to each broadcast reception device, by encrypting the reception contract information using a master key which is commonly provided with respect to said plurality of broadcast reception devices.

Other features and advantages of the present invention will become apparent from the following description taken in conjunction with the accompanying drawings.

BRIEF DESCRIPTION OF THE DRAWINGS

FIG. 4 is a diagram showing an exemplary data format for a contracting user database in the contract management device of FIG. 3.

FIG. 5 is a diagram showing an exemplary data format for a seed database in the contract management device of FIG. 3.

FIG. 6 is a diagram showing an exemplary data format for a channel key database in the contract management device of FIG. 3.

FIG. 7 is a flow chart of a processing for registration into a contracting user database in the contract management device of FIG. 3.

FIG. 11A is a diagram conceptually showing another exemplary information to be multiplexed to broadcast waves for mainly delivering contents that can be used in the broadcast system of FIG. 1.

FIG. 11B is a diagram showing another exemplary data format of an appending information that can be used in the broadcast system of FIG. 1.

FIG. 12 is a diagram showing an exemplary data format of a terminal related appending information that can be used in the broadcast system of FIG. 1.

FIG. 13 is a diagram showing an exemplary data format of a channel related appending information that can be used in the broadcast system of FIG. 1.

FIGS. 27A and 27B are diagrams showing exemplary forms of appending information to be recorded in a card shaped recording medium for two different cases in the broadcast system of FIG. 24.

FIG. 28 is a flow chart of a processing in a card reader of the broadcast reception device of FIG. 26.

FIG. 29 is a flow chart of a processing in the broadcast reception device of FIG. 26.

FIG. 30 is a flow chart of a judgement processing in the broadcast reception device of FIG. 26.

FIG. 31 is a block diagram showing an exemplary configuration of a broadcast reception device according to the third embodiment of the present invention.

FIG. 37 is a diagram showing an exemplary structure of a contract information packet delivered by the contract information channel of FIG. 36.

FIG. 38 is a diagram showing an exemplary structure of a reception contract information contained in the contract information packet of FIG. 37.

FIG. 39 is a diagram showing an exemplary structure of a master key seed information delivered by the contract information channel of FIG. 36.

FIG. 41 is a diagram showing an exemplary format of channel keys and their identifiers in a channel key storage unit of the broadcast reception device of FIG. 31.

FIG. 55 is a diagram showing an exemplary structure of a reception contract information in the fourth embodiment of the present invention.

FIG. 56 is a diagram showing another exemplary structure of a contract information packet delivered by a contract information channel in the fourth embodiment of the present invention.

FIG. 57 is a diagram showing another exemplary structure of a reception contract information in the fourth embodiment of the present invention.

FIG. 58 is a diagram showing a still another exemplary structure of a reception contract information in the fourth embodiment of the present invention.

FIG. 59 is a diagram showing an exemplary form of channel keys, channel key identifiers and channel number identifiers in a channel key storage unit of the broadcast reception device of FIG. 51.

FIG. 62 is a block diagram showing an exemplary configuration of a first latch unit for scan path test in the broadcast reception device of FIG. 61.

FIG. 63 is a flow chart of a processing in the first latch unit for scan path test of FIG. 62.

FIG. 64 is a diagram showing an exemplary structure of a contract information packet containing an authentication information that can be used in the fifth embodiment of the present invention.

FIG. 65 is a flow chart of a processing in the first latch unit for scan path test of FIG. 62 in the case of using a digital signature as an authentication information.

FIG. 74 is a diagram showing a basic structure of a reception contract information that can be used in the third embodiment of the present invention.

FIG. 75 is a diagram showing an exemplary structure of a reception contract information containing an authenticator that can be used in the third embodiment of the present invention.

FIG. 76 is a diagram showing an exemplary structure of a reception contract information containing an authenticator and a digital signature that can be used in the third embodiment of the present invention.

FIG. 79 is a diagram showing an exemplary form of a reception contract information that can be used in the fourth embodiment of the present invention.

FIG. 80 is a diagram showing another exemplary form of a reception contract information that can be used in the fourth embodiment of the present invention.

DETAILED DESCRIPTION OF THE PREFERRED EMBODIMENTS

Referring now to FIG. 1 to FIG. 23, the first embodiment of a conditional access broadcast system according to the present invention will be described in detail.

Figure 1:
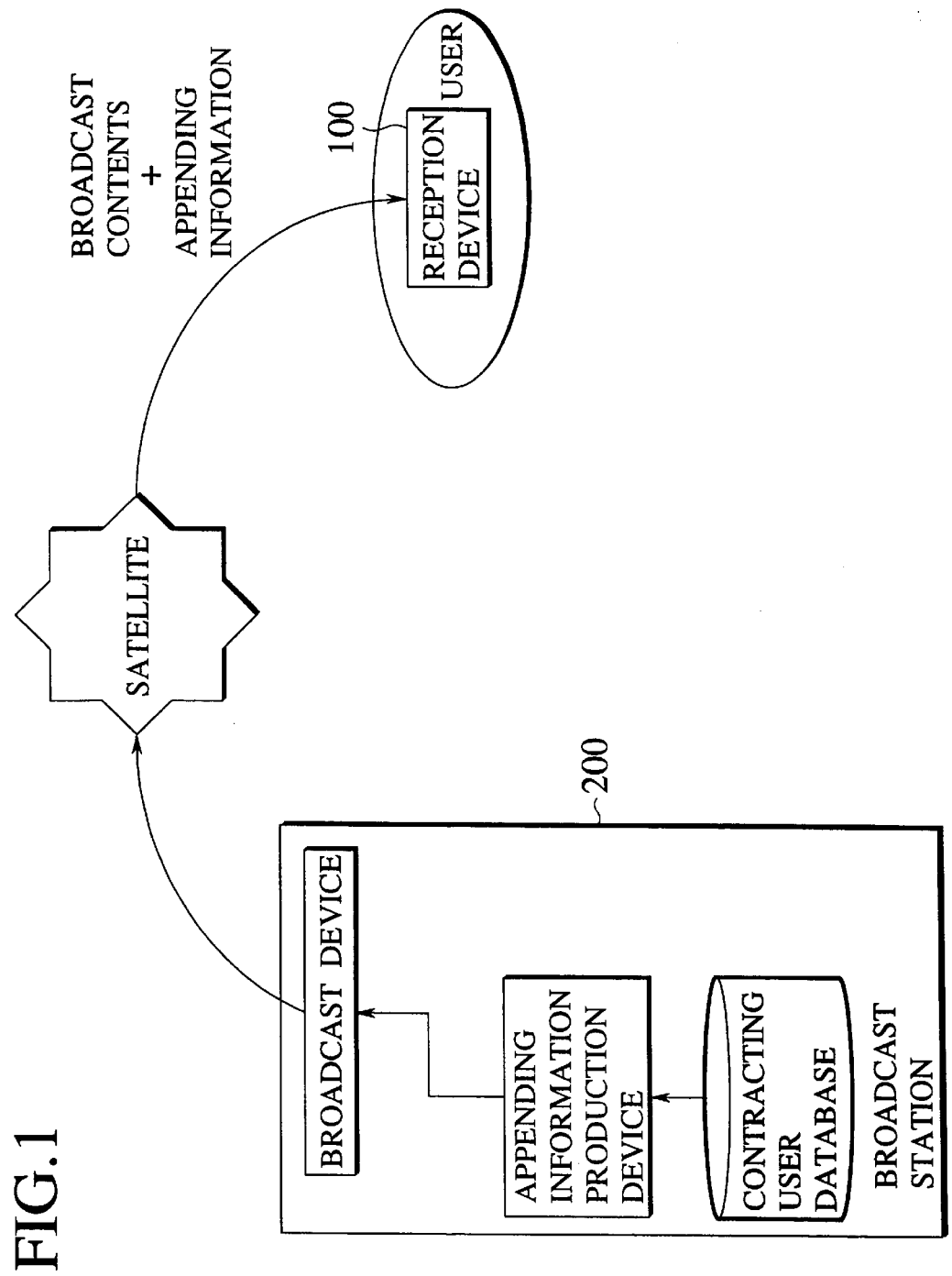
FIG. 1 is a schematic block diagram showing a broadcast system using a contract management device and a broadcast reception device according to the first embodiment of the present invention.

(1) Overview of the Broadcast System:

FIG. 1 shows a schematic configuration of the broadcast system using the contract management device and the broadcast reception device according to the present invention, for an exemplary form of service in which contents are to be provided to a reception device 100 of each user who has the reception contract, from a broadcast station 200 through a satellite. Note that the exemplary case of satellite broadcast will be described here, but the present invention is equally applicable to the form of service in which contents are to be provided by the terrestrial broadcast.

Figure 2:
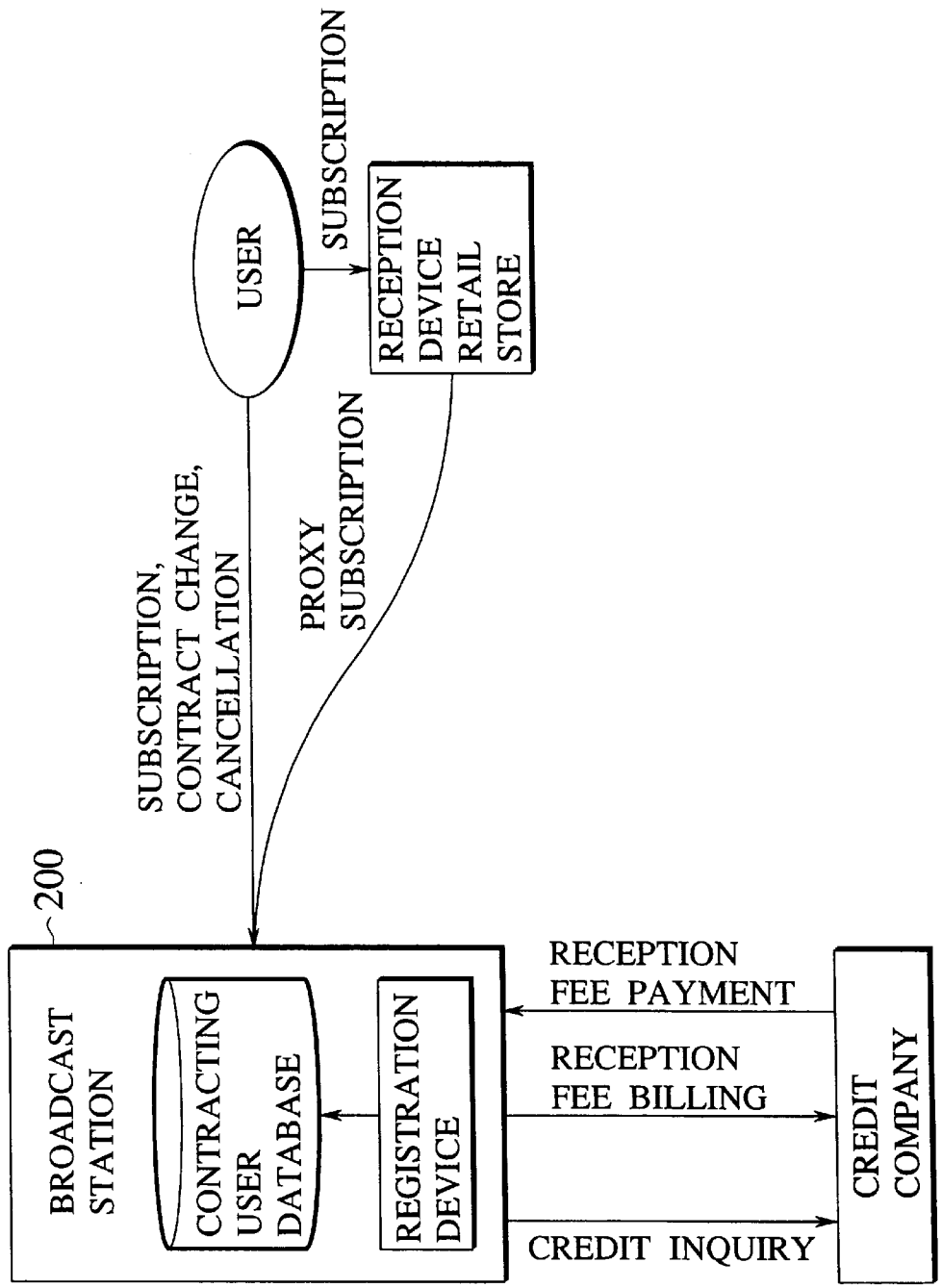
FIG. 2 is a diagram showing an outline of procedures for subscription, contract change, contract update, cancellation, and charging of a broadcast service provided in the broadcast system of FIG. 1.

FIG. 2 schematically shows a flow of procedures for contracting subscription or continuation to the broadcast service of FIG. 1, renewing contract, cancelling contract, and charging. As shown in FIG. 2, a user who wishes to subscribe to the broadcast service of FIG. 1 carries out a prescribed subscription order in accordance with contract terms such as desired viewable or listenable channels and viewable or listenable period, at a prescribed agency such as a reception device retail store which carries out the proxy subscription. When the contract terms are registered in a contracting user database on the broadcast station side through the agency, the service with respect to the user in accordance with the registered contract terms will be started. The fee to be paid by the user for this service may be paid by a credit card or through a bank, for example.

The service will be provided to the user basically according to the registered contract terms in the contracting user database on the broadcast station side so that at a time of continuation, renewal, or cancellation of the contract terms registered at a time of subscription it suffices to update or delete the registered contract terms in the contracting user database upon receiving a notice to that effect either directly from the user or through a prescribed agency. Here the broadcast station may start or continue the service with respect to the user upon confirming the payment of the subscription fee, the reception fee, etc.

(2) Contract Management Device:

(2-1)

Figure 3:
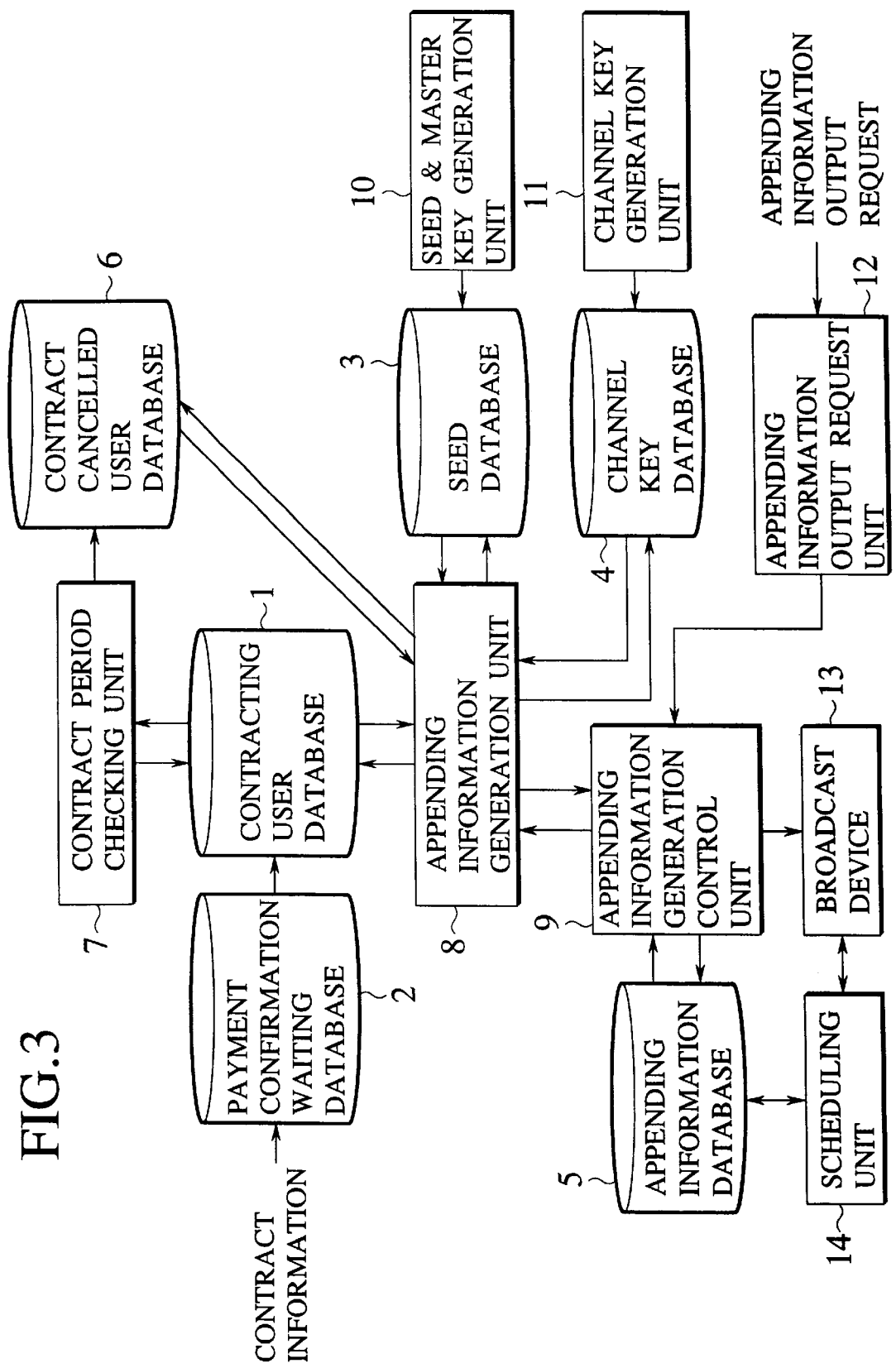
FIG. 3 is a block diagram showing an exemplary configuration of a contract management device according to the first embodiment of the present invention.

FIG. 3 shows an exemplary configuration of a contract management device according to this first embodiment, which is to be provided at the broadcast station 200 of FIG. 1.

The broadcast station 200 broadcasts contents information ([Contents]Kch) which is encrypted using a channel key Kch prescribed for each channel, and appending information ([Appending]Km) which is containing a terminal ID, a channel key Kch, etc., and encrypted using a master key Km.

The appending information is used in giving a reception permission only to a user who has a broadcast reception contract and paid the reception fee. The reception device provided at each user's home receives the encrypted appending information ([Appending]Km) and decrypts it using the master key Km provided in that reception device. Then the terminal ID contained therein is compared with the terminal ID assigned to that reception device, and if they coincide, the channel key Kch contained therein is stored into a database provided in that reception device and will be used in decrypting the encrypted contents information ([Contents]Kch).

The channel key Kch is changed regularly at a certain period (one month for example), and any subsequent appending information will not be sent to a user whose contract period has expired so that it becomes impossible for such a user to view or listen the broadcast contents as a corresponding channel key Kch cannot be obtained.

In addition, in order to improve the security level of this scheme, the master key Km is updated regularly at a certain period. This is done by using common random number generators that are provided at both the reception device and the broadcast device, and regularly transmitting an initial value (referred to as a seed hereafter) for causing the random number generator to generate a random number, to the reception device by the broadcast radio waves. In this way, even if the master key Km is revealed, this master key Km is valid only for a certain period so that it is possible to prevent the improper viewing or listening. Moreover, the information necessary in generating the decryption key is delivered rather than delivering the decryption key itself so that the security level is high.

Now, the contract management device of FIG. 3 functions to generate the appending information and to broadcast the generated appending information in an encrypted form using the master key Km.

First, a registration processing for a contracting user database 1 will be described with reference to FIG. 3 and FIG. 7. When the broadcast contract with a user who wishes to subscribe to the broadcast service of FIG. 1 is made, the contract information is entered into the contract management device of FIG. 3 (step S1), and stored in a payment confirmation waiting database 2 (steps S2 to S3). Those entries in the payment confirmation waiting database 2 for which the payment confirmation is made are sequentially sent to the contracting user database 1, and deleted from the payment confirmation waiting database 2 (steps S2 to S4).

The contracting user database 1 stores data in a format shown in FIG. 4, where a reception terminal ID indicates an information for identifying the reception terminal, channel numbers indicates channel numbers covered by the contract, and a contract period indicates a period (until Jan. 31, 1998, for example) covered by the contract in a prescribed format.

The validity of the contract period is to be checked at a prescribed timing by the contract period checking unit 7. When it is found invalid there, the corresponding contract information is sent to a contract cancelled user database 6 and deleted from the contracting user database 1. Consequently, the information regarding users for which the contract periods expired will be deleted from the contracting user database 1 so that no appending information will be delivered to these users.

A seed database 3 stores a master key generated from a seed for master key by a seed and master key generation unit 10 at a prescribed timing, along with its seed ID and valid period, in a format shown in FIG. 5.

A channel key database 4 stores a channel number generated by a channel key generation unit 11 at a prescribed timing, along with a channel number, a channel key ID and its valid period, in a format shown in FIG. 6.

Next, a procedure for generating an appending information corresponding to each contracting user and sending it to the reception device using the broadcast device 13 will be described with reference to FIG. 8.

An appending information generation control unit 9 sends a command for appending information generation to an appending information generation unit 8 (step S11). This command has a content of "send an appending information for contracting users who have the contract for one month from Dec. 1, 1997", for example, which may be expressed by a bit sequence of a prescribed format. When such a command is issued, the appending information generation unit 8 searches the information of users who have the contract for at least one month from Dec. 1, 1997, through the contracting user database 1, and reads that information from there (steps S12 to S13). Then, a terminal ID and channel numbers of each user are obtained from the user information read out from the contracting user database 1 (step S14).

Here, the minimum unit of the contract period is set to be one month, and the valid period of the contract is assumed to start from the first day of the month and end by the last day of the month. Namely, the channel key for November is to be different from that for December, while channel key for each month is to be kept unchanged within that month. Also, obviously, different channel keys are to be used for different channel numbers even within the same period.

Next, the appending information generation unit 8 searches a channel key Kch that is valid from Dec. 1, 1997 to Dec. 31, 1997, through the channel key database 4, and reads that channel key Kch from there (step S15). Also, a master key Km corresponding to a seed that is valid from Dec. 1, 1997 to Dec. 31, 1997 is searched through the seed database 3, and that master key Km is read out from there (step S16). Here, again, the minimum unit of the master key switching-is set to be one month. Note however that it is not absolutely necessary to change the master key in one month in view of its characteristics.

Figure 9A:
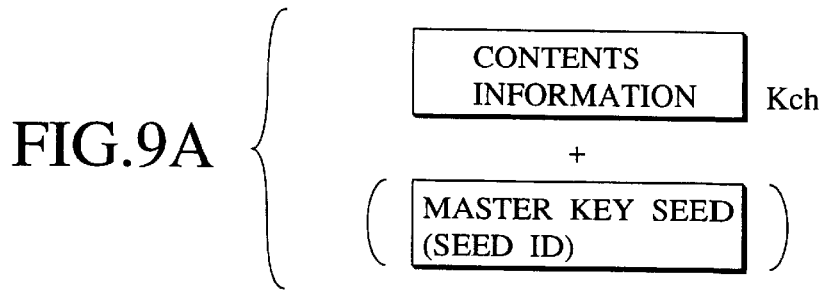
FIG. 9A is a diagram conceptually showing an exemplary information to be multiplexed to broadcast waves for mainly delivering contents that can be used in the broadcast system of FIG. 1.
Figure 9B:
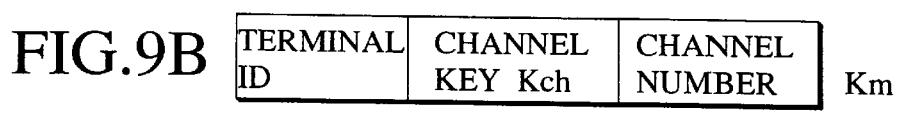
FIG. 9B is a diagram showing an exemplary data format of an appending information that can be used in the broadcast system of FIG. 1.

According to the information (each user's terminal ID, contracted channel numbers, and channel key Kch) obtained above, the appending information generation unit 8 generates the appending information for each user as shown in FIG. 9B, and encrypts it using the master key Km (step S17). The encrypted appending information for each contracting user generated here will be sequentially sent to the appending information generation control unit 9 and the broadcast device 13.

The broadcast device 13 converts the encrypted appending information into broadcast waves of a prescribed frequency bandwidth, and delivers them toward each reception device (step S18).

On the other hand, the encrypted contents information (see FIG. 9A) which is encrypted using the channel key Kch corresponding to each channel number will be sent separately (by another bandwidth) from this appending information, and the reception device is made to receive them both.

Figure 10:
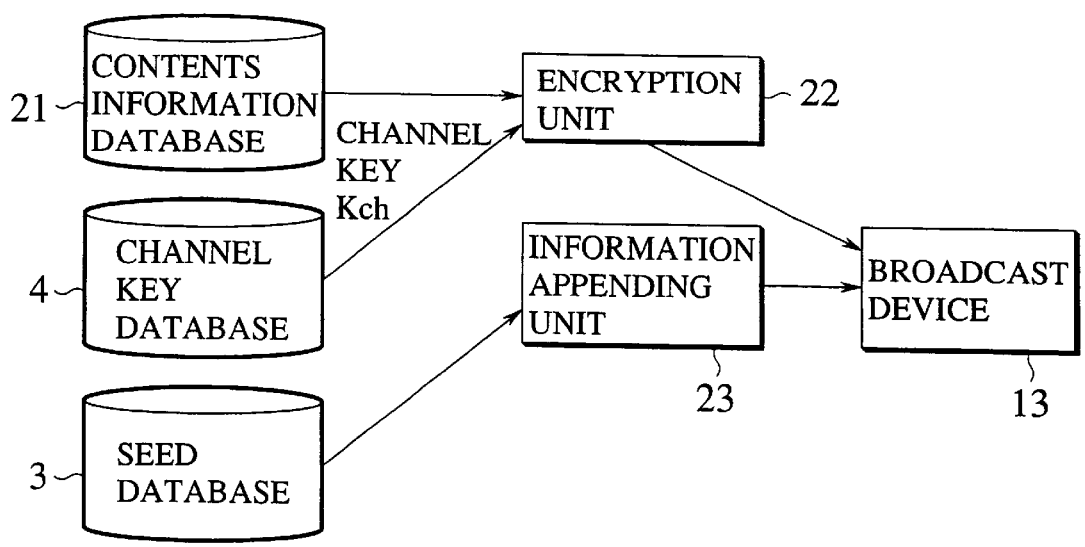
FIG. 10 is a block diagram showing an exemplary configuration of a contents information delivery device in the contract management device of FIG. 3.

FIG. 10 shows an exemplary configuration of a contents information delivery device to be provided at the broadcast station 200 in order to generate and deliver (broadcast) the encrypted contents information. In FIG. 10, the elements identical to those shown in FIG. 3 are given the same reference numerals.

The contents information of each channel is stored in the contents information database 21 as shown in FIG. 10. The encryption unit 22 reads out the contents information corresponding to each channel number from the contents information database 21, while reading out the channel key for each channel number that is valid within the appending information generation range mentioned earlier from the channel key database 4, and encrypts the contents information of each channel using the channel key Kch of the corresponding channel number and then sends it to the information appending unit 23.

In the case of updating the master key Km at a prescribed interval, the information appending unit 23 reads out the master key seed or the seed ID which is valid within the appending information generation range mentioned earlier from the seed database 3, and outputs it to the broadcast device 13.

The broadcast device 13 multiplexes the contents information encrypted using the channel key and the master key seed or the seed ID, converts them into broadcast waves of a prescribed frequency bandwidth, and delivers them toward each reception device.

In the case where all the information cannot be sent at once because there is a need to deliver a large amount of information in order to send the appending information for each channel to each user, it is possible to store the appending information generated by the appending information generation unit 8 into the appending information database 5 once, sequentially take out a portion to be delivered from there and broadcast it, and then delete it from the appending information database 5 after the delivery is completed. Else, it is also possible to control the generation of the appending information from the appending information generation control unit 9 such that the appending information generation unit 8 generates only those appending information within a deliverable range.

There are also cases where the reception device fails (for some reasons) to receive the appending information delivered by a single broadcasting. For this reason, there is a need to send the appending information frequently (as much as possible) starting from a period before the start of the contract period. However, even when such a measure is taken, there can still be some cases where the reception device fails to receive the appending information (for a reason such as that the reception device has been located for a long time at a place where the reception is impossible). In such a case, the user becomes impossible to view or listen and there will be a feedback to the broadcast station side in a form of a claim from the user. Namely, the appending information output request signal containing the terminal ID and the corresponding channel numbers is sent to the appending information output request unit 12, and the appending information output request unit 12 sends it to the appending information generation control unit 9. Then, the appending information generation control unit 9 searches through the contracting user database 1 to confirm the validity of the contract, and generates and broadcasts the encrypted appending information according to the procedure described above.

(2-2)

Note that the above description is directed to the case where the channel key Kch itself is contained in the appending information, but the present invention is not necessarily limited to this case and it is possible to divide the channel key Kch into two channel sub-keys H and L consisting of upper several tens of bits and remaining lower several tens of bits respectively, for example, and mount only the channel sub-key H on the appending information while the other channel sub-key L is delivered in a form of being appended (or multiplexed) to the contents information encrypted using the channel key Kch.

In this case, the appending information generation unit 8 of the contract management device extracts the channel sub-key H from the channel key that is valid within the appending information generation range in the channel key database 4, generates the appending information for each user as shown in FIG. 11B according to the user's terminal ID, the contracted channel numbers, and the channel sub-key H, and encrypts it using the master key Km.

Also, the information appending unit 23 of the contents information delivery device shown in FIG. 10 further extracts the channel sub-key L from the channel key for each channel number that is valid within the appending information generation range mentioned earlier in the channel key database 4, and outputs it to the broadcast device 13. The broadcast device 13 then delivers broadcast waves of a prescribed frequency bandwidth, in which the contents information encrypted using the channel key, the channel sub-key L, and the master key seed or the seed ID if necessary are multiplexed as shown in FIG. 11A, toward each reception device.

(2-3)

It is also possible to consider the case of using the appending information given by an appending information unique to each contracting user (terminal related appending information) as shown in FIG. 12 and an appending information corresponding to a channel number (channel related appending information) as shown in FIG. 13.

As shown in FIG. 12, the terminal related appending information comprises a terminal ID, channel numbers, and an information indicating whether the contract with the reception device identified by the terminal ID is valid or invalid. This indicates whether the reception contract of the reception device which has the terminal ID described in the terminal related appending information as its own terminal ID is valid or invalid for the channels corresponding to the channel numbers described in the terminal related appending information.

Using this terminal related appending information, the reception device sets the corresponding channel valid when the terminal related appending information indicating that the reception contract for that channel is valid (which will also be referred to as valid terminal related appending information or ON signal below) is received, until the terminal related appending information indicating that the reception contract for that channel is invalid (which will also be referred to as invalid terminal related appending information or OFF signal below) is subsequently received. Then, the reception device sets that channel invalid when the invalid terminal related appending information is received, until the valid terminal related appending information is subsequently received.

The terminal related appending information does not contain the channel key so that it is possible to reduce the size of the entire appending information to less than a half. Namely, in order to prevent the cryptoanalysis of the contents information encrypted using the channel key, it is necessary to use at least about 56 bits for the channel key, while it is sufficient to use about 30 bits for the information other than the channel key such as the terminal ID, the channel numbers, etc. Consequently, when the channel key is contained in the appending information, a rate occupied by the channel key with respect to the entire appending information becomes quite high. Thus, by eliminating the channel key from the appending information, it becomes possible to reduce the size of the entire appending information to less than a half. As a consequence, the appending information that is smaller than that of the above described scheme will be sent in this case so that the number of appending information that can be sent per unit time can be increased. Moreover, there is no need to send the channel key individually to each user every month, for example, in synchronization with the timing for switching the channel key, and it suffices to deliver the terminal related appending information only at a time of new subscription and at a time of contract expiration so that the amount of appending information to be delivered as a whole can be reduced drastically.

In fact, in this case, it is necessary to deliver the terminal related appending information that is to be delivered to each user individually, only at a time of validating the broadcast reception and at a time of invalidating the broadcast reception, so that the amount of appending information to be delivered can be quite small in normal circumstances.

In this case, the configuration of the contract management device for delivering the terminal related appending information of FIG. 12 can be the same as that of FIG. 3, but the operation will be different. Namely, the appending information generation unit 8 generates the terminal related appending information by retrieving information from the contracting user database 1, the seed database 3, and the contract cancelled user database 6, without retrieving information from the channel key database 4. This is because there is no need to contain the channel key in the terminal related appending information on one hand, and also because it is necessary to send the terminal related appending information to those users who have cancelled the contracts.

Now, the processing of the contract management device of FIG. 3 in this case will be described.

The registration processing for the contracting user database 1 after the contract information input is carried out according to the flow chart of FIG. 7.

The appending information generation control unit 9 retrieves the new contracting user information registered in the contracting user database 1 at a prescribed timing through the appending information generation unit 8. Then, the appending information generation unit 8 extracts the terminal ID and the contracted channel numbers from the retrieved new contracting user information, and generates the terminal related appending information as shown in FIG. 12 (in this case the contract is to be validated so that the valid terminal related appending information will be generated).

In addition, the appending information generation unit 8 searches through the seed database 3 and extracts the currently valid master key. Then, the terminal related appending information generated earlier is encrypted using this master key, and sent to the appending information generation control unit 9.

The appending information generation control unit 9 then sends this to the broadcast device 13, which broadcasts it using a prescribed bandwidth.

Here, there can be cases where the number of terminal related appending information to be delivered is too many so that all of them cannot be broadcasted at once. In such a case, it is possible for the appending information generation control unit 9 carry out such a control that the generated encrypted terminal related appending information will be temporarily stored in the appending information database 5.

At the contracting user side, when the terminal related appending information as shown in FIG. 12 is received at the reception device owned by the user, the decryption unit (to be described below) inside the reception device decrypts it and checks whether the contract is valid or not. When an indication that the contract is valid is described therein, the user can view or listen the desired programs by decrypting the contents information of the corresponding channel, that is delivered through a bandwidth different from that used for the appending information, for example, using the channel key of that channel.

The contract period checking unit 7 searches through the contracting user database 1 at a prescribed timing, and retrieves information regarding the contract expired users. The retrieved information regarding the contract expired users is then registered into the contract cancelled user database 6.

There is a need to deliver the invalid terminal related appending information to the contract expired user. For this reason, the appending information generation control unit 9 first retrieves the new contracting user information registered in the contracting user database 1 at a prescribed timing through the appending information generation unit 8, similarly as in the case of delivering the valid terminal related appending information described above.

Then, the appending information generation unit 8 extracts the terminal ID and the contracted channel numbers from the retrieved new contracting user information, and generates the terminal related appending information as shown in FIG. 12 (in this case the contract is to be invalidated so that the invalid terminal related appending information will be generated). In addition, the appending information generation unit 8 searches through the seed database 3 and extracts the currently valid master key. Then, the terminal related appending information generated earlier is encrypted using this master key, and sent to the appending information generation control unit 9. Then, the appending information generation control unit 9 sends it to the broadcast device 13, which broadcasts it using a prescribed bandwidth.

Here, in the case of delivering the invalid terminal related appending information, there can be cases where the reception device fails (for some reason) to receive the appending information by a single broadcasting, so that there is a need to broadcast the once transmitted information regularly over several months, because otherwise that reception device would be left in a viewable or listenable state indefinitely and it cannot be said that the reception contract is managed. This situation is similar in the case of delivering the valid terminal related appending information, but in that case it is not necessary to continue broadcasting the appending information so long as in the case of delivering the invalid terminal related appending information, because in that case the reception failure can be detected by a claim from the user so that the unreceived valid terminal related appending information can be delivered using the appending information output request unit 12.

Next, the delivery of the channel key for decrypting the contents information in this case will be described.

Assuming that the channel key is to be changed once every month, the channel related appending information in a format as shown in FIG. 13 is generated from the channel key, the channel number, and the channel key ID if necessary, and encrypted using the master key that is valid at that moment. This encrypted channel related appending information is then delivered using the same bandwidth as that used for delivering the terminal related appending information at a prescribed timing.

At a time of delivery, it is possible to provide an information such as a bit information for distinguishing the terminal related appending information and the channel related appending information, at non-encrypted portions of the terminal related appending information and the channel related appending information.

At the reception device side, this bit information is checked, and if it is the channel related appending information it is decrypted. Also, the channel number contained in the channel related appending information is checked, and if it is the currently reception contracted channel number, the channel key ID and the channel key contained in that channel related appending information are stored.

Here, in the case of changing the channel key, it is preferable to deliver the channel key after the change prior to a timing at which the channel key is to be actually changed. In this way, it becomes possible for the reception device side to continually carry out the decryption of the contents information in conjunction with the channel key change. For example, the channel related appending information of the channel key that is to be changed from Jan. 1, 1998 can be delivered starting from Dec. 15, 1997, such that it becomes highly likely for the reception device to receive this channel related appending information of that channel key during 16 days. By storing the received channel related appending information in a prescribed database, the switching of the channel key between Dec. 31, 1997 and Jan. 1, 1998 can be dome smoothly so that it becomes possible for the user to continually view or listen programs of the desired channel.

On the other hand, the reception device of the newly contracted user does not store that channel key (because the reception contract has not been made until now). For this reason, there arises a problem that the new contracting user cannot view or listen immediately after the contract is made. In order to resolve this problem, it is necessary to deliver the channel related appending information frequently. However, the channel related appending information as shown in FIG. 13 is in correspondence to the channel number and not to each user individually (that is, it is an information to be delivered commonly to all users), so that the amount of appending information to be delivered can be less compared with the case of delivering the appending information as shown in FIG. 9B which must be delivered individually to each user, and consequently it is quite possible to deliver the channel related appending information frequently.

Note that the delivery of the channel related appending information can be made more effective by sending it more frequently immediately before the channel key change (Dec. 31, 1997) and immediately after the channel key change (Jan. 1, 1998) than usual. This is because it is desirable to receive it without failure by this period. The same is also true for a timing of updating the reception contract (a timing at which the new reception contract starts and a timing at which the contract expires).

In the above described (2-1), the switching of the channel key directly implied the switching of the contract (contract expiration/contract continuation), so that a timing for switching the channel key and a timing for switching the contract was set at the same timing, but in the case of using the valid/invalid terminal related appending information, it is not absolutely necessary to set them at the same timing.

As described, in the case of using the valid/invalid terminal related appending information and the channel related appending information, the appending information content to be delivered to the contracting users is divided into information individual to each user and information common to all users, and it suffices to deliver the terminal related appending information frequently at a time of contract switching while delivering the channel related appending information frequently at a time of the channel key switching, so that the amount of information to be delivered can be distributed.

(2-4)

In the above described (2-3), whether to permit or refuse the decryption of the contents information at the reception device is controlled by delivering the valid/invalid appending information (a control with respect to the reception terminal at a time of new subscription and a time of contract expiration). The operation similar to this can also be realized using the appending information as shown in FIG. 9B, for example, as follows.

Namely, during the contract period, the appending information generation unit 8 generates the appending information containing the terminal ID, the channel key, and the channel numbers as shown in FIG. 9B, and delivers it to each user. However, at the end of each month (a period which is the valid period of the channel key as well as the minimum unit of the contract period), for example, the appending information generation unit 8 searches through the contract cancelled user database 6, and generates and delivers the appending information that does not contain the channel key for those users whose contracts have expired. At the reception device of such user, it becomes impossible to decrypt the contents information thereafter (because the valid channel key will not be received thereafter). In this way, the appending information that does not contain the channel key can function as a signal for notifying the contract expiration to the reception device of the user as well as a control signal for making it impossible to view or listen at that reception device.

Similarly, in the case of using the appending information containing the channel sub-key H as shown in FIG. 11B, during the contract period, the appending information generation unit 8 generates the appending information containing the terminal ID, the channel sub-key H, and the channel numbers as shown in FIG. 11B, and delivers it to each user. However, at the end of each month (a period which is the valid period of the channel key as well as the minimum unit of the contract period), for example, the appending information generation unit 8 searches through the contract cancelled user database 6, and generates and delivers the appending information that does not contain the channel sub-key for those users whose contracts have expired. At the reception device of such user, it becomes impossible to decrypt the contents information thereafter (because the channel sub-key necessary in generating the channel key cannot be obtained thereafter). In this way, the appending information that does not contain the channel sub-key can function as a signal for notifying the contract expiration to the reception device of the user as well as a control signal for making it impossible to view or listen at that reception device.

(2-5)

Next, the scheduling unit 14 of the contract management device shown in FIG. 3 will be described.

The scheduling unit 14 carries out the delivery control such that the appending information will be received by the reception device of each user without failure, at a time of delivering the appending information stored in the appending information database 5 and at a time of delivering the appending information by the broadcast device 13.

Namely, there is a need to send the appending information frequently immediately after the reception contract is made, at a time of contract change, at a time of contract cancellation, at a time of updating the channel key, etc., for example, so that scheduling unit 14 carries out the appending information delivery control according to the delivery schedule of the appending information to that end. It is also effective to use such a delivery schedule of the appending information that the appending information will be delivered frequently at time zones during which popular programs are broadcasted, so as to ensure the delivery to the user side.

(3) Reception Device:

(3-1)

Figure 14:
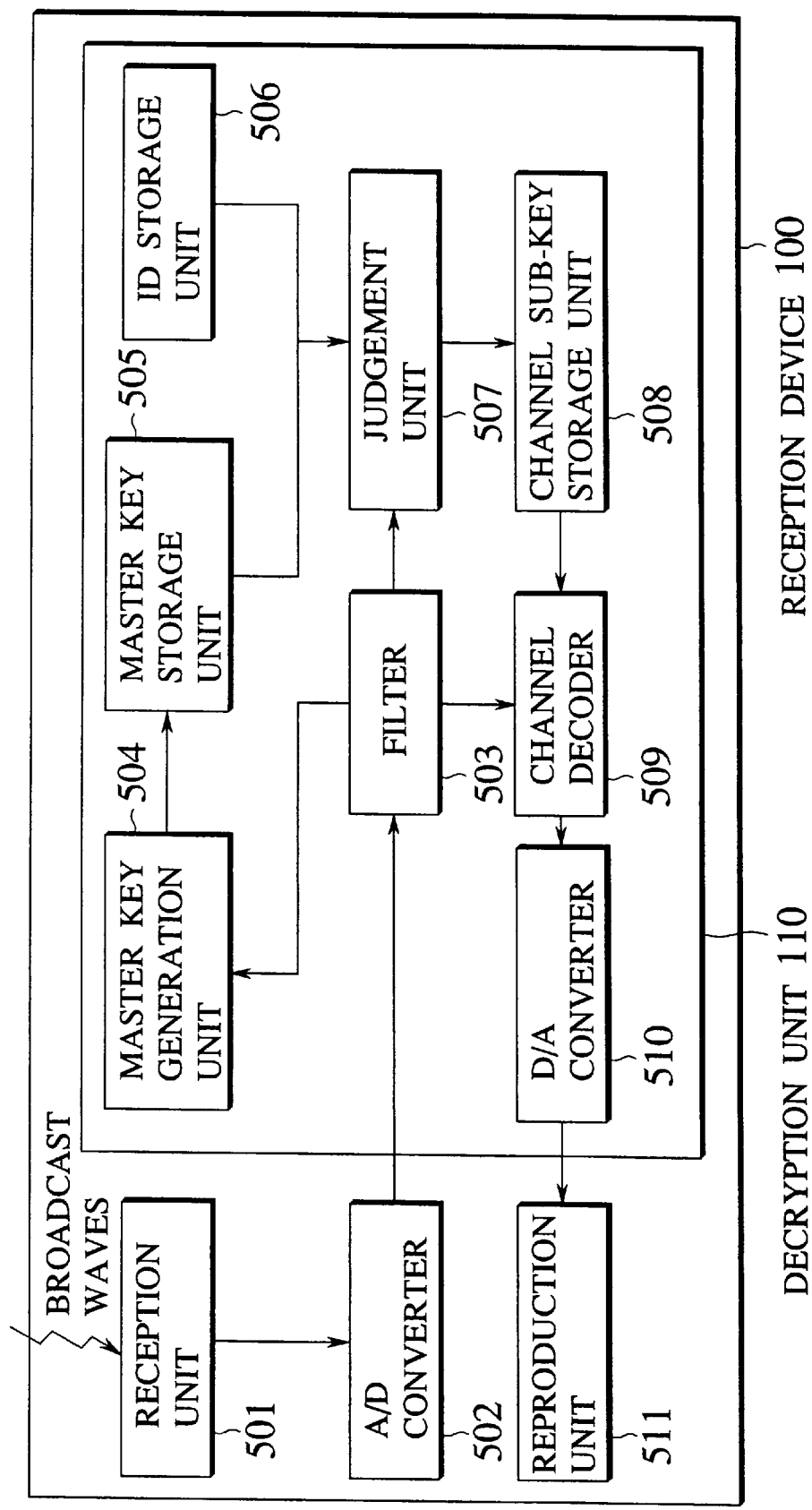
FIG. 14 is a block diagram showing an exemplary configuration of a broadcast reception device according to the first embodiment of the present invention.
Figure 15:
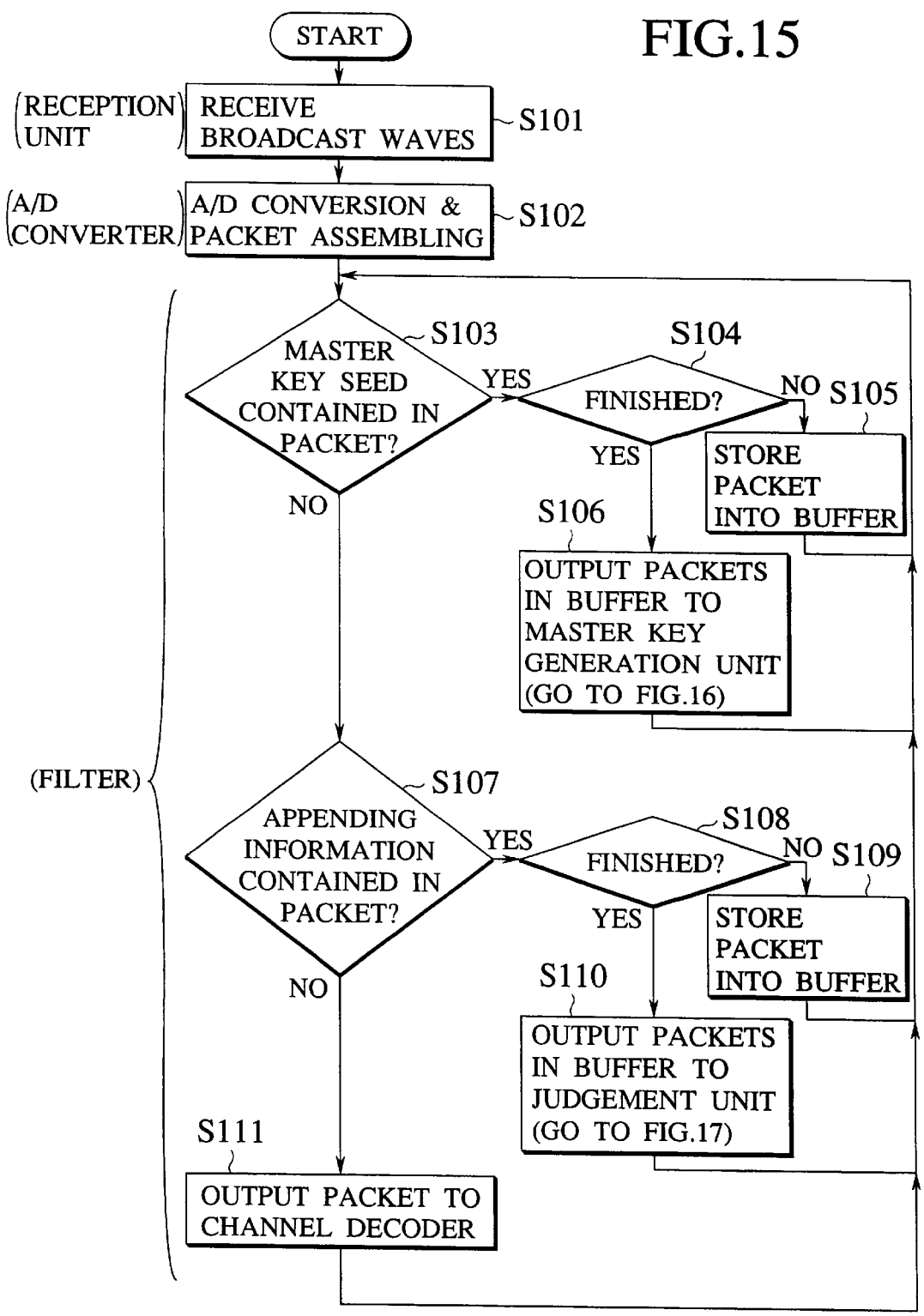
FIG. 15 is a flow chart of a processing in the broadcast reception device of FIG. 14.

FIG. 14 shows an exemplary configuration of the reception device 100 according to this first embodiment, which receives the appending information generated by the contract management device provided at the broadcast station side as shown in FIG. 3 and broadcast waves outputted from the contents information delivery device as shown in FIG. 10.

Here, the broadcast waves to be received at the reception device 100 shown in FIG. 14 are assumed to contain the following information.

Master key seed

[Appending]Km: Appending information encrypted using the master key Km

Channel sub-key L

[Contents]Kch: Contents information encrypted using the channel key Kch

The master key seed is a source data for generating the master key at a master key generation unit 504 in the reception device 100 of FIG. 14.

The channel sub-key L is an information for generating the channel key Kch in conjunction with the channel sub-key H that is contained in the appending information.

Note that there can be cases where the channel sub-key L is not to be delivered in a form of being multiplexed in the broadcast waves, and in such cases it will be set such that the channel key Kch=the channel sub-key H.

The appending information is assumed to contain the following information.

Terminal ID: Identification information of the reception device

Channel number (or channel numbers)

Channel sub-key H

In the case where there is only one channel that is covered by the contract with the reception device identified by the terminal ID, it is not absolutely necessary to include the channel number. Also, there are cases where the channel sub-key H is not contained in the appending information.

In the case where the channel sub-key H is contained in the appending information, this appending information functions as the so called ON signal which enables viewing or listening of the corresponding channel by the reception device identified by the corresponding terminal ID.

On the other hand, in the case where the channel sub-key H is not contained in the appending information, this appending information functions as the so called OFF signal which prohibits the use of the corresponding channel by the reception device identified by the corresponding terminal ID.

Now, the outline of the contract management mechanism at the reception device of FIG. 14 that received the appending information generated and delivered by the above described contract management device will be described.

In the case where the appending information contains the channel sub-key H, a decryption unit 110 stores the channel sub-key H extracted from the appending information into a channel sub-key storage unit 508. Consequently, a channel decoder 509 can acquire the channel sub-key H from the channel sub-key storage unit 508 and combine it with the channel sub-key L delivered in a form of being multiplexed in the broadcast waves so as to generate the channel key Kch. Then, the contents information of the corresponding channel can be properly decrypted using the generated channel key Kch.

In the case where the terminal ID contained in the appending information does not coincide with the ID given in advance to the reception device, the decryption unit 110 does not store the channel sub-key H into the channel sub-key storage unit 508.

The contract management device of the broadcast station 200 can allow only the contracting reception device to start viewing or listening the contracted channel by broadcasting the appending information containing the ID of the contracting reception device, the contracted viewable or listenable channel number, and the channel sub-key H of that channel, in a form of being multiplexed in the broadcast waves.

In the case where the appending information does not contain the channel sub-key H, the decryption unit 110 outputs a command for deleting the channel sub-key H to the channel sub-key storage unit 508. The contents information of that channel is encrypted using the channel key Kch, but the channel decoder 509 cannot acquire the channel sub-key H and therefore cannot combine it with the channel sub-key L delivered in a form of being multiplexed with the contents information to generate the channel key Kch, so that the reproduction cannot take place because the contents information of that channel cannot be decrypted.

The contract management device of the broadcast station 200 broadcasts the appending information containing the ID of the contract cancelled reception device and the cancelled channel number but not containing the channel sub-key H, in a form of being multiplexed in the broadcast waves. In this way, it can prohibit (that is, cancel the contract of) only the contract cancelled reception device to view or listen the contracted channel.

Next, with references to the flow charts of FIG. 15 to FIG. 18, the processing of the reception device of FIG. 14 will be described in further detail.

First, when a reception unit 501 receives the broadcast waves, an A/D converter 502 converts them into digital signals, assembles packets from information contained in these signals and outputs them to a filter 503 (steps S101 to S102).

Each packet has a flag information that enables to distinguish whether that packet is a packet containing the master key seed, a packet containing the appending information, or a packet containing the contents information. In addition, the last packet for the master key seed and the appending information has an end flag recorded therein.

The filter 503 has sufficiently large buffers for the master key seed and the appending information respectively.

When it is judged that the entered packet contains the master key seed according to the flag of that packet, this packet is added to the buffer for the master key seed, and when the end flag is detected in the flag of the sequentially entered packet, the packets stored in the buffer for the master key seed up until then are transferred to a master key generation unit 504 (step S103 to S106).

When it is judged that the entered packet contains the appending information according to the flag of that packet, this packet is added to the buffer for the appending information, and when the end flag is detected in the flag of the sequentially entered packet, the packets stored in the buffer for the appending information up until then are transferred to a judgement unit 507 (step S107 to S110).

When it is judged that the entered packet contains the contents information and the channel sub-key L according to the flag of that packet, this packet is transferred to the channel decoder 509 (step S111).

Figure 16:
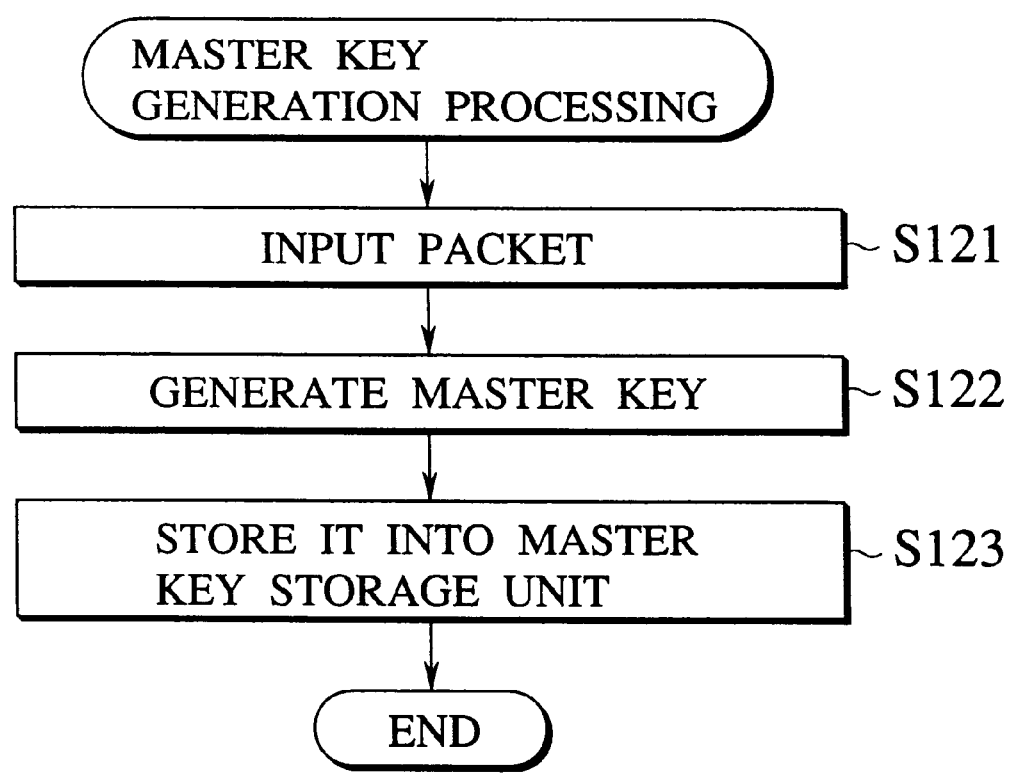
FIG. 16 is a flow chart of a master key generation processing in the broadcast reception device of FIG. 14.

As shown in the flow chart of FIG. 16, the master key generation unit 504 extracts the master key seed from the packet transferred from the filter 503, generates the master key, and stores the generated master key into a master key storage unit 505 (steps S121 to S123).

Figure 17:
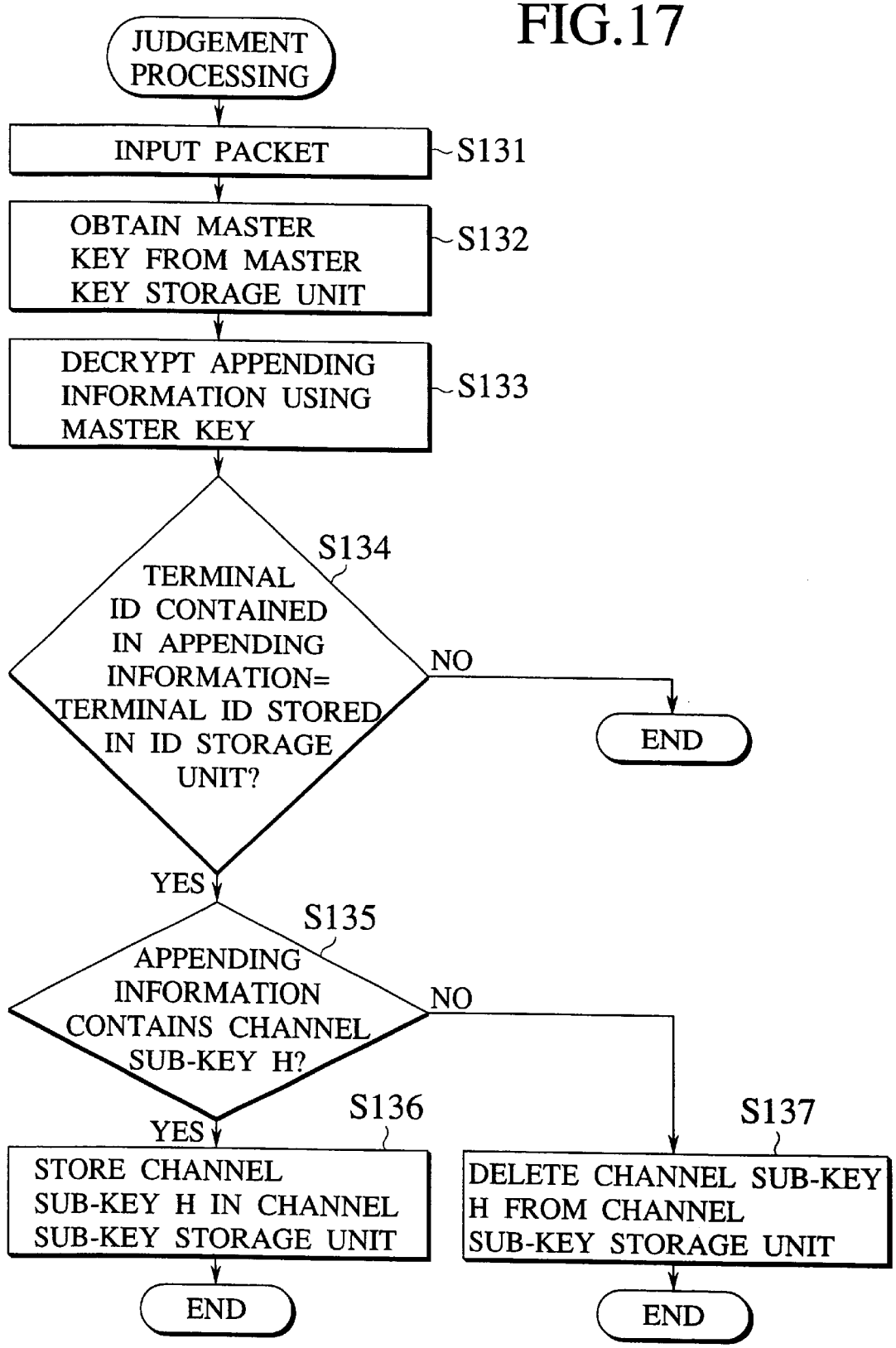
FIG. 17 is a flow chart of a judgement processing in the broadcast reception device of FIG. 14.

As shown in the flow chart of FIG. 17, upon receiving the packets from the filter 503, the judgement unit 507 first reads out the master key Km from the master key storage unit 505, and then decrypts the appending information extracted from these packets using the master key Km (steps S131 to S133).

The appending information always contains the terminal ID, and may also contain the channel number and the channel sub-key H in addition.

The judgement unit 507 extracts the terminal ID from the appending information, compares it with the own terminal ID that is stored in advance in an ID storage unit 506, and executes the subsequent processing only when they coincide. When they do not coincide, the processing is stopped (step S134).

When the terminal ID contained in the appending information coincides with the own terminal ID, whether the channel sub-key H is contained in the appending information or not is checked next (step S135), and if the channel sub-key H is contained, it is stored into the channel sub-key storage unit 508 (step S136). If the channel sub-key H is not contained in the appending information, it can be judged that this appending information is the OFF signal, so that the channel sub-key H already stored in the channel sub-key storage unit 508 is deleted (step S137).

Figure 18:
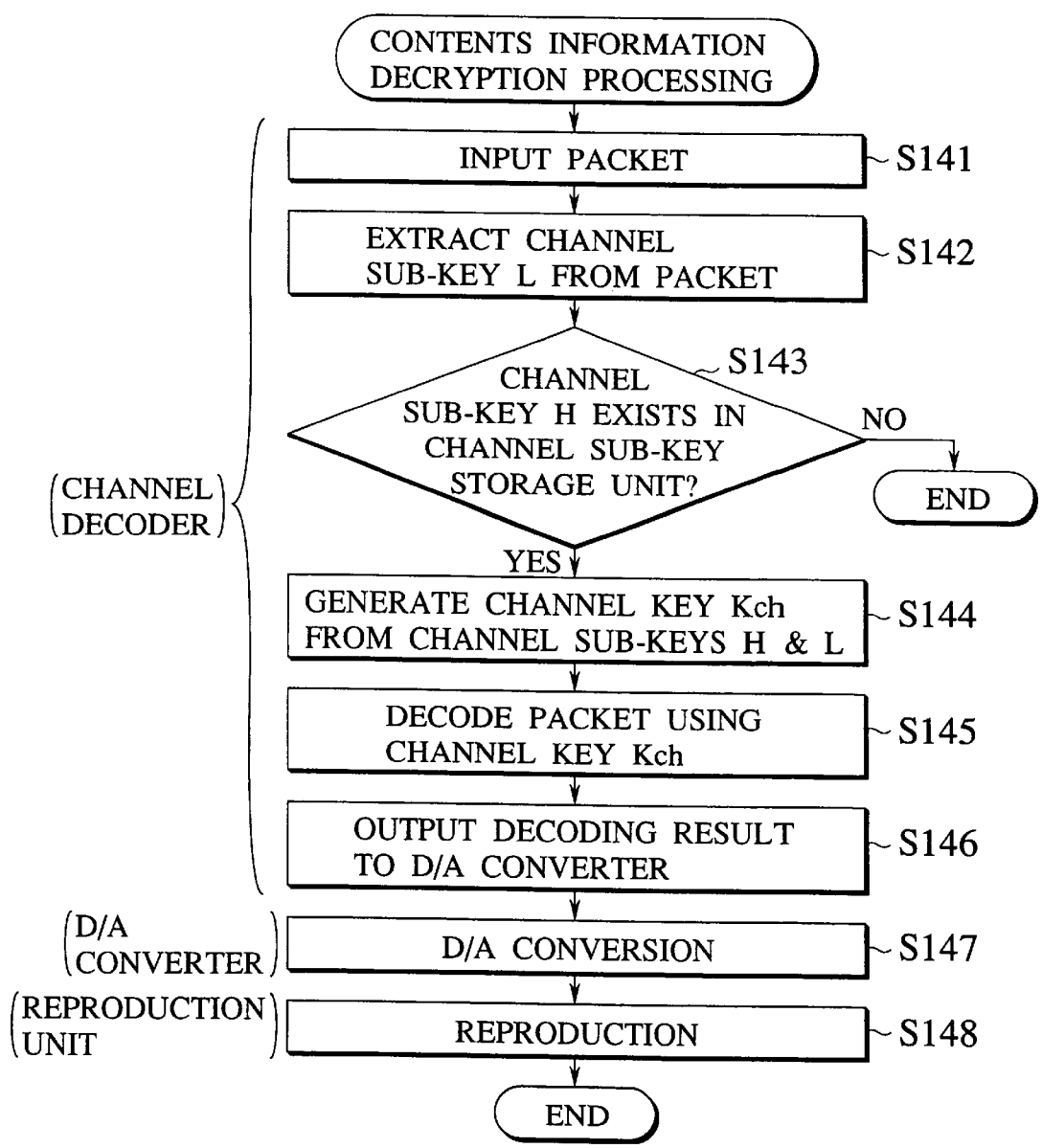
FIG. 18 is a flow chart of a contents information decryption processing in the broadcast reception device of FIG. 14.

As shown in the flow chart of FIG. 18, the channel decoder 509 extracts the channel sub-key L from a packet transferred from the filter 503 (step S141 to S142), reads out the channel sub-key H from the channel sub-key storage unit 508 (step S143), and generates the channel key Kch (step S144). When the channel sub-key H in the channel sub-key storage unit 508 is already deleted at the step S137, the processing is terminated.

The algorithm for generating the channel key Kch from the channel sub-keys H and L is stored in advance in the channel decoder 509.

After generating the channel key Kch, the channel decoder 509 decrypts the encrypted contents information, which is extracted from the packet transferred from the filter 503, using that channel key Kch (step S145), and sequentially outputs the decrypted contents information to a D/A converter 510 (step S146).

The D/A converter 510 converts the contents information transferred from the channel decoder 509 into analog signals (step S147), and the reproduction of the analog signals is carried out at a reproduction unit 511 (step S148).

From a viewpoint of preventing the improper viewing or listening based on the cryptoanalysis, it is preferable to update the encryption key regularly. For example, the channel key Kch can be changed easily by changing the channel sub-key L that is delivered in a form of being multiplexed in the broadcast waves. Of course, in this case, the contents information of that channel must be encrypted in such a way that it can be decrypted using the new channel key Kch. Note that there can be cases where the channel sub-key L is not to be delivered in a form of being multiplexed in the broadcast waves. In such cases, it will be set such that the channel key Kch=the channel sub-key H.

Now, after receiving the appending information for permitting viewing or listening, the reception device 100 is capable of viewing or listening programs of the contracted channel until the appending information for prohibiting viewing or listening is received. There can be cases where the user refuses to receive the appending information for prohibiting viewing or listening despite of the fact that the contract for viewing or listening programs of that channel has been cancelled. This can be the case when the power of the reception device is cut off for a certain period of time. For this reason, there is a need to broadcast the appending information for prohibiting viewing or listening (OFF signal) repeatedly over a certain period of time after the contract cancellation.

Figure 19:
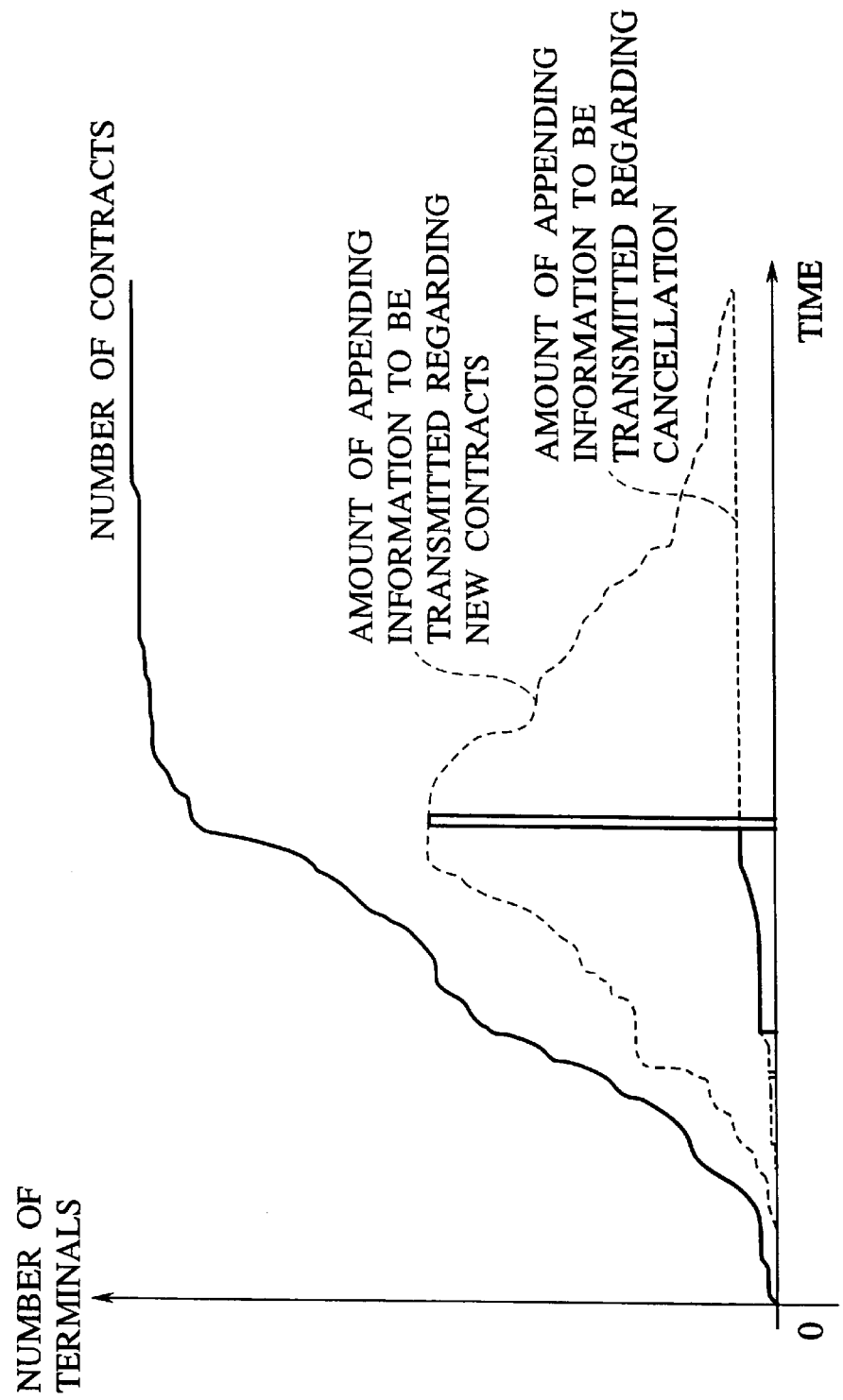
FIG. 19 is a graph showing changes in time of amounts of appending information to be transmitted in relation to new contracts and cancellations in the broadcast system of FIG. 1.

FIG. 19 shows a change in time of an amount of the appending information regarding new contracts (ON signal) to be transmitted and an amount of the appending information regarding cancellation (OFF signal) to be transmitted. A sum of the amount of the appending information regarding new contracts (ON signal) to be transmitted and the amount of the appending information regarding cancellation (OFF signal) to be transmitted gives a total amount of the appending information to be transmitted. It can be seen that the amount of the appending information regarding new contracts is bursty depending on the number of contracts, whereas the amount of the appending information regarding cancellation changes as an integrated value of the number of cancelled contracts over time.

Both the transmission of the appending information regarding new contracts and the transmission of the appending information regarding cancellation lack a guarantee for being surely received by the target reception device. Consequently, it is necessary to broadcast them repeatedly.

As described above, when the contract management device provided at the broadcast station side delivers the appending information that functions as the ON signal or the OFF signal, it suffices to deliver the appending information several times repeatedly only at a time of new subscription and at a time of cancellation so that it is possible to reduce the amount of contract management information to be transmitted considerably compared with the scheme for transmitting as many contract data as the number of all the subscribing terminals whenever the contracts are renewed (every month, for example). Consequently, it is possible to increase the amount of transmission of the channel contents information.

(3-2)

When the multiplexed appending information is removed from the received broadcast waves at the reception device 100 in some way, there can be cases where the improper viewing or listening becomes possible by avoiding the reception of the appending information for prohibiting viewing or listening (OFF signal). In order to cope with such improper conducts, the contract management device provided at the broadcast station is set to always transmit the appending information in a form of being multiplexed at interval of a prescribed number of packets.

When there is no appending information to be transmitted, a dummy appending information may be transmitted. In such a case, the filter 503 of the reception device 100 is also equipped with a counter (packet counter) for counting the number of packets, which is reset whenever the appending information arrives. When the counter value becomes greater than a prescribed value N, it is judged as abnormal state and the processing stopping operation such as stopping of the filtering operation is carried out.

Figure 20:
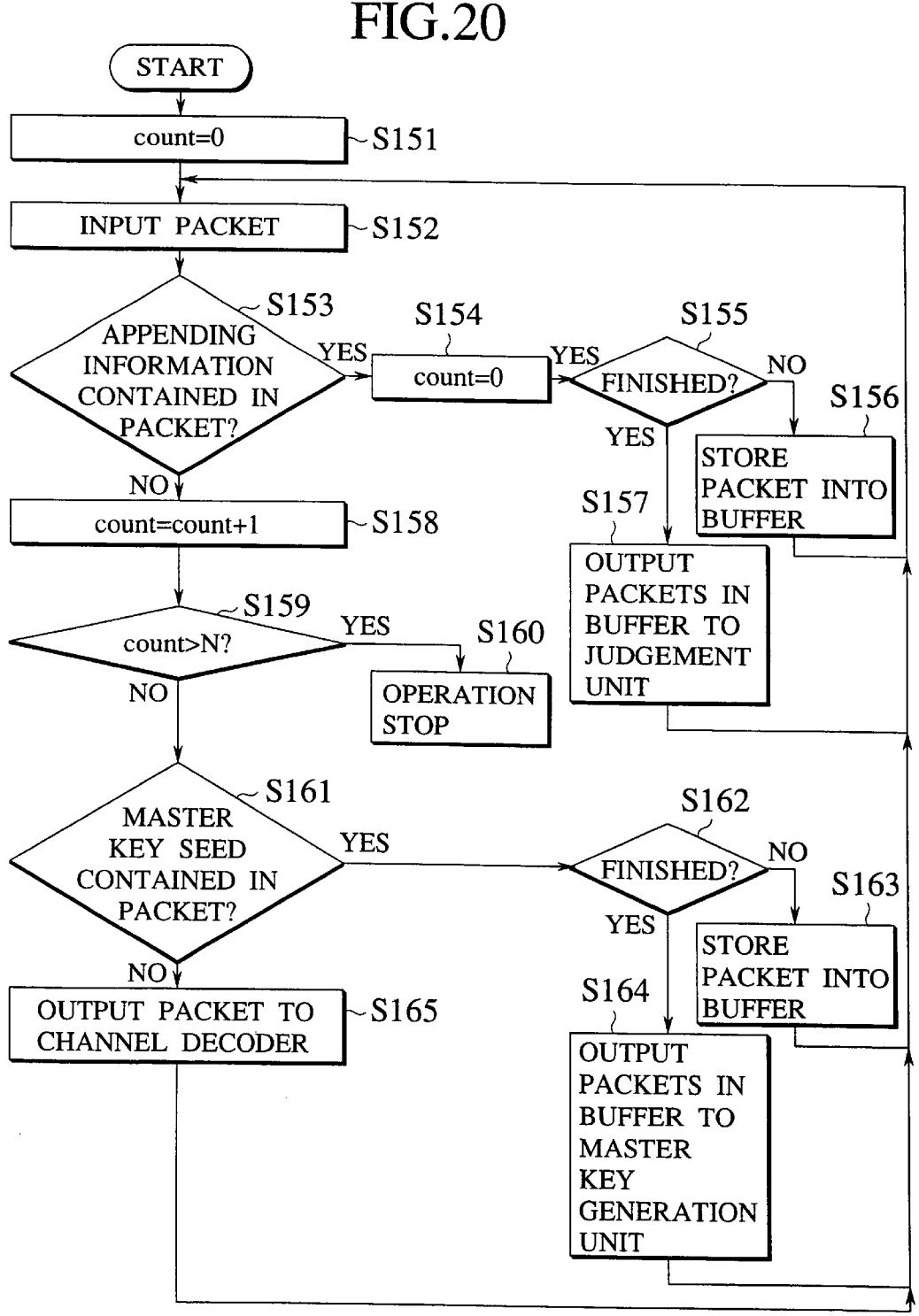
FIG. 20 is a flow chart of a processing in a filter of the broadcast reception device of FIG. 14 in the case of monitoring a reception state of appending information.

The flow chart of FIG. 20 shows an exemplary operation in the case where the filter 503 of the reception device 100 also carries out the above described processing for monitoring a reception state of the appending information. In FIG. 20, a variable "count" denotes the packet count value.

First, the filter 503 initializes the packet counter. Namely, the variable "count" is set to "0" (step S151). The filter 503 then checks the flag information contained in each packet sequentially entered from the A/D converter 502.

When it is judged that the entered packet contains the appending information according to the flag of that packet (step S153), the packet counter value is reset to "0" (step S154) and this packet is added to the buffer for the appending information, and when the end flag is detected in the flag of the sequentially entered packet, the packets stored in the buffer for the appending information up until then are transferred to the judgement unit 507 (step S155 to S157).

When it is judged that the entered packet does not contain the appending information according to the flag of that packet (step S153), the packet counter value is incremented by one (step S158). Then, when the packet counter value becomes greater than the prescribed value N, it is judged as abnormal packet reception state and the processing stopping operation such as stopping of the filtering operation is carried out (step S160).

On the other hand, when the packet counter value is less than the prescribed value N at the step S159, the subsequent processing is executed.

Namely, when it is judged that the entered packet contains the master key seed according to the flag of that packet (step S161), this packet is added to the buffer for the master key seed, and when the end flag is detected in the flag of the sequentially entered packet, the packets stored in the buffer for the master key seed up until then are transferred to the master key generation unit 504 (step S162 to S164).

Also, when it is judged that the entered packet contains the contents information and the channel sub-key L according to the flag of that packet, this packet is transferred to the channel decoder 509 (step S165).

The broadcast station changes the channel sub-key H or the master key regularly (or at appropriate timings). The channel sub-key H is a (component of) key used in encrypting the channel contents information, so that when the channel sub-key H is changed, the encryption of the channel contents information will also be changed. For the reception device which continues to have the reception contract, the appending information containing the corresponding terminal ID, the channel number, and the corresponding channel sub-key H is generated and delivered by broadcast.

The change of the master key is carried out from a viewpoint of the security rather than the contract management. The change of the master key is done by delivering the master key seed by broadcast. At a time of changing the master key, it is preferable to change the channel sub-key H at the same time.

(3-3)

Here, the broadcast waves to be received at the reception device 100 shown in FIG. 14 are assumed to contain the following information.

Master key seed
[Terminal Appending]Km:
[Channel Appending]Km
[Contents]Kch

The terminal related appending information is an appending information unique to each contracting user, which contains at least the following information.

Terminal ID
Channel numbers
Valid/invalid information

In the case where there is only one contracted channel, it is not absolutely necessary to include the channel number.

The channel related appending information contains at least the following information.

Channel numbers
Channel key

Note that the channel related appending information may also contain the channel key ID for identifying the channel key.

Next, with references to the flow charts of FIG. 21 to FIG. 23, the processing of the reception device of FIG. 14 will be described in further detail.

Figure 21:
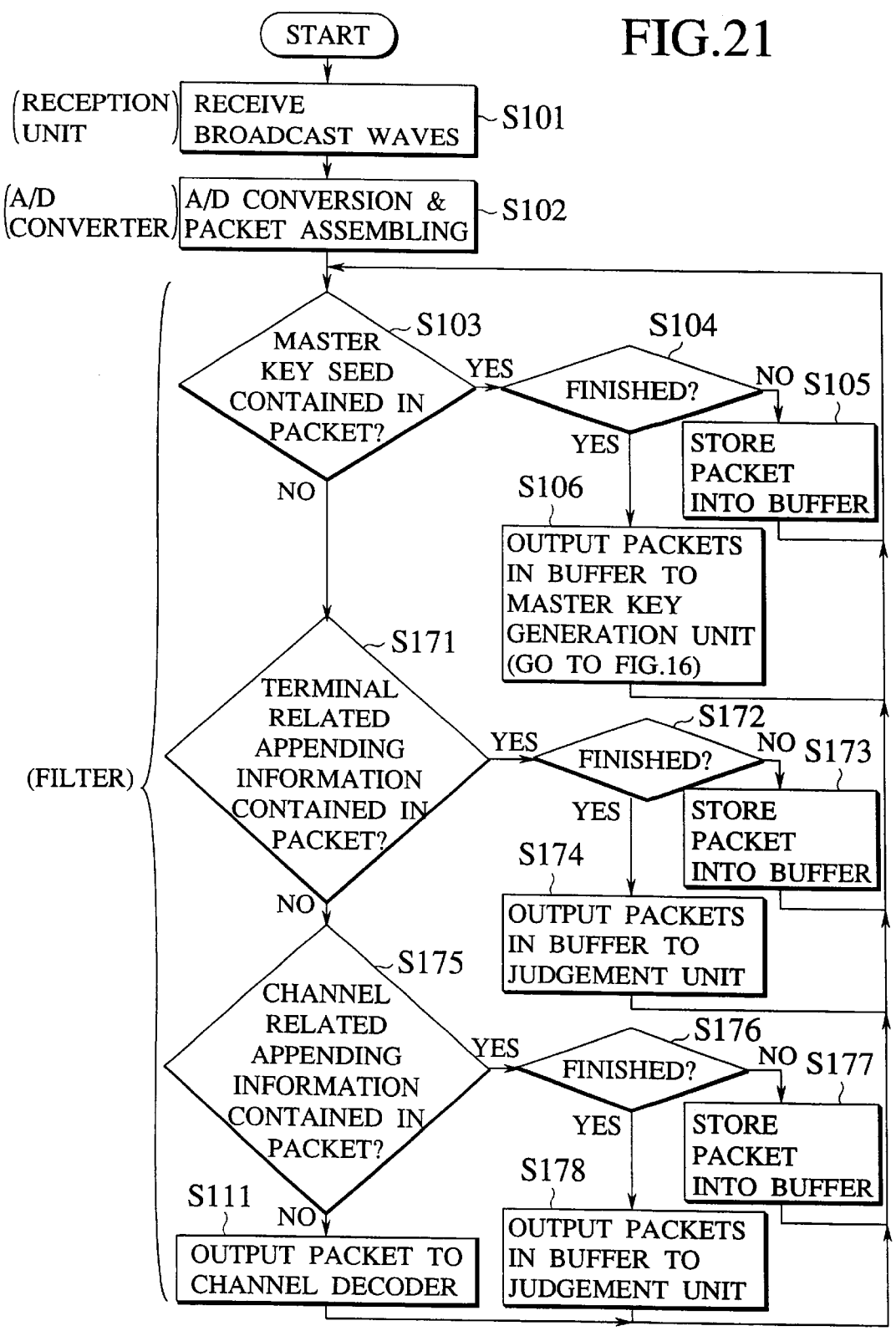
FIG. 21 is a flow chart of a processing in the broadcast reception device of FIG. 14 in the case of using a terminal related appending information and a channel related appending information.

First, in FIG. 21, when the reception unit 501 receives the broadcast waves, the A/D converter 502 converts them into digital signals, assembles packets from information contained in these signals and outputs them to the filter 503 (steps S101 to S102).

Each packet has a flag information that enables to distinguish whether that packet is a packet containing the master key seed, a packet containing the terminal related appending information or the channel related appending information, or a packet containing the contents information. In addition, the last packet for the master key seed, the terminal related appending information and the channel related appending information has an end flag recorded therein.

The filter 503 has sufficiently large buffers for the master key seed, the terminal related appending information and the channel related appending information respectively.

When it is judged that the entered packet contains the master key seed according to the flag of that packet, this packet is added to the buffer for the master key seed, and when the end flag is detected in the flag of the sequentially entered packet, the packets stored in the buffer for the master key seed up until then are transferred to the master key generation unit 504 (step S103 to S106).

When it is judged that the entered packet contains the terminal related appending information according to the flag of that packet, this packet is added to the buffer for the terminal related appending information, and when the end flag is detected in the flag of the sequentially entered packet, the packets stored in the buffer for the terminal related appending information up until then are transferred to the judgement unit 507 (step S171 to S174).

When it is judged that the entered packet contains the channel related appending information according to the flag of that packet, this packet is added to the buffer for the channel related appending information, and when the end flag is detected in the flag of the sequentially entered packet, the packets stored in the buffer for the channel related appending information up until then are transferred to the judgement unit 507 (step S175 to S178).

When it is judged that the entered packet contains the contents information according to the flag of that packet, this packet is transferred to the channel decoder 509 (step S111).

The master key generation unit 504 carries out the processing according to the flow chart of FIG. 16 described above.

Figure 22:
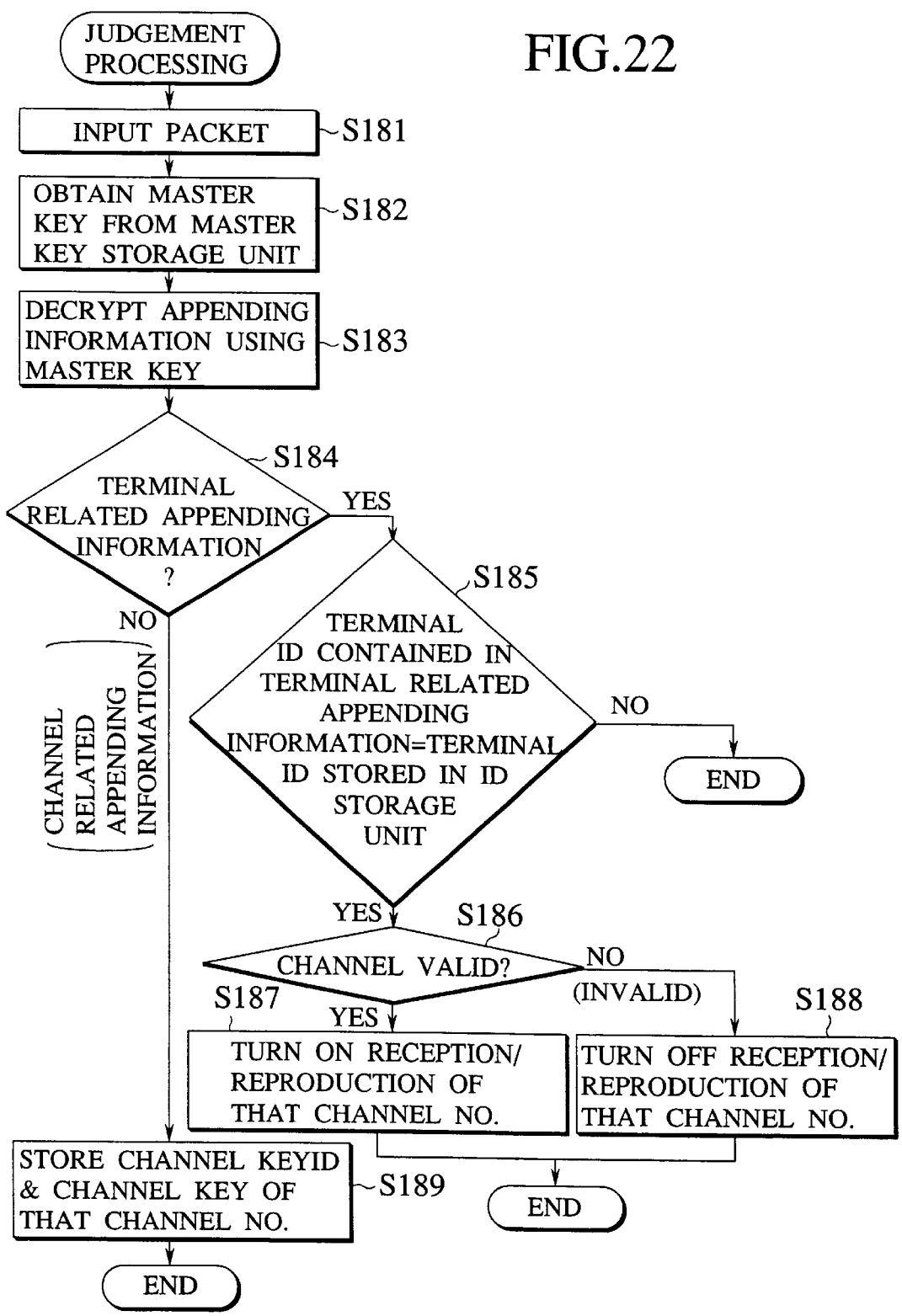
FIG. 22 is a flow chart of a judgement processing in the broadcast reception device of FIG. 14 in the case of using a terminal related appending information and a channel related appending information.

As shown in the flow chart of FIG. 22, upon receiving the packets from the filter 503, the judgement unit 507 first reads out the master key Km from the master key storage unit 505, and then decrypts the appending information extracted from these packets using the master key Km (steps S181 to S183).

When it is judged that the entered packet contains the terminal related appending information according to the flag of that packet, the judgement unit 507 extracts the terminal ID from the terminal related appending information, compares it with the own terminal ID that is stored in advance in the ID storage unit 506, and executes the subsequent processing from the step S186 on only when they coincide. When they do not coincide, the processing is stopped (step S185).

At the step S186, the channel number and the corresponding valid/invalid information are extracted from the terminal related appending information, and if the channel number is indicated as "valid", the processing proceeds to the step S187 where it is controlled to be capable of carrying out the decryption/reproduction of the contents information of that channel. To this end, it is possible to provide an array information for the purpose of controlling ON/OFF of respective channels, and set a value "1" for the channel when that channel is indicated as "valid". Also, if the channel number is indicated as "invalid", the processing proceeds to the step S188 where it is controlled to be incapable of carrying out the decryption/reproduction of the contents information of that channel. For example, a value "0" is set for that channel in the above described array information.

When it is judged that the entered packet contains the channel related appending information according to the flag of that packet, the judgement unit 507 extracts the channel key ID and the channel key from the channel related appending information, and stores them into the channel sub-key storage unit 508 in correspondence to that channel number.

Figure 23:
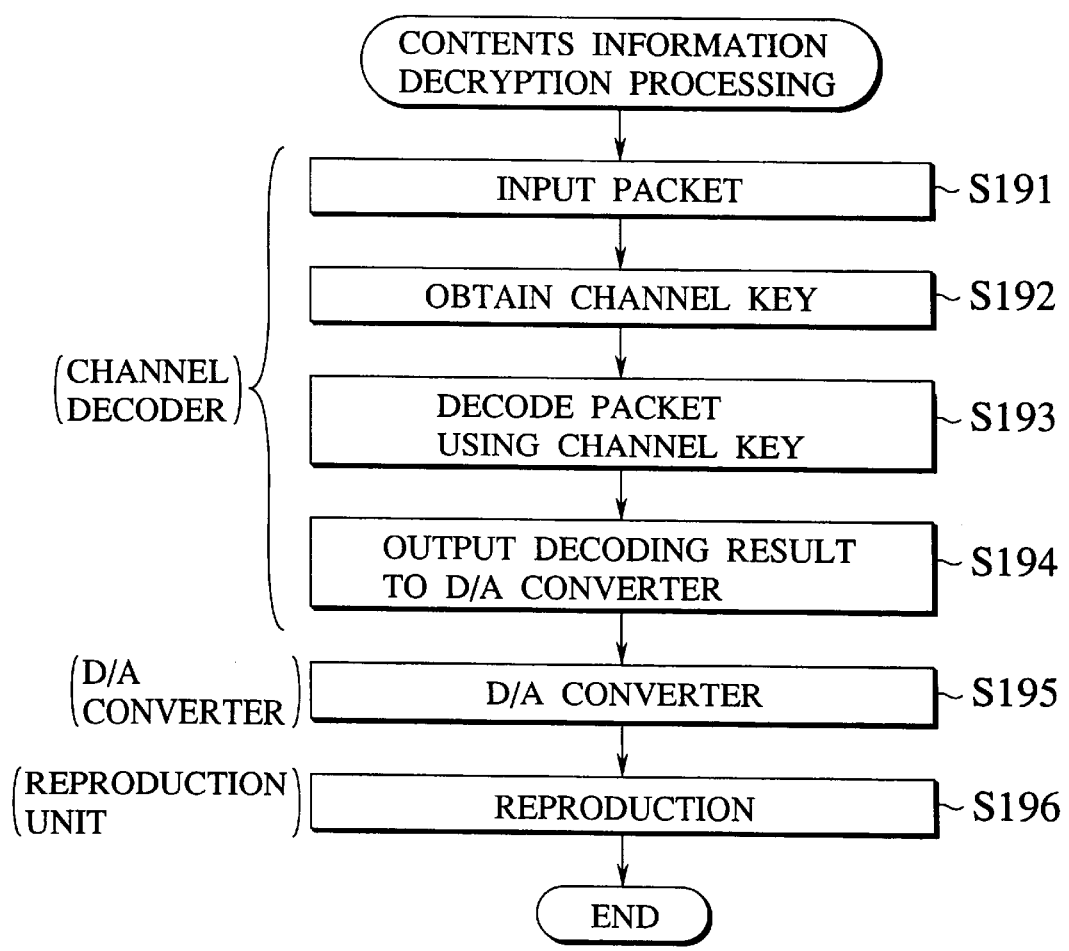
FIG. 23 is a flow chart of a contents information decryption processing in the broadcast reception device of FIG. 14 in the case of using a terminal related appending information and a channel related appending information.

As shown in the flow chart of FIG. 23, the channel decoder 509 extracts the contents information from a packet transferred from the filter 503, decrypts it using the channel key extracted earlier, and outputs it to the D/A converter 510 (steps S191 to S194).

The D/A converter 510 converts the contents information transferred from the channel decoder 509 into analog signals (step S195), and the reproduction of the analog signals is carried out at the reproduction unit 511 (step S196).

As described above, the channel related appending information is common to all the reception devices, and the terminal related appending information becomes shorter compared with the appending information containing the channel (sub-)key, so that it becomes possible to save the broadcast bandwidth necessary in delivering the contract control information as the appending information.

Referring now to FIG. 24 to FIG. 30, the second embodiment of a conditional access broadcast system according to the present invention will be described in detail.

Figure 24:
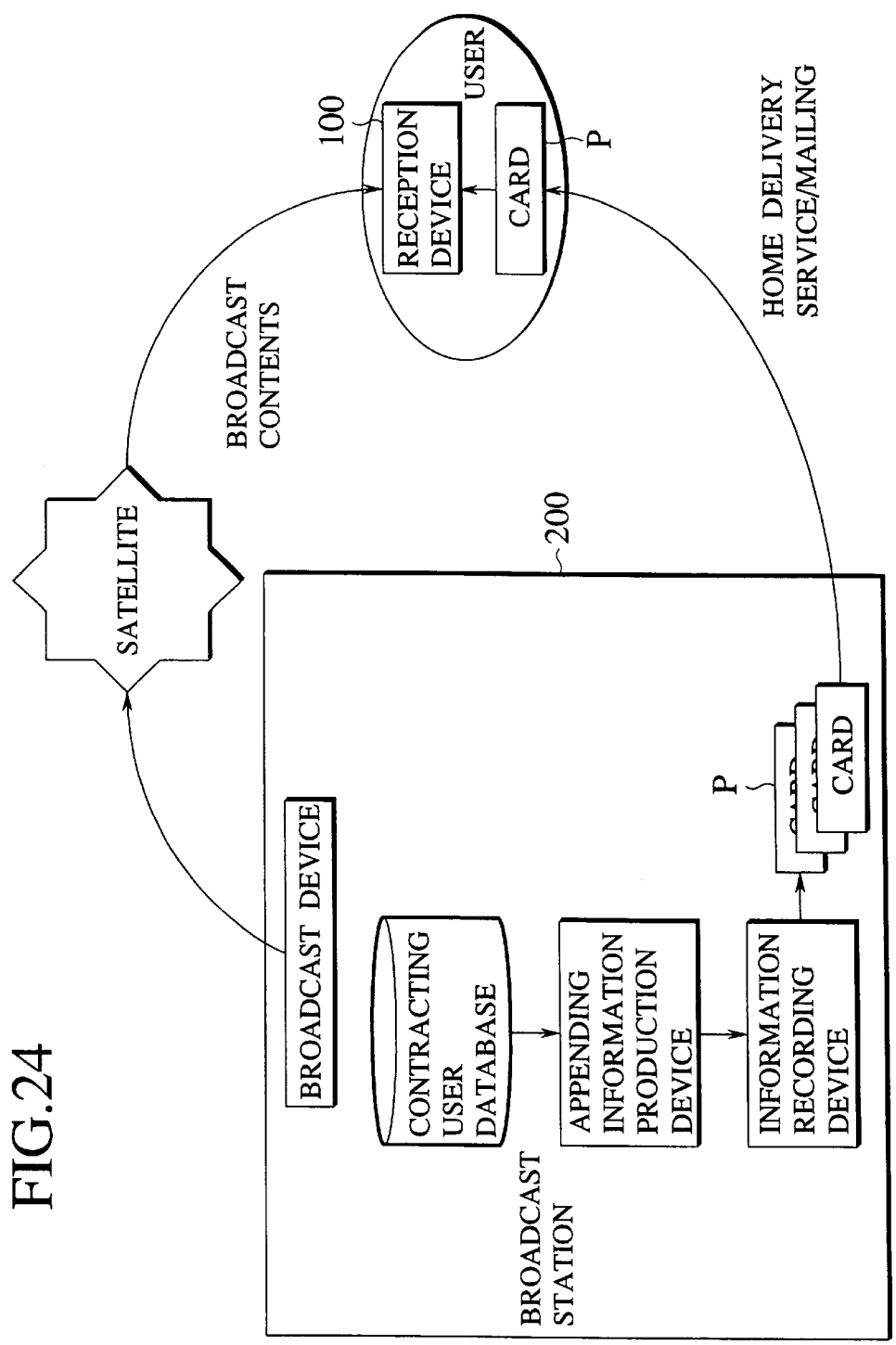
FIG. 24 is a schematic block diagram showing a broadcast system using a contract management device and a broadcast reception device according to the second embodiment of the present invention.

(1) Overview of the Broadcast System:

Instead of delivering the appending information to the contracting reception devices by broadcast, it is also possible to deliver the appending information as shown in FIG. 24.

FIG. 24 shows a schematic configuration of the broadcast system using the contract management device and the broadcast reception device according to the second embodiment, for an exemplary form of service in which contents are to be provided to a reception device 100 of each user who has the reception contract, from a broadcast station 200 through a satellite.

This second embodiment of FIG. 24 differs from the first embodiment in that, instead of delivering the appending information for the contract management to each contracting user by broadcast, the appending information is recorded in a portable card shaped recording medium (referred to simply as a card hereafter) P such as a magnetic card for example, and this card P is delivered by the home delivery service or the mail to the user. The contracting user can receive the contracted channels by operating the reception device 100 to read the information recorded in the received card P.

Figure 25:
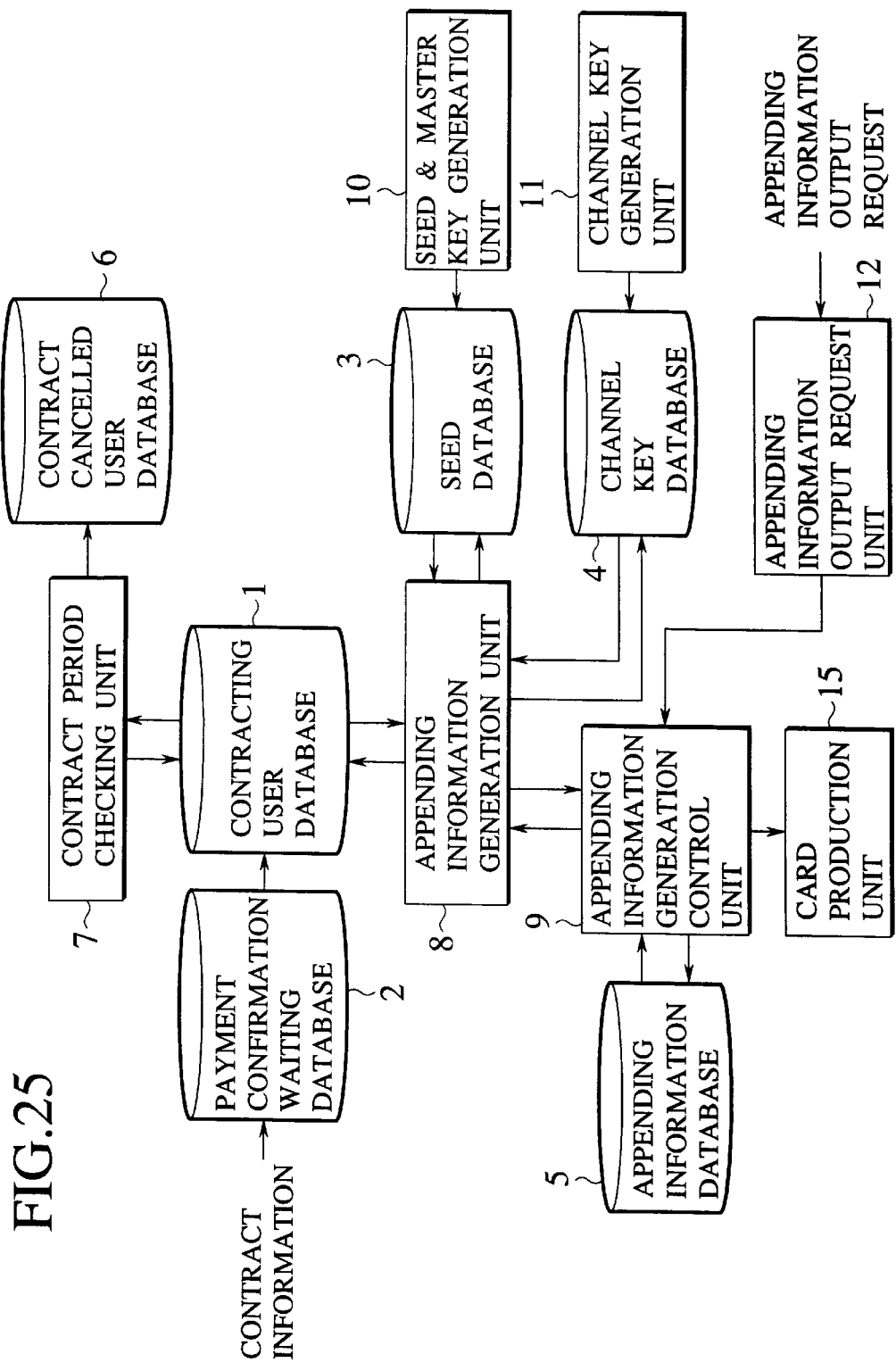
FIG. 25 is a block diagram showing an exemplary configuration of a contract management device according to the second embodiment of the present invention.

(2) Contract Management Device:

FIG. 25 shows an exemplary configuration of a contract management device according to this second embodiment, where the elements identical to those in FIG. 3 are given the same reference numerals and their description will be omitted. In FIG. 25, the broadcast device 13 of FIG. 3 is replaced by a card production unit 15, such that the appending information is recorded in a card shaped recording medium (card) such as magnetic card, IC card, etc., and this card is delivered to the contracting user, rather than delivering the appending information through the terrestrial or satellite broadcast.

Figure 8:
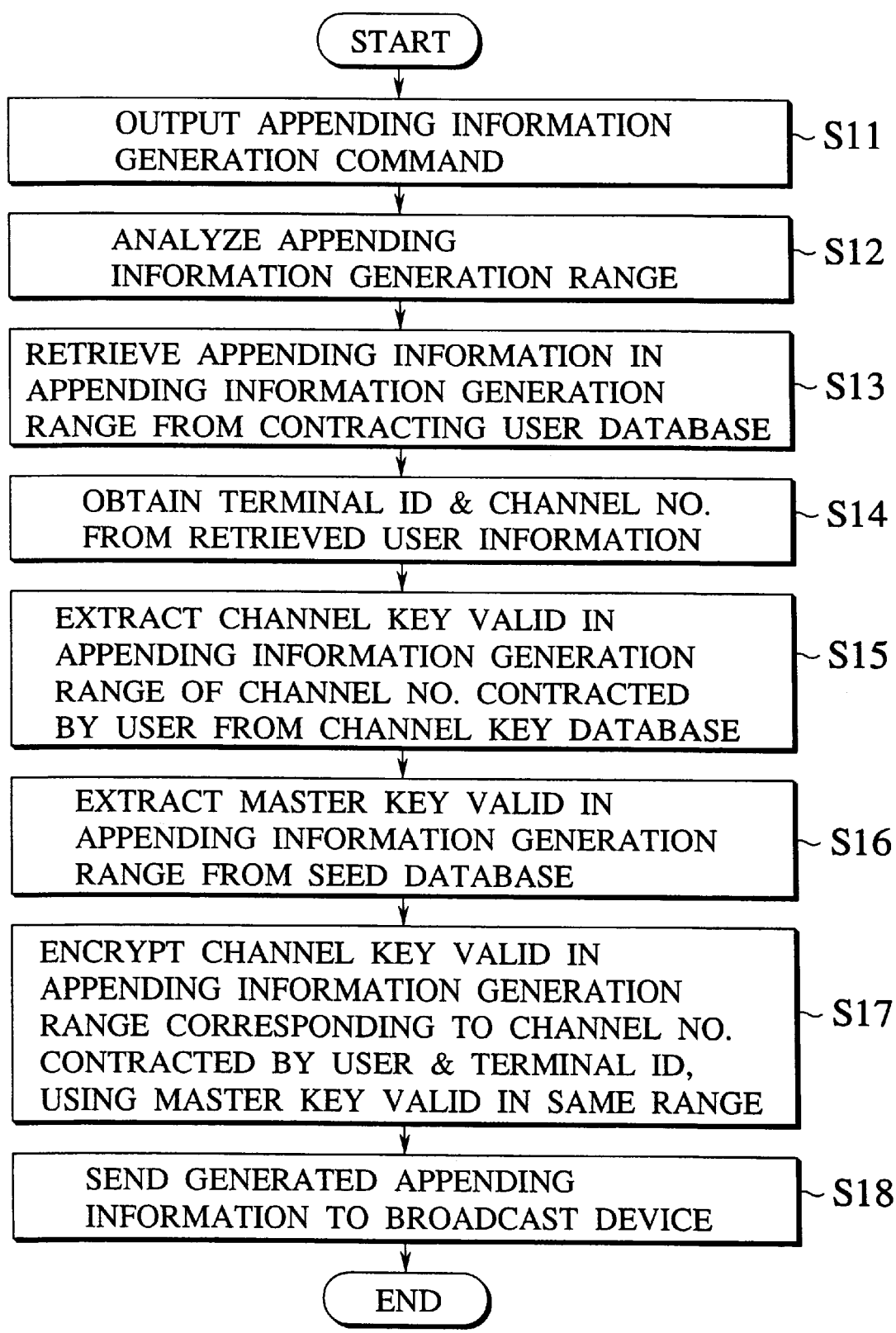
FIG. 8 is a flow chart of a processing in the contract management device of FIG. 3.

When the command from the appending information generation control unit 9 is "send an appending information for contracting users who have the contract for four months from Dec. 1, 1997", it is necessary in the contract management device of FIG. 3 described above to produce the appending information every month so that it is necessary to retrieve the valid channel key and the valid master key and carry out the processing of the flow chart of FIG. 8 every month. In contrast, in the contract management device of FIG. 25, it suffices to write the appending information corresponding to the channel keys of the contracted channels for coming four months in the magnetic card for example and deliver the card to the user, without using the broadcasting. In this way, it becomes unnecessary to deliver the appending information every month so that it is convenient for both the broadcast station side and the user side in a sense that tediousness can be reduced.

Figure 26:
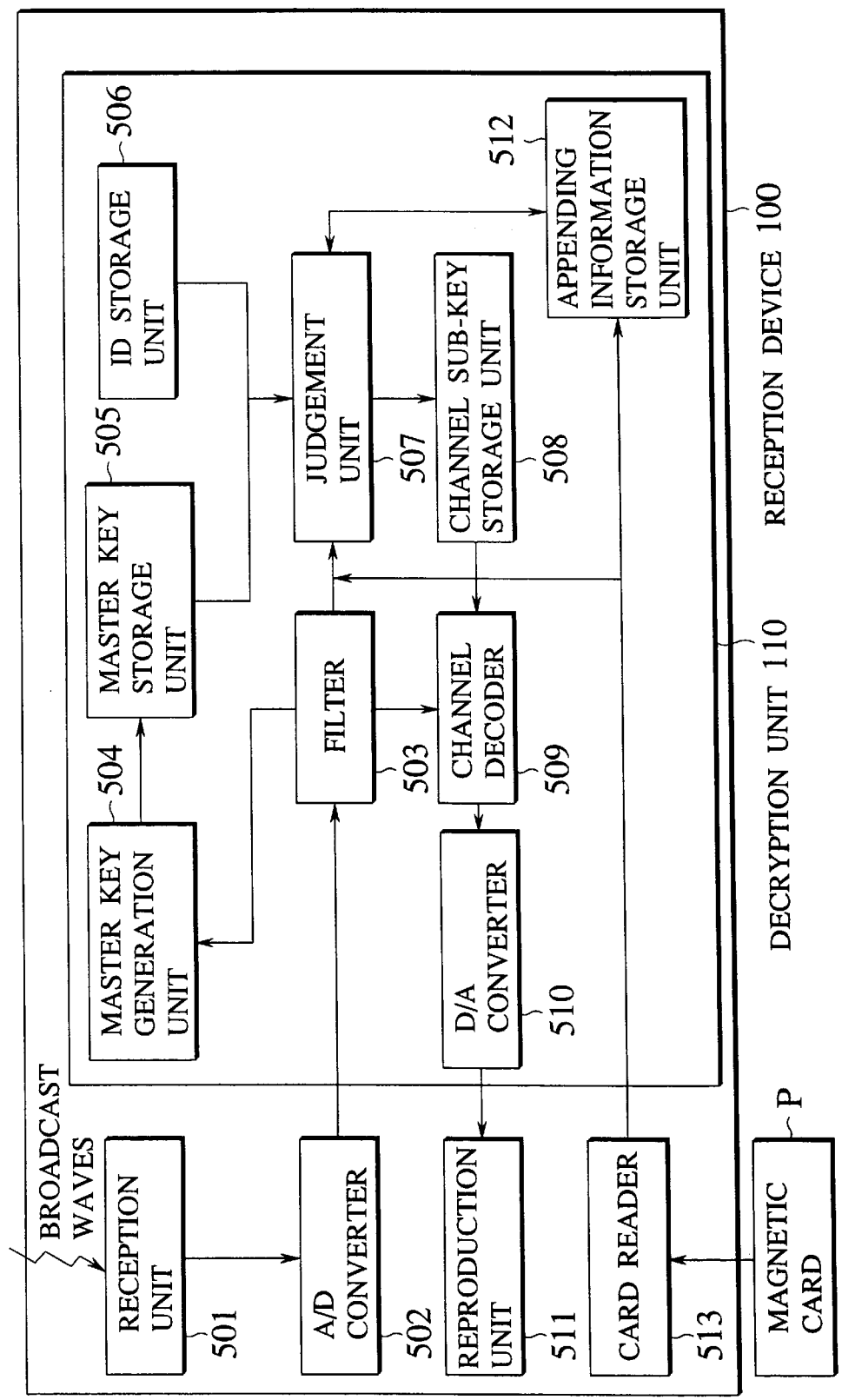
FIG. 26 is a block diagram showing an exemplary configuration of a broadcast reception device according to the second embodiment of the present invention.

(3) Reception Device:

FIG. 26 shows an exemplary configuration of the reception device 100 according to this second embodiment, which reads out the appending information from the card produced by the contract management device provided at the broadcast station side as shown in FIG. 25 and receives broadcast waves outputted from the contents information delivery device as shown in FIG. 10.

Here, the broadcast waves to be received at the reception device 100 shown in FIG. 26 are assumed to contain the following information.

Master key seed

Channel sub-key L

Channel sub-key ID

[Contents]Kch

The channel sub-key ID is an ID for identifying the channel sub-key contained in the appending information, and it is unnecessary when the change of the channel sub-key always takes place in conjunction with the change of the master key.

In the card P, the appending information encrypted using the master key is recorded.

The appending information is assumed to contain the following information.

Terminal ID:

Channel number (or channel numbers)

Channel sub-key ID

Channel sub-key H

Note that the appending information may also contain an authentication code (which may be given by appropriate prescribed bit sequence, for example) for the purpose of judging whether the decryption using the master key has been carried out correctly or not at the judgement unit 507.

The appending information recorded in the card P may not necessarily be one, and a plurality of appending information with different channel sub-keys H and the encryption keys may be recorded in the case where the contract period extends over plural update timings for the master key or the channel sub-key H.

FIGS. 27A and 27B show examples of the appending information to be recorded in the card P. FIG. 27A is for the case where the update timings for the master key Km and the channel sub-key H are the same (one month for example), while FIG. 27B is for the case where the update timing for the master key Km is two months whereas the update timing for the channel sub-key H is one month, for example, and both show the appending information to be recorded in the card P when the user made contract for viewing or listening two channels (channels X and Y) for three months, When the update timings for the master key Km and the channel sub-key H are the same as shown in FIG. 27A, the card records three appending information each containing the channel sub-key H of each channel for each month which is encrypted using the master key Km of each month. In this case, there is only one channel sub-key H for each channel, so that the channel sub-key ID is not absolutely necessary.

When the update timings for the master key Km and the channel sub-key H are different as shown in FIG. 27B, the appending information generated by being encrypted using one master key may record plural channel sub-keys (for two months for example) for each channel depending on the contract period. In such a case, each channel sub-key is identified by the channel sub-key ID.

Note that in either case of FIG. 27A and FIG. 27B, the information unit to be encrypted using one master key may contain an authentication code.

Next, with references to the flow charts of FIG. 28 to FIG. 30, the processing of the reception device of FIG. 26 will be described in further detail. Here, the case where the appending information recorded in the card P is as shown in FIG. 27B will be described as an example.

First, in FIG. 28, the user inserts the card P delivered from the broadcast station side into a card reader 513. The card reader 513 then reads out the appending information from the inserted card P, and stores it into an appending information storage unit 512 (step S201).

Next, in FIG. 29, when a reception unit 501 receives the broadcast waves, an A/D converter 502 converts them into digital signals, assembles packets from information contained in these signals and outputs them to a filter 503 (steps S101 to S102).

Each packet has a flag information that enables to distinguish whether that packet is a packet containing the master key seed, a packet containing the channel sub-key ID, or a packet containing the contents information. In addition, the last packet for the master key seed has an end flag recorded therein.

The filter 503 has sufficiently large buffers for the master key seed and the appending information respectively.

When it is judged that the entered packet contains the master key seed according to the flag of that packet, this packet is added to the buffer for the master key seed, and when the end flag is detected in the flag of the sequentially entered packet, the packets stored in the buffer for the master key seed up until then are transferred to a master key generation unit 504 (step S103 to S106).

When it is judged that the entered packet contains the channel sub-key ID according to the flag of that packet, this packet is outputted to the judgement unit 507 (steps S211 to S213).

When it is judged that the entered packet is other than the above two according to the flag of that packet, that is, when it is judged that the entered packet contains the contents information and the channel sub-key L according to the flag of that packet, this packet is transferred to the channel decoder 509 (step S213).

The processing of the master key generation unit 504 is the same as that of the flow chart of FIG. 16 described above.

Next, the judgement unit 507 carries out the processing as shown in the flow chart of FIG. 30. Here the appending information recorded in the card P is not necessarily one so that a variable "i" is used as an index for a plurality of appending information recorded in the card P, and each appending information is regarded as a valid appending information upon checking the authentication code for judging whether the decryption using the master key has been carried out correctly or not, which is contained in each appending information.

First, the variable "i" is set to a value "0" (step S221), and the appending information stored in the appending information storage unit 512 is read out one by one (steps S222 and S223). Then, the master key Km stored in the master key storage unit 505 is read out (step S224) and the appending information is decrypted using the master key Km (step S225). When the authentication code is contained in the decrypted appending information, whether that authentication code is a correct one or not is checked (step S226).

When the authentication code is a correct one, it can be judged that it is a valid appending information that has been decrypted using the proper master key within the contract period. Consequently, the judgement processing subsequent to the step S228 is executed according to this appending information. On the other hand, when the authentication code is an incorrect one, the variable "i" is incremented by one (step S227) and the steps S222 to S226 are repeated by reading the next appending information stored in the appending information storage unit 512.

At the step S228, the terminal ID is extracted from the appending information, compared with the own terminal ID that is stored in advance in an ID storage unit 506, and the subsequent processing is executed only when they coincide. When they do not coincide, the processing is stopped.

Next, the channel sub-key ID for each channel is extracted from the packet transferred from the filter 503, and the channel sub-key ID for each channel is taken out from the appending information one by one, and they are compared (step S229). When they coincide, the channel sub-key H corresponding to that channel sub-key ID is extracted from the appending information and stored into the channel sub-key storage unit 508 (step S231). When they do not coincide, the next channel sub-key ID of that channel number is taken out from the appending information and compared with the channel sub-key ID extracted from the packet earlier (steps S229 and S230).

The processing of the channel decoder 509, the D/A converter 510 and the reproduction unit 511 is the same as that of the flow chart of FIG. 18 described above.

At this point, the terms used in the following description will be defined.

An information describing a contract state of each channel in order to realize the conditional access will be referred to as a contract information. For example, the channel number is assigned to each channel, and the contract state of the channel can be expressed according to whether a bit corresponding to the channel number is "1" or not. This form of the contract information will be specifically referred to as a channel contract information.

Besides this, the contract information can be given in a variety of forms. For example, a set of the channel sub-key H and the channel number as shown in FIG. 11B can be regarded as the contract information indicating that the channel of that channel number is covered by the contract, and a set of the channel number and the valid/invalid information as shown in FIG. 12 can be regarded as the contract information indicating the contract state of that channel number.

The contract information and the reception device ID are mutually linked together, and the reception device ID indicates an identifier of the reception device to which the linked contract information applies. In this sense, the contract information and the reception device ID can be regarded as a single entity so that a set of the reception device ID and the contract information may be simply referred to as the contract information. Hereafter, when there is a need to distinguish these two, the former will be referred to as the contract information in a narrow sense, and the latter will be referred to as the contract information in a broad sense.

Also, in the following embodiments, the contract information (a set of the contract information and the reception device ID) is delivered by broadcast in an encrypted form, or recorded in a recording medium such as magnetic card and delivered by mail (for the purpose of preventing the alteration or the elimination of disadvantageous contract information), and a data set to be encrypted together with the contract information here will be collectively referred to as a reception contract information. The contract information is contained in the reception contract information. In addition, the reception contract information appended with an information necessary for the present system such as data identifier will be referred to as a contract information packet.

The various embodiments of the present invention can be classified according to the levels by which the channel key and the contract information are separated. Namely, they can be distinguished according to how much of the channel key is to be contained in the reception contract information.

The first and second embodiments described above are directed to the case where a whole or a part of the channel key is to be contained in the reception contract information or the case where not a single bit of the channel key is to be contained in the reception contract information.

The third embodiment to be described below is directed to the case where a channel key decryption key for decrypting the encrypted channel key is to be contained in the reception contract information.

The fourth embodiment to be described below is directed to the case where the channel key itself is to be contained in the reception contract information.

The fifth embodiment to be described below is directed to a technique that is commonly applicable to the first to fourth embodiments, regarding a configuration of a latch unit for scan path test that is required for manufacturing purpose, in a charging control unit (charging chip).

Note that, in the following description of the third and subsequent embodiments, a constituent element for realizing a mechanism of the conditional access within the broadcast reception device will be referred to as a charging control unit. Here, the charging control unit is formed by hardware and preferably large scale integrated. Such as LSI charging control unit may also be referred to as a charging chip. In any case, the charging control unit contains secret information for the purpose of the conditional access, so that it is assumed to have a tamper resistant structure in which the internal memory and the hardware structure cannot be easily read, written or changed from the external.

Also, the master key common to all the broadcast reception devices is written in the internal memory of the charging control unit, and mainly used in decrypting the reception contract information. Also, the reception device ID is set up individually for each broadcast reception device, and recorded in a non-volatile memory inside the charging control unit.

These terms are related to the terms used in the first and second embodiments described above as follows. Namely, the reception contract information corresponds to the appending information of the first and second embodiments, the charging control unit corresponds to the decryption unit of the first and second embodiments, and the reception device ID corresponds to the terminal ID of the first and second embodiments. Also, the channel identifier and the information identifier used in the third and fourth embodiments correspond to the channel number and the flag information of the first and second embodiments, respectively.

Referring now to FIG. 31 to FIG. 50, FIG. 68 to FIG. 70 and FIG. 72 to FIG. 78, the third embodiment of a conditional access broadcast system according to the present invention will be described in detail.

(1) Broadcast Reception Device:

FIG. 31 shows an exemplary configuration of a broadcast reception device according to this third embodiment.

Figure 32:
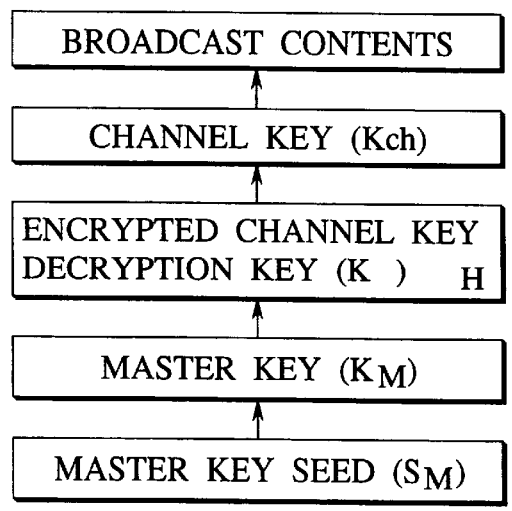
FIG. 32 is a diagram showing four stage key structure used in encrypting broadcast contents in the third embodiment of the present invention.

The broadcast contents of this third embodiment is protected by the four stage encryption mechanism as shown in FIG. 32. The channel key Kch is a key for descrambling the scrambled broadcast contents, which is different for each channel in general and changed in a short period of time.

Figure 33:
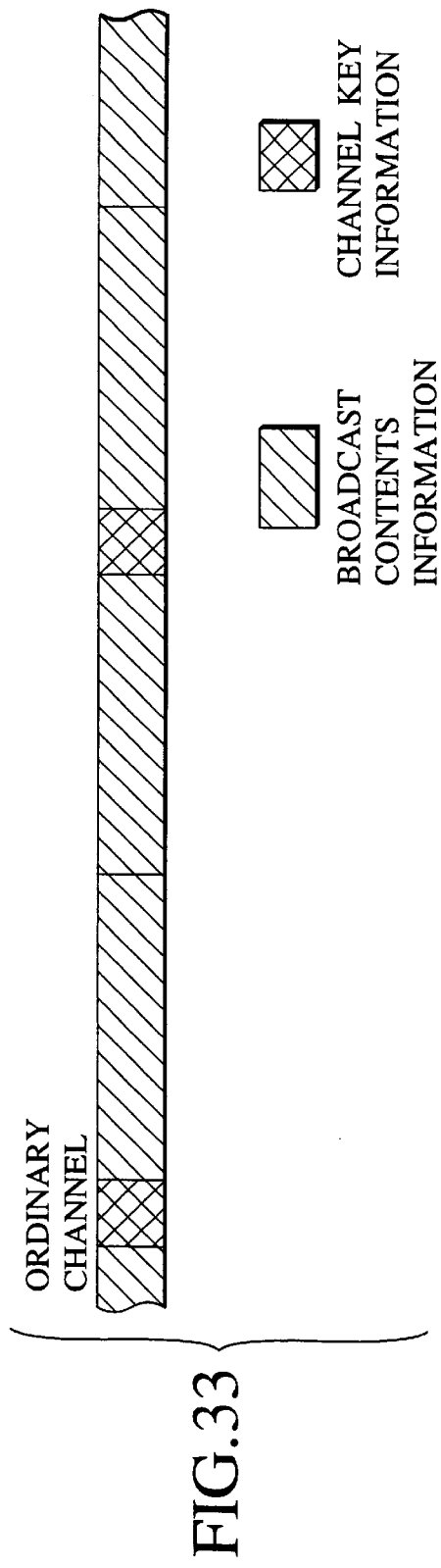
FIG. 33 is a diagram showing an exemplary information structure delivered by an ordinary channel in the third embodiment of the present invention.

As shown in FIG. 33, the broadcast waves contain two types of information (broadcast contents information, channel key information). Here, the broadcast contents are descrambled using the channel key Kch obtained from the channel key information.

Returning now to FIG. 32, the channel key Kch contained in the channel key information is encrypted, and can be decrypted using the channel key decryption key $K_H$. This channel key decryption key $K_H$ is not channel dependent and commonly used in the system, and contained in the encrypted reception contract information.

The encrypted reception contract information is decrypted using the master key $K_M$ which is commonly provided with respect to all the broadcast reception devices in advance. In addition, the master key $K_M$ is regularly changed according to the master key seed $S_M$.

In order to descramble the scrambled broadcast waves, it is necessary to obtain the channel key Kch, and in order to obtain the channel key Kch, it is necessary to decrypt the encrypted channel key, where the decryption key $K_H$ is contained in the encrypted reception contract information. The encrypted reception contract information is decrypted using the master key $K_M$. Also, the reception contract information decrypted using the master key contains the contract information in a narrow sense for each reception device in correspondence to the reception device ID, and the broadcast reception device obtains this upon judging that it is for the own broadcast reception device and stores it into the contract information storage unit.

At a time of receiving broadcast, the contract information in the contract information storage unit is referred, and the channel key Kch obtained as described above is sent to the descrambling unit only when that channel is the contracted one, so as to descramble the broadcast waves.

In such a system, it is necessary to obtain the channel key decryption key $K_H$ in order to obtain the channel key Kch, and further the contract information and the channel key decryption key $K_H$ become inseparable due to the encryption of the reception contract information, so that it becomes necessary to obtain the contract information in order to obtain the channel key decryption key $K_H$ and therefore it becomes possible to enforce the user to obey the contract faithfully.

Figure 34:
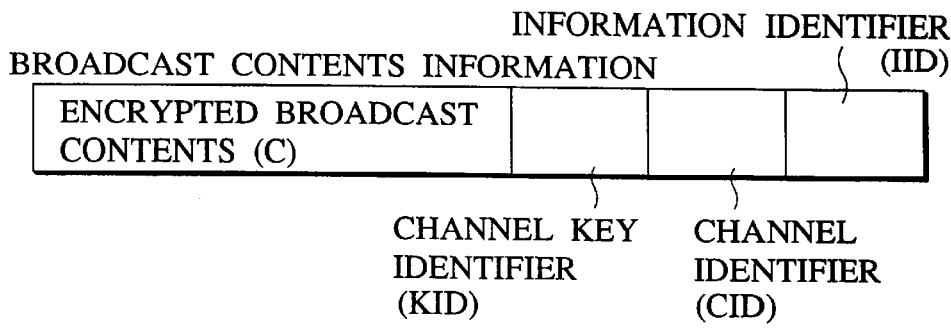
FIG. 34 is a diagram showing an exemplary structure of a broadcast contents information delivered by the ordinary channel of FIG. 33.

Further details of this third embodiment will now be described. The channels received at the broadcast reception device of this third embodiment include an ordinary channel and a contract information channel, where the broadcast contents are usually transmitted through the ordinary channel in a structure shown in FIG. 33. Here, the broadcast contents information can be divided into encrypted broadcast contents (C), a channel key identifier (KID), a channel identifier (CID), and an information identifier (IID) as shown in FIG. 34.

Here the information identifier indicates that the corresponding information is the broadcast contents information, which may be given in a form of "0001", for example. Also, the channel identifier is an information for identifying the channel to which the corresponding broadcast contents information belongs. Also, the channel key identifier is an information for identifying the channel key that can decrypt the corresponding encrypted broadcast contents information. Their usages and structures will be described in detail later.

Figure 35:
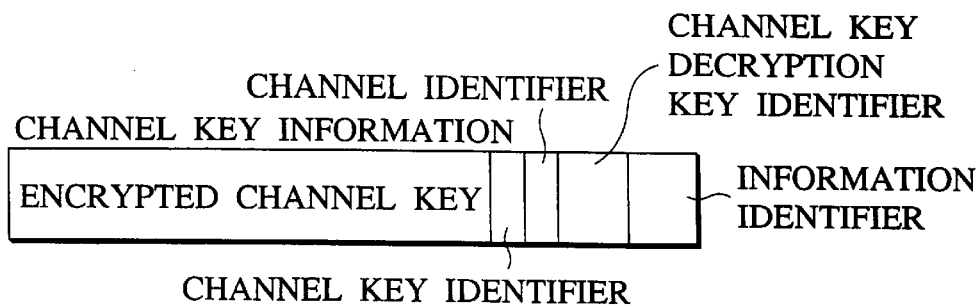
FIG. 35 is a diagram showing an exemplary structure of a channel key information delivered by the ordinary channel of FIG. 33.

On the other hand, the channel key information comprises encrypted channel key, a channel key identifier, a channel identifier, a channel key decryption key identifier, and an information identifier, as shown in FIG. 35.

Here the channel key identifier is an information for identifying the corresponding channel key, which is utilized at a time of decrypting the encrypted contents. The channel identifier is an information for indicating the channel of the contents information that can be decrypted using the corresponding channel key. The channel key decryption key identifier is used in identifying the decryption key of the encrypted channel key. Their usages and structures will be described in detail later. The information identifier indicates that the corresponding information is the channel key information, which may be given in a form of "0002", for example, in order to distinguish it from the other information such as the broadcast contents information.

Figure 36:
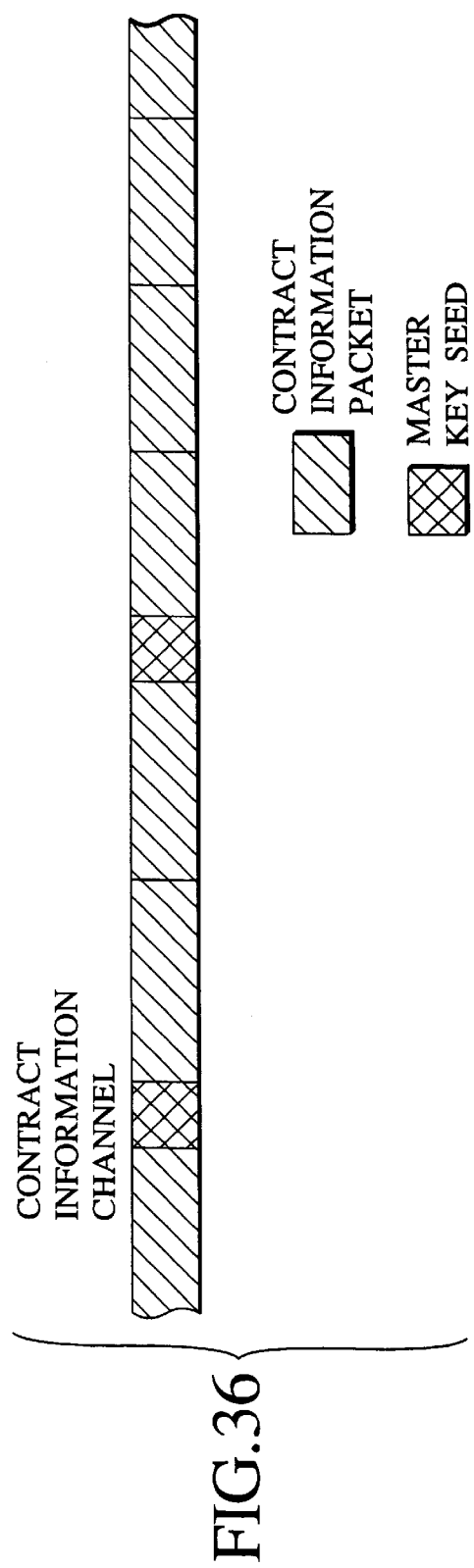
FIG. 36 is a diagram showing an exemplary information structure delivered by a contract information channel in the third embodiment of the present invention.

The contract information channel has a structure as shown in FIG. 36, which comprises a contract information packet and a master key seed.

Here, as shown in FIG. 37, the contract information packet comprises an encrypted reception contract information, a channel key decryption key identifier, a master key identifier, and an information identifier.

The channel key decryption key identifier is an information for identifying the channel key decryption key that is contained in the corresponding reception contract information, which is used in identifying the decryption key at a time of decrypting the encrypted channel key. The master key identifier is used in identifying the master key that can decrypt the encrypted reception contract information contained in the corresponding contract information packet. The information identifier indicates that the corresponding information is the contract information packet, which may be given in a form of "0003", for example.

As shown in FIG. 38, the reception contract information comprises a reception device ID, a channel contract information, and a channel key decryption key $K_H$. The reception device ID is an identifier (ID) unique to the corresponding reception device, which is used in judging whether the contract information for the corresponding reception device or not. The channel contract information indicates the contract state of the corresponding reception device by allocating one bit to each one of a plurality of channels that can be provided to the user, and setting "1" to the bit corresponding to the contracted channel of the user while setting "0" to the other bits. The channel key decryption key $K_H$ is a key for decrypting the channel key Kch.

As shown in FIG. 39, the master key seed information comprises a master key seed, a master key identifier, and an information identifier. The master key seed is a seed information for the purpose of generating the master key. The master key identifier is an identification information of the master key generated using the corresponding master key seed. The information identifier indicates that the corresponding information is the master key seed information, which may be given in a form of "0004", for example.

Now, the role of the channel key identifier will be described.

As shown in FIG. 34, the broadcast contents information comprises the broadcast contents information C encrypted using the channel key, the channel key identifier KID, the channel identifier CID, and the information identifier IID.

The channel key identifier KID indicates the channel key that is used in encrypting the encrypted broadcast contents information C, which is an identifier (ID) assigned uniquely to each channel key. In this case, the channel key for decrypting the scrambled broadcast contents can be determined uniquely.

However, in practical implementation, it is not clear as to how long the corresponding channel key should be maintained, and there is also a problem that the length of each ID becomes rather long in order to define each ID uniquely so that a large memory capacity will be required. For this reason, the scheme of assigning a relative ID of one bit length can be used here. Namely, one bit ID of either "0" or "1" is assigned (alternately) to each channel key to be transmitted (in encrypted form), and when a new channel key is received, the channel key on the memory (as shown in FIG. 41) is updated.

Figure 40:
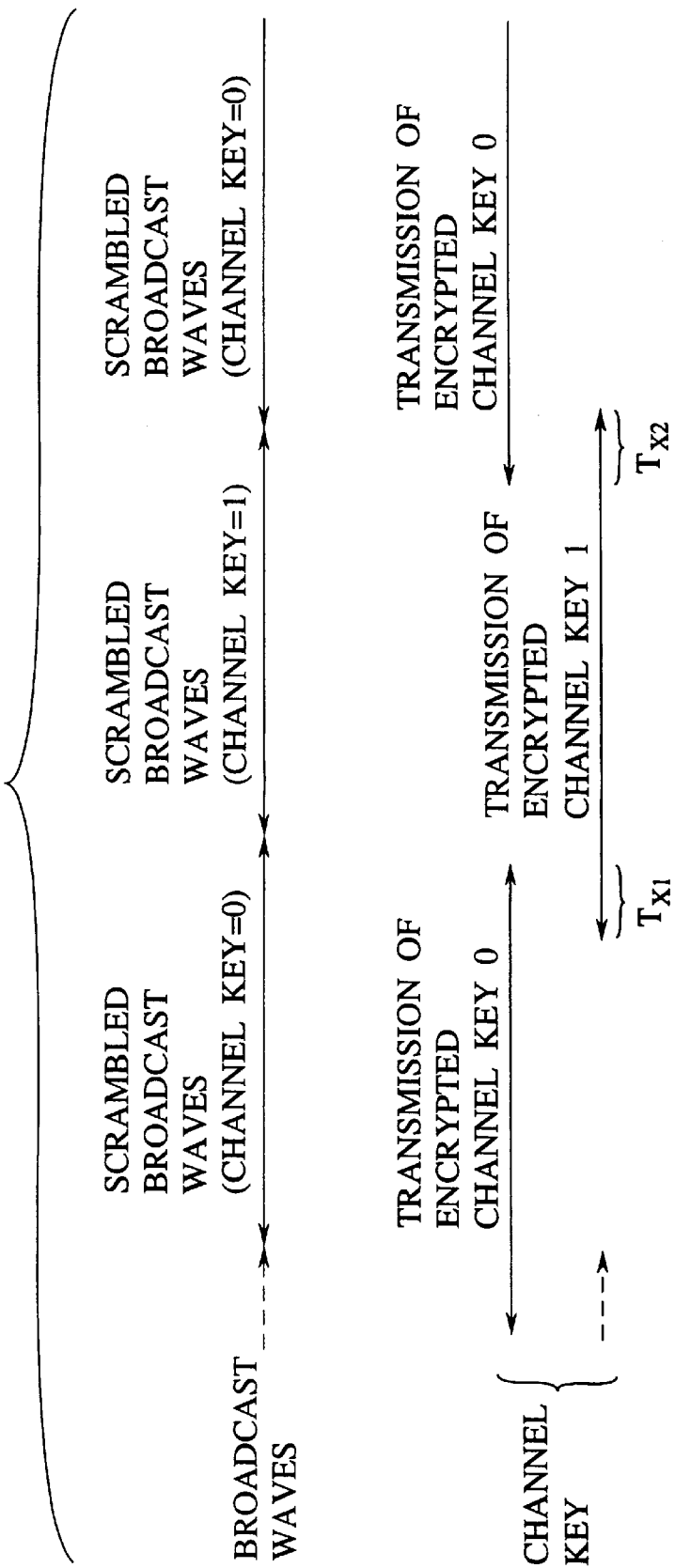
FIG. 40 is a diagram showing time zones at which transmissions of two channel keys overlap at a timing of channel key switching in the third embodiment of the present invention.
Figure 42:
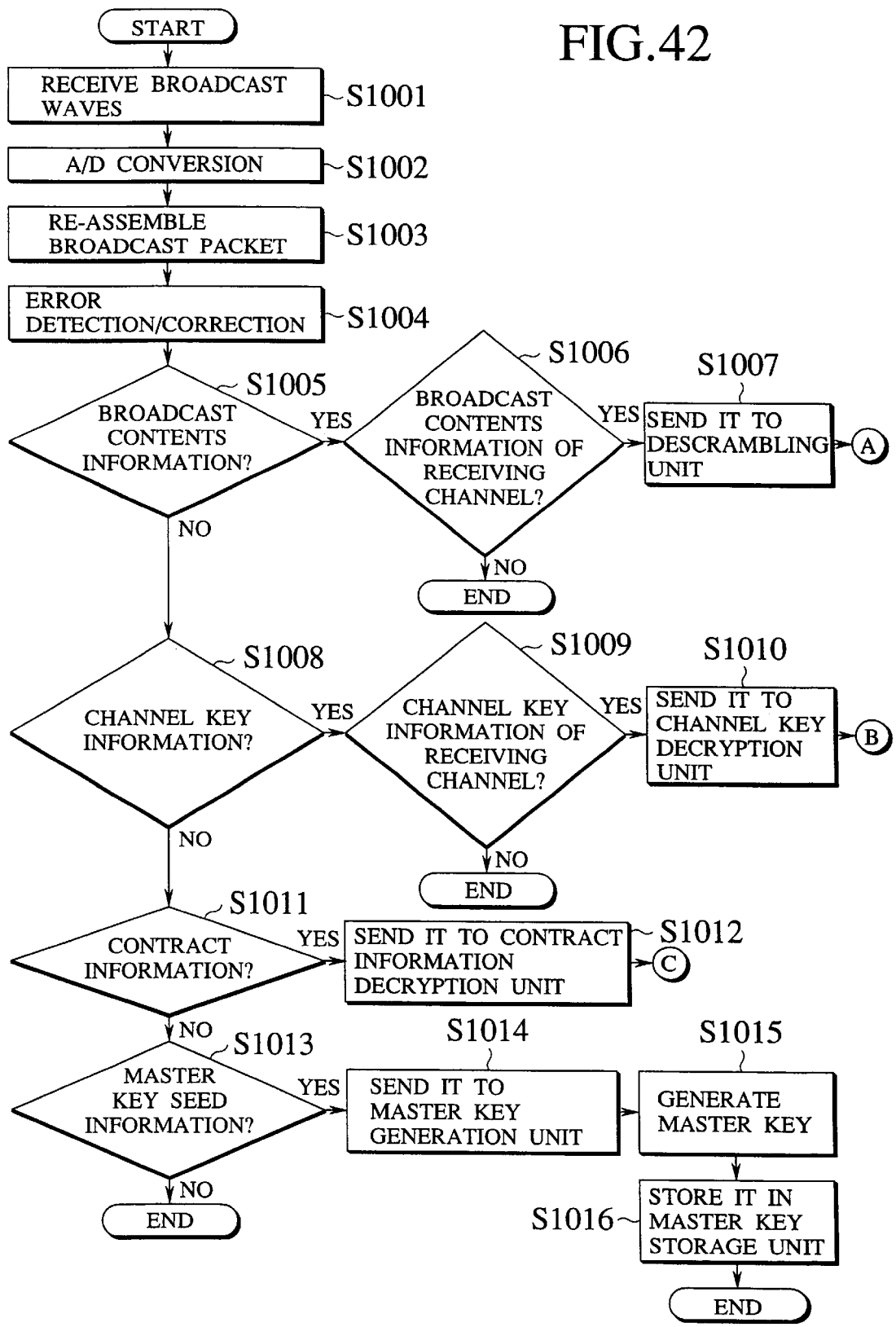
FIG. 42 is a flow chart of a processing in the broadcast reception device of FIG. 31.
Figure 43:
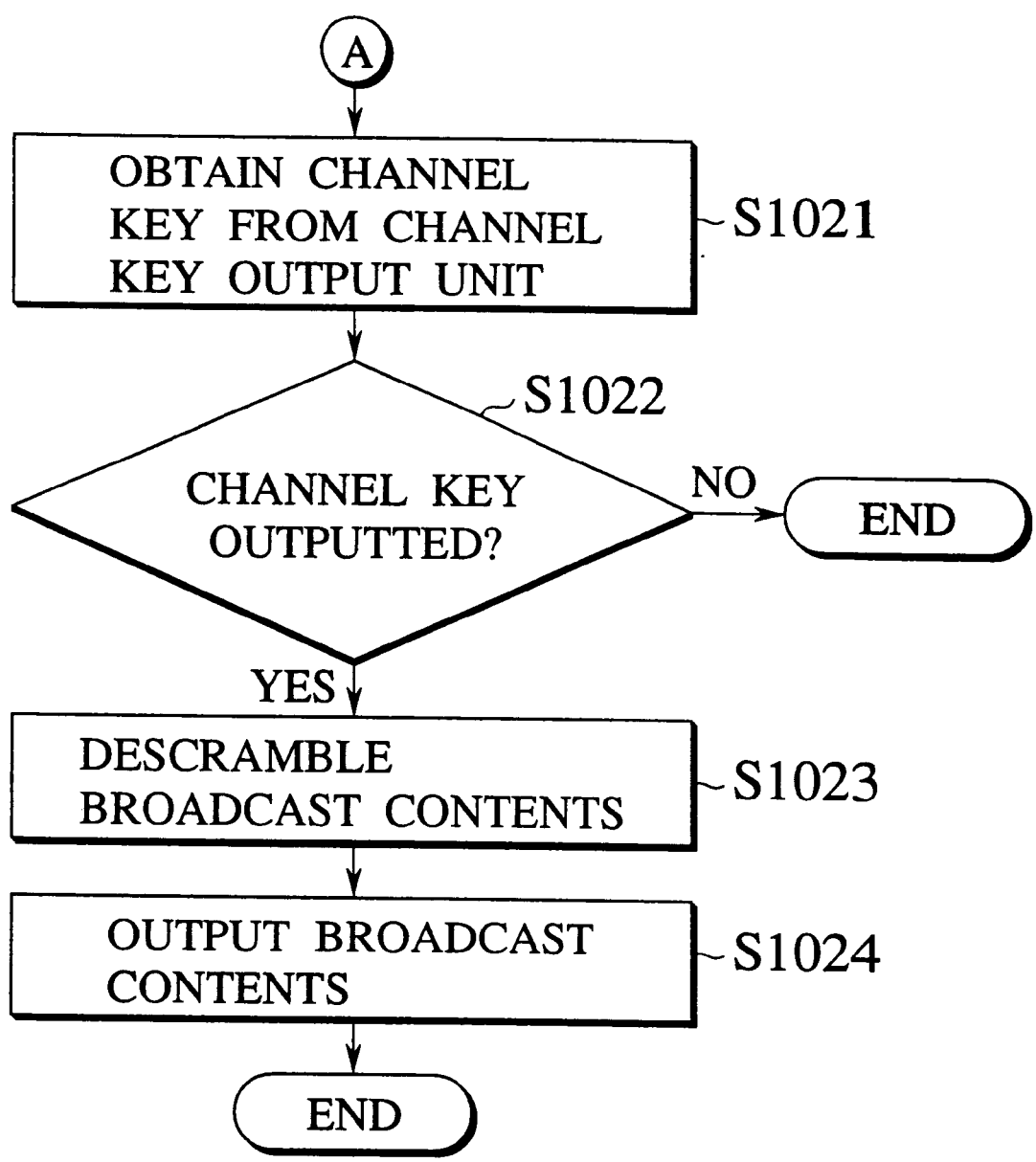
FIG. 43 is a flow chart of a processing with respect to broadcast contents in the broadcast reception device of FIG. 31.
Figure 44:
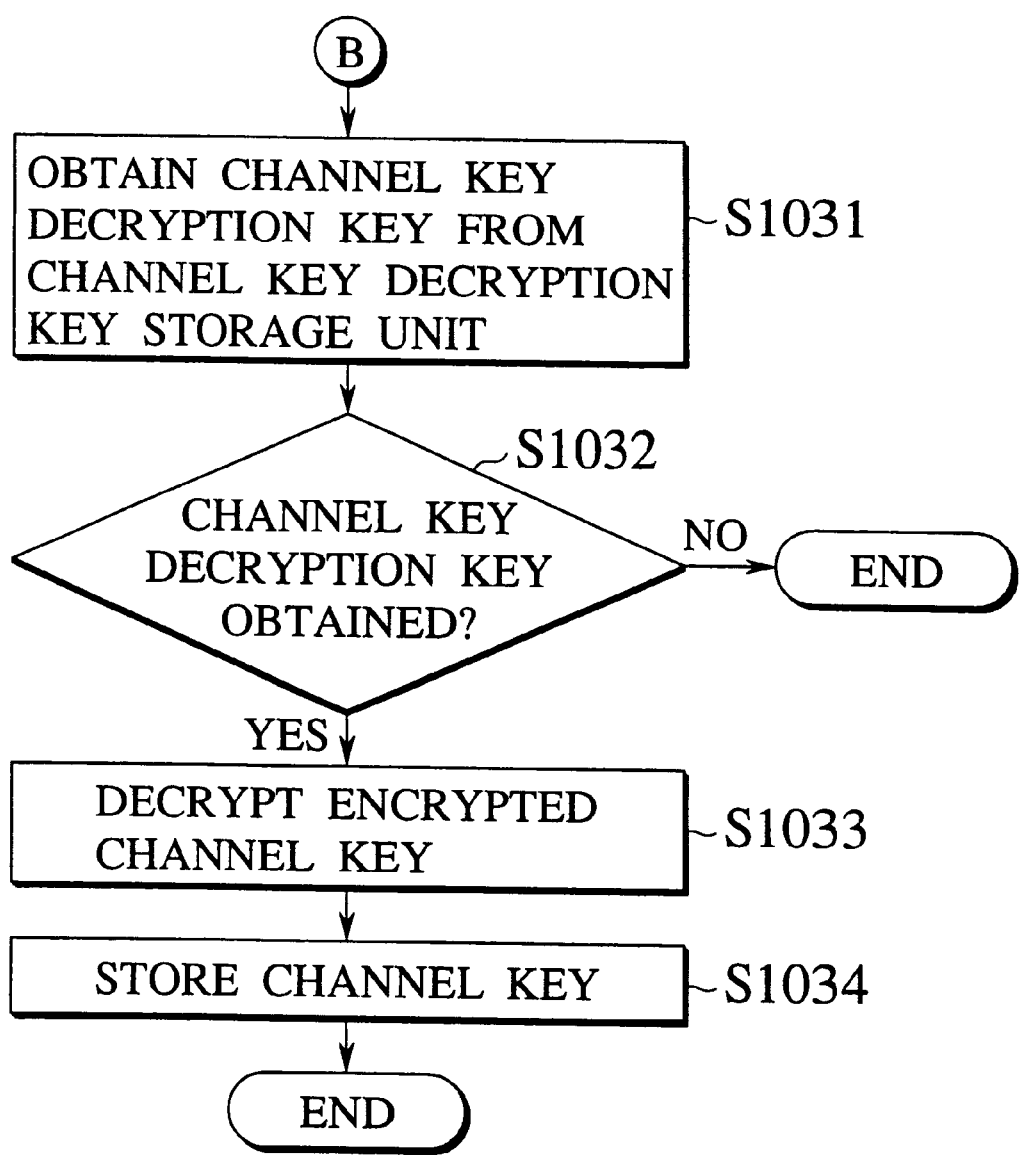
FIG. 44 is a flow chart of a processing with respect to a channel key information in the broadcast reception device of FIG. 31.
Figure 45:
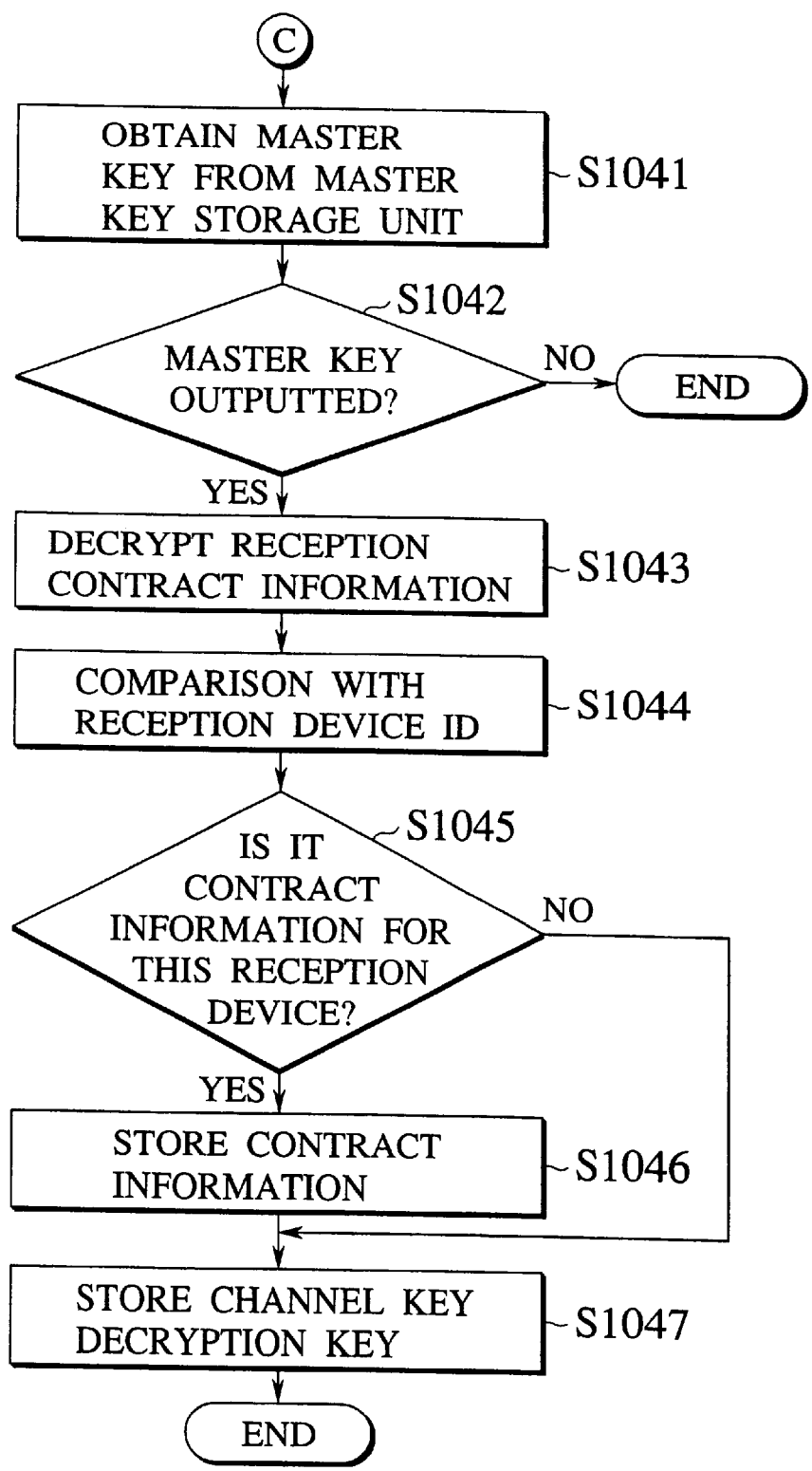
FIG. 45 is a flow chart of a processing with respect to a contract information packet in the broadcast reception device of FIG. 31.

In this case, (obviously) the new channel key must be sent prior to the transmission of the corresponding scrambled broadcast waves. As shown in FIG. 40, the transmission schedule to this end includes time zones (Tx1, Tx2) at timings for switching the channel keys at which the transmission of the channel key "0" and the transmission of the channel key "1" overlap, in consideration of a time required in completing the decryption and the storing of the key at all the broadcast reception devices. How long this time zone should be set depends on how long it is estimated to take for the broadcast reception device to decrypt the encrypted channel key and store it into the memory. In this way, it is possible to use the relative ID for the channel key ID.

The concept of the relative ID for the key can be similarly utilized for all the other keys (the channel key decryption key, the master key) used in this third embodiment.

Next, the configuration of the broadcast reception device of FIG. 31 and its operation will be described with references to the flow charts of FIG. 42 to FIG. 45.

The broadcast waves are received at a reception unit 1101 regardless of channels (step S1001). The received broadcast waves are then A/D converted by an A/D converter 1102 (step S1002), and the removal of noises introduced during transmission is carried out using the error correction codes or the like at an error detection/correction unit 1103 (steps S1003 and S1004).

The noise removed broadcast waves are then sent to a channel selection unit 1104, where the broadcast waves corresponding to the selected channel and the broadcast waves of the contract information channel are sent to a charging control unit 1106, using a channel selection interface 1105 for selecting a channel such as that of an ordinary TV set, for example.

The charging control unit 1106 sends them to a filter unit 1107, where they are separated into the broadcast contents information, the channel key information, the contract information packet, and the master key seed information. This separation is done according to each information identifier.

Now, when the received information is the master key seed information (step S1013), it is separated from the filter unit 1107 and entered into a master key generation unit 1111 (step S1014). The master key generation unit 1111 then separates the master key seed and the master key identifier from the master key seed information, generates the master key using the random number generation and the encryption algorithm (step S1015), and stores it into a memory indicated by the master key identifier ("0" or "1" of the relative ID, for example) (step S1016).

Here the generation algorithm and the secret information for the purpose of the random number generation are common to all the broadcast reception devices and the broadcast station, and concealed in a non-volatile memory in the charging control unit 1106 or a ROM which is inaccessible from the external. For this reason, it is possible to share the same one master key even when the non-encrypted seed is sent.

When the received information is the contract information packet (step S1011), it is sent from the filter unit 1107 to a contract information decryption unit 1110 (step S1012) The contract information decryption unit 1110 obtains the master key corresponding to the master key identifier contained in the contract information packet from a master key storage unit 1112 (step S1041). At this point, if the corresponding master key does not exist in the master key storage unit 1112, the processing is terminated. Here it is also possible to assume that the master key in a form of "NULL" ("0" in all bits) does not exist and judge that the master key is not stored when "NULL" is obtained.

When the master key is outputted (step S1042), the encrypted reception contract information contained in the contract information packet is decrypted using that master key (step S1043). Then, the reception device ID is obtained from the decrypted reception contract information, and an authentication unit 1114 compares it with the reception device ID stored in a reception device ID storage unit 1113 (step S1044). If they coincide (step S1045), the channel contract information linked with that reception device ID is stored into a channel contract information storage unit 1116 (step S1046). Regardless of whether they coincide or not, the channel key decryption key $K_H$ is stored into a memory indicated by the channel key decryption key identifier ("0" or "1" of the relative ID, for example) contained in that contract information packet (step S1047).

When the received information is the channel key information (step S1008), and it is the channel key information of the channel selected by the channel selection interface 1105 upon checking the channel identifier in that channel key information (step S1009), it is sent from the filter unit 1107 to a channel key decryption unit 1109 (step S1010).

The channel key decryption unit 1109 obtains the channel key decryption key corresponding to the channel key decryption key identifier contained in the channel key information from a channel key decryption key storage unit 1115 (step S1031). Here, similarly as in the case of obtaining the master key, if the channel key decryption key in a form of "NULL" is obtained, it is judged that the channel key decryption key is not stored yet and the processing is terminated. When the channel key decryption key that is not in a form of "NULL" is obtained (step S1032), the encrypted channel key contained in the channel key information is decrypted using that channel key decryption key (step S1033).

The decrypted channel key is stored into a memory indicated by the channel key identifier ("0" or "1" of the relative ID, for example) contained in the channel key information (step S1034).

When the received information is the scrambled broadcast contents information (step S1005), and it is the broadcast contents information of the channel selected by the channel selection interface 1105 upon checking the channel identifier in that broadcast contents information (step S1006), it is sent from the filter unit 1107 to a descrambling unit 1108 (step S1007).

The descrambling unit 1108 sends the channel identifier to a channel key output unit 1120, and obtains the channel key of that channel (step S1021). The channel key output unit 1120 inquires whether that channel is the contracted one or not to a contract judgement unit 1118. In response, the contract judgement unit 1118 refers to the channel contract information in the channel contract information storage unit 1116 and judges whether that channel is the contracted one or not, and outputs "1" if it is the contracted one or "0" if it is not.

When "0" is outputted from the contract judgement unit 1118, the channel output unit 1120 outputs "NULL" to the descrambling unit 1108, so as to indicate that it is not the contracted one. When "1" is outputted from the contract judgement unit 1118, the channel key output unit 1120 obtains the channel key corresponding to the channel key identifier from the channel key storage unit 1117. Here again, similarly as in the case of obtaining the master key, if the channel key in a form of "NULL" is obtained, it is judged that the channel key is not stored yet and the processing is terminated. When the channel key that is not in a form of "NULL" is obtained (step S1022), the descrambling unit 1108 descrambles the scrambled broadcast contents using that channel key, and outputs the descrambled result (step S1023 and S1024).

Note that it is preferable for the reception device ID storage unit 1113 to be formed by a tamper resistant non-volatile memory in the charging control unit 1106 such that the reception device will not be outputted outside the charging control unit 1106. In such a charging control unit 1106, it is extremely difficult to read out the reception device ID so that it becomes practically impossible to forge the contract information.

Also, when the similar tamper resistant property is assumed also for the master key, it also becomes impossible to carry out an attack by reading out the master key from the memory in the charging control unit 1106, decrypting every reception contract information contained in the contract information packets that are delivered, and eliminating only those contract information packets that contain the reception contract information (for that reception device) which is disadvantageous for that broadcast reception device.

Also, when the sufficient tamper resistant property is assumed for the charging control unit 1106, the master key will never be read out so that there will be no need to change the master key by sending the master key seed. In such a case, the master key will be fixed so that it is possible to omit a part for entering the master key seed and changing the master key in the configuration of this third embodiment.

In addition, the master key storage unit 1112 for storing the master key may be formed by a tamper resistant non-volatile memory in the charging control unit 1106 similarly as the reception device ID storage unit 1113, or may be provided as a circuit within the charging control unit 1106. In this way, it is possible to reduce the circuit size.

However, there is no perfectly tamper resistant hardware presently. Namely, there are a variety of levels of the tamper resistant property, ranging from a level in which the reading/writing of the content of a memory or a circuit inside the hardware can be made rather easily and using only inexpensive equipments to a level in which the reading/writing of the content of a memory or a circuit inside the hardware is possible only by a person with a certain level of skills in a considerable amount of time using professional equipments. Consequently, there can be cases where it is impossible to utilize the hardware with a strong tamper resistant property for the charging control unit 1106 in view of the cost. For this reason, it is very important to reinforce the tamper resistant property at the system side without assuming a very strong tamper resistant property for the charging control unit 1106.

When the tamper resistant property breaks down, there is a possibility of having the master key and the reception device ID, that are concealed in the charging control unit 1106, read out from there. In such a case, it becomes possible to forge the contract information, so that it is very important to provide a measure for preventing this such as the following.

In order to prevent the forgery of the contract information, the public key cryptosystem is useful. The public key cryptosystem is a scheme in which encrypted data is produced using a secret key at the broadcast station side and this data can be processed using a public key provided in the charging control unit 1106, for example. Here, it is computationally quite difficult and practically impossible to calculate the secret key from the public key so that a person who does not know the secret key cannot produce any data that is meaningful upon decryption using the public key. Namely, even if a contractor attempts to produce the encrypted reception contract information according to his own convenience, it would be quite difficult because he does not know the secret key. In this sense, the use of the public key cryptosystem for the encryption of the reception contract information is quite useful.

In addition, it is also useful to adopt a scheme in which a digital signature based on the public key cryptosystem is to be included in the reception contract information. The digital signature is produced by obtaining a value (called hash value) resulting from applying a kind of one-way random function called hash function to a portion of the reception contract information excluding the digital signature, and encrypting this hash value using the secret key. It is practically impossible to produce the digital signature unless the secret key is known just as in the above, and moreover it is possible to verify the digital signature by comparing the hash value obtained by decrypting the digital signature using the public key and the hash value for a portion of the reception contract information excluding the digital signature that can be calculated separately.

In this case, it is preferable to verify the digital signature only when the corresponding reception device ID exists in the reception contract information, because the verification of the digital signature is time consuming and there is basically no need to verify the digital signature except when there is a need to update the contract information.

Figure 49:
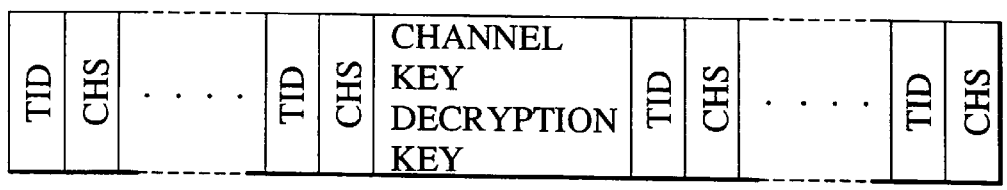
FIG. 49 is a diagram showing an exemplary form of a reception contract information that can be used in the third embodiment of the present invention.
Figures 68, 69:
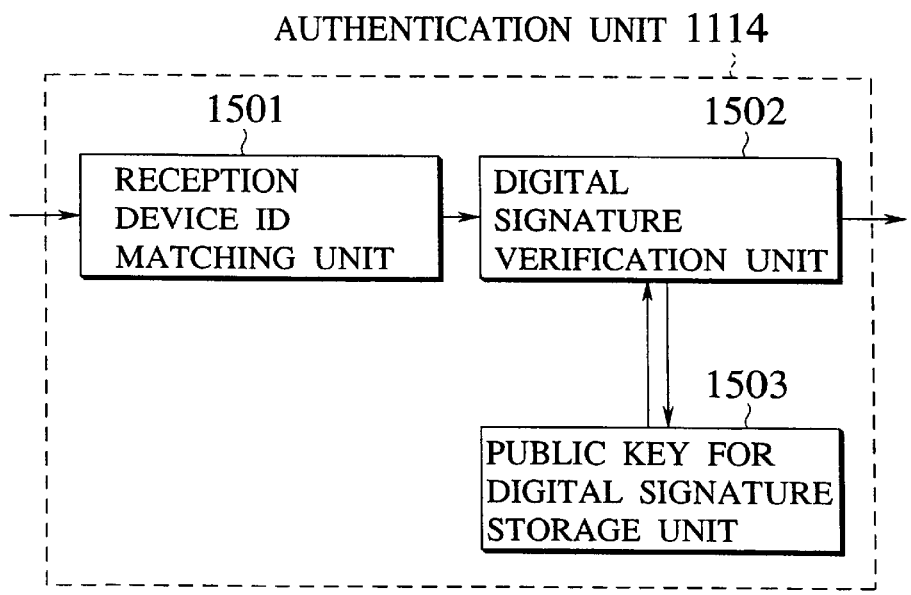
FIG. 68 is a block diagram showing an exemplary configuration of an authentication unit in the broadcast reception unit of FIG. 61 in the case where a reception contract information contains a digital signature.
FIG. 69 is a diagram showing an exemplary structure of a reception contract information containing a digital signature that can be used in the broadcast reception device of FIG. 61.

In the case of attaching the digital signature to the reception contract information, a configuration of the broadcast reception device can be modified from that of FIG. 31 by replacing the authentication unit 1114 of FIG. 31 by a configuration shown in FIG. 68. A configuration of the reception contract information in that case is shown in FIG. 69. Of course, it is also possible to apply the data compression as shown in FIG. 49 to be described below.

However, even when the above described measure is provided, it is still possible to carry out the following attack. Namely, a contractor who have contracted all the channels once keeps records of the contract information packets delivered in that state. Here, if this contractor knows the master key and the reception device ID, it would be possible to identify the contract information of that broadcast reception device, but even if he does not know them, when the contract information broadcast waves are recorded, it is natural to consider that the contract information packets containing the contract information for that broadcast reception device had been transmitted during a certain period of time before the viewing or listening became possible. Next, the contractor cancels contracts for all the channels so that it becomes impossible to view or listen all the channels, but after it becomes impossible to view or listen anything, it is in principle possible to input the earlier recorded contract information packets containing the old encrypted reception contract information somehow into the charging control unit 1106 again so as to restore the earlier (advantageous) contract information therein. Moreover, in this case, the digital signature is also correct so that the broadcast reception device would accept that contract information.

In order to prevent such an attack, it is necessary to change the public key for the digital signature regularly. The old digital signature becomes invalid when the public key is changed. The changing of the public key can be done by identifying information using the information identifier and storing the public key for the digital signature contained in a packet into a non-volatile memory. This key is the public key so that there is no particular need to encrypt it, but it is also possible to adopt a scheme in which this public key is to be encrypted using the master key for the sake of secret keeping.

Also, the broadcast contents are to be delivered sequentially and to be immediately decrypted so that their encryption should preferably be based on the secret key cryptosystem. This is because the secret key cryptosystem is 100 to 1000 times faster than the public key cryptosystem. Similarly the encryption of the channel key should preferably be based on the secret key cryptosystem. It is meaningless to forge the channel key, so that there is no sound reason to adopt the public key cryptosystem for the channel key.

As for the master key seed which is to be an input of the master key generation unit 1111, it may be given by a seed of the random number literally, but it may also be given by the master key encrypted using the secret key cryptosystem or the public key cryptosystem. In such a case, the decryption key for the encrypted master key must be recorded in a tamper resistant non-volatile memory or circuit inside the charging control unit 1106.

The channel key storage unit 1117, the channel key decryption key storage unit 1115, and the master key storage unit 1112 of this third embodiment must be cleared to "NULL" when the power of the broadcast reception device is turned off. This is because it is highly likely that these keys are already changed when the power is turned on again. By clearing them to "NULL", the decryption operation will not be activated while these keys are still not stored so that it is possible to avoid outputting meaningless data by carrying out the decryption using inappropriate keys.

Also, in relation to this aspect, consider the case where the charging control unit 1106 received an erroneous channel key information. Of course the error detection/correction using the error codes is carried out at the error detection/correction unit 1103, but this error correction can be incomplete.

If the charging control unit 1106 receives the erroneous key information (the channel key or the master key seed) as it is, the erroneous key or contract information would be stored and the erroneous decryption or conditional access using the erroneous key or contract information would be carried out. In general, in the cryptosystem, the decryption result can turn out to be quite far from the correct result if even a single bit of the key is wrong. This stems from the requirement of the safety that the plaintext (original data) should not be guessed from the key, and the cryptosystem that does not have this property is a weak cryptosystem which cannot be used in practice. For this reason, it is possible to adopt a scheme in which an authenticator is to be attached to the important information including the encrypted key information and the contract information.

Now, with references to FIG. 46 to FIG. 48, the case of using an authenticator for the important information including the encrypted key information and the contract information will be described.

An authenticator to be attached to the encrypted key information is derived by some algorithm from the key information that can be obtained as a result of decryption. Consequently, a result obtained by the calculation for obtaining the authenticator from the decryption result is compared with the authenticator itself and if they coincide it can be judged that it is data without errors. Here the authenticator can be given by the upper 32 bits of the key k encrypted using the key k, for example. Assuming that the key is in 64 bits, the authenticator is in at most 64 bits. It should be apparent that this scheme is capable of only detecting errors.

Also, a probability for failing to detect actually existing errors is determined by the length of the authenticator, and given by $1/2^l$ where l is the length of the authenticator. This implies that the probability for failure becomes lower for the longer authenticator. Thus it suffices to determine the length of the authenticator according to the required (tolerable) level of the probability for failure. In this sense, there can be cases where the 64 bits length authenticator is insufficient as the required (tolerable) level of the probability for failure is quite low. In such cases, there is a need to further attach an authenticator of different kind. Here the authenticator of different kind is basically an authenticator produced by another algorithm, but if there is a difficulty in providing another algorithm, it can be given by an authenticator produced by the same algorithm as the original one applied after the key k is converted by some prescribed function. Else, the authenticator of different kind can be produced by applying the same algorithm to the originally obtained authenticator.

When the encryption algorithm is used as the authenticator production algorithm, it is possible to produce the authenticator in which the superficial sequence of bits are mutually unrelated. This is because the encryption algorithm itself has a random nature. When the probability for failure nearly equal to 0 is required, sufficiently many authenticators can be provided in this manner, and they can be compressed in a prescribed way.

Figure 46:
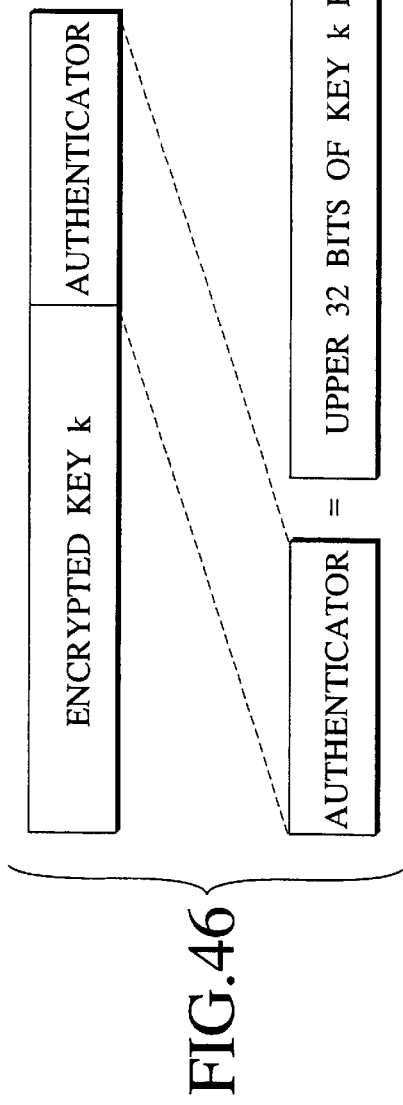
FIG. 46 is a diagram showing an exemplary authenticator for an encrypted key information that can be used in the third embodiment of the present invention.
Figure 47:
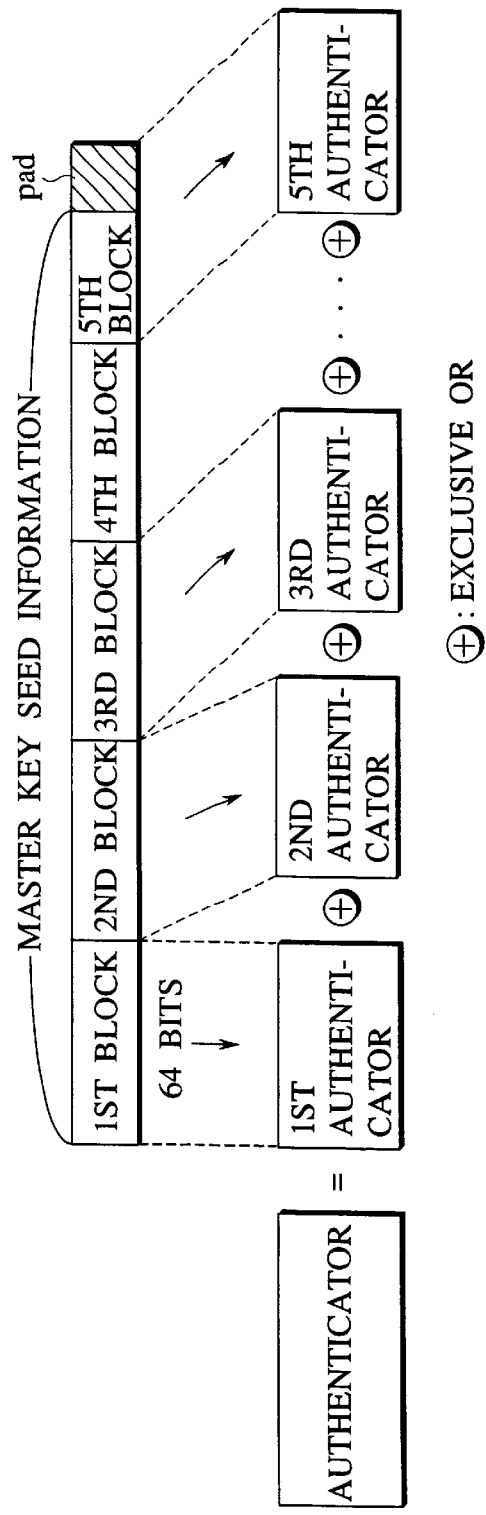
FIG. 47 is a diagram showing an exemplary authenticator for a non-encrypted key information that can be used in the third embodiment of the present invention.

In the case of using the encrypted key information with the authenticator attached thereto in this third embodiment, the encrypted key information portion should be replaced by a structure shown in FIG. 46, while the authenticator checking unit should be provided inside each of the channel key decryption unit 1109 and the contract information decryption unit 1110 (or the authentication unit 1114) of FIG. 31, such that the key will not be outputted when the authentication fails.

There is also a need to attach the authenticator to the reception contract information and the master key seed, but the master key can be based on the public key cryptosystem so that it may not be given in a block of a convenient size such as 64 bits. The key of the public key cryptosystem is longer than the key of the secret key cryptosystem so that the authenticator can be produced by dividing the key into blocks as shown in FIG. 47, producing the authenticator as described above in each block, and calculating the exclusive OR (ExOR) of these authenticators for blocks.

Also, when the key information (the channel key decryption key in the case of this third embodiment) is contained in the reception contract information, the authenticator can be produced by encrypting each block obtained by the above described block division from that key information, and calculating the exclusive OR of them similarly as described above.

Figure 48:
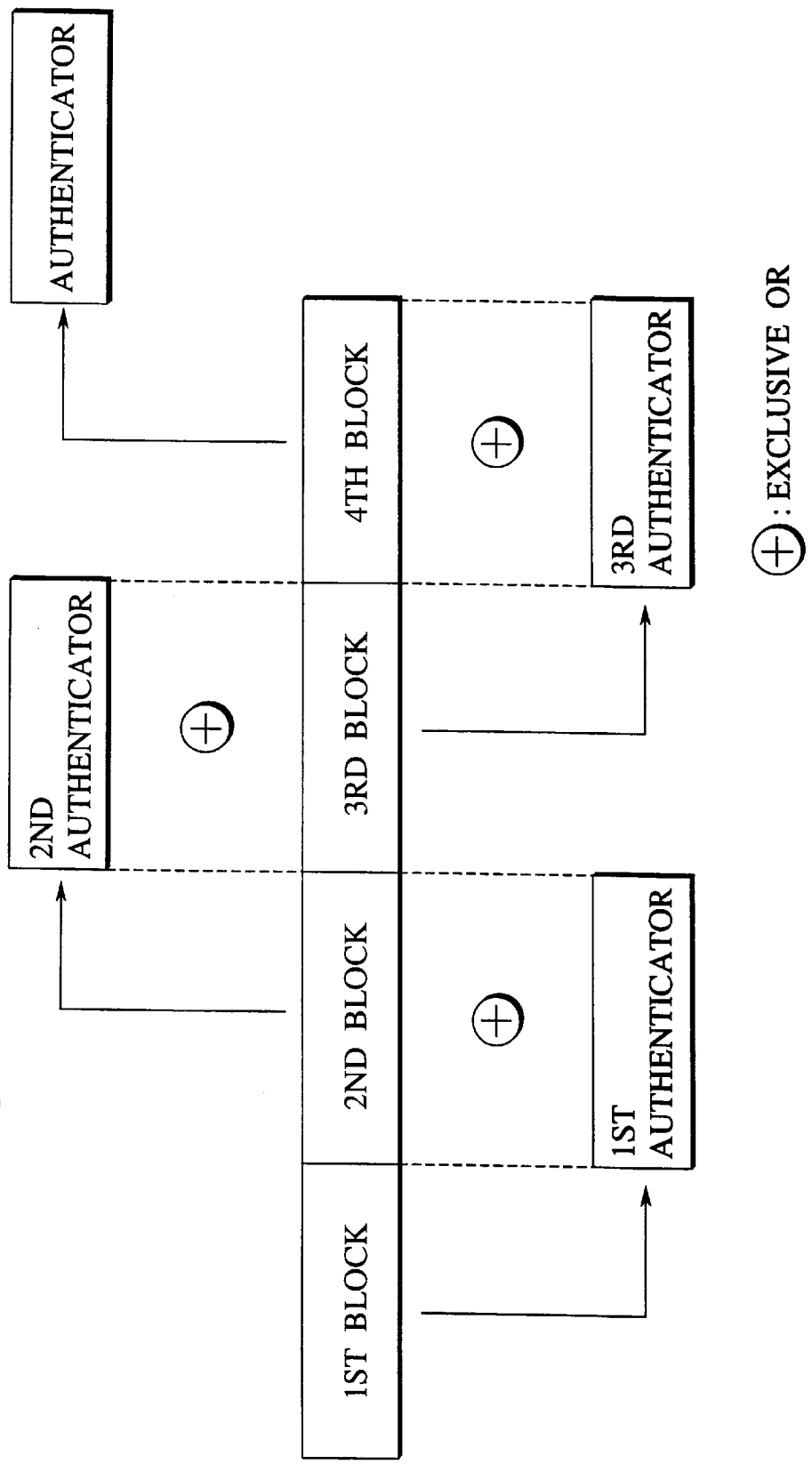
FIG. 48 is a diagram showing another exemplary authenticator for a non-encrypted key information that can be used in the third embodiment of the present invention.

Else, as shown in FIG. 48, the first authenticator for the first block is produced as described above, and the exclusive OR of the first authenticator and the second block is calculated. Then, the second authenticator is produced by the above described algorithm from the exclusive OR result. The final authenticator can be produced by repeating this calculation for the subsequent blocks. In any case, in order to realize division into blocks of 64 bits size, NULL data (dummy data) called PAD is inserted according to the need as shown in FIG. 47. Thus, even in the case of attaching the authenticator to the master key seed, the verification of the authenticator can be realized by providing a process for checking the authenticator in the master key generation unit 1111.

Next, a possible expansion of the reception contract information configuration will be described.

As shown in FIG. 38, the reception contract information comprises the reception device ID (TID), the channel contract information (CHS), and the channel key decryption key. Here, the channel key decryption key has a key size longer than the channel key for the sake of securing safety. For example, in the case of using the standard cryptosystem such as DES (Data Encryption Standard), the channel key is in 64 bits while the channel key decryption key is in 128 bits. Here, the reception device ID (TID) can be given in about 50 bits at most because it suffices to uniquely identify the broadcast reception device. The channel contract information (CHS) requires as many bits as the number of channels so that it can be given in 30 bits if there are 30 channels, for example. Thus the portion other than the channel key decryption key is in 80 bits, and more than a half of the reception contract information is occupied by the channel key decryption key.

Note that the channel key decryption key is common to all the broadcast reception devices and it is contained in the reception contract information for the purpose of ensuring the reception of the reception contract information (which contains at least the reception device ID and the channel contract information). This is because the user has no choice but receiving the reception contract information even if it is a disadvantageous one for the user as long as the channel key decryption key is contained in it. From this perspective, there is no problem in containing the reception contract information for a plurality of broadcast reception devices in a single contract information packet, and the amount of data to be transmitted can be reduced this way.

For this reason, the contract information packet is formed as shown in FIG. 49. Note that FIG. 49 shows only a portion related to the reception contract information in the contract information packet.

Here, a plurality of corresponding set of the reception device ID (TID) and the channel contract information (CHS) are provided on both sides of the channel key decryption key. The reason for not placing the channel key decryption key at a top portion of the contract information packet is the following. In the case of using the secret key cryptosystem such as DES for the encryption of the reception contract information, the encryption is often made in units of 64 bits length blocks, and if the channel key decryption key given in 128 bits is placed at a top portion, the channel key decryption key would occupy the first two blocks. If this fact is revealed, it becomes possible to acquire the channel key decryption key without acquiring the channel contract information by modifying the reception device to decrypt only the first two blocks. The similar consideration also apply to the case of placing the channel key decryption key at a last portion. Note however that this consideration does not apply to the case of using encryption based on the cryptosystem such as the public key cryptosystem which is not carried out in units of 64 bits.

Also, in any case, it is preferable to use a configuration in which a border between adjacent encryption blocks does not coincide with a border between adjacent data. In addition, it is preferable to use an overall size that matches with the block size of the cryptosystem used in encrypting the reception contract information in order to eliminate wasteful data.

Figure 50:
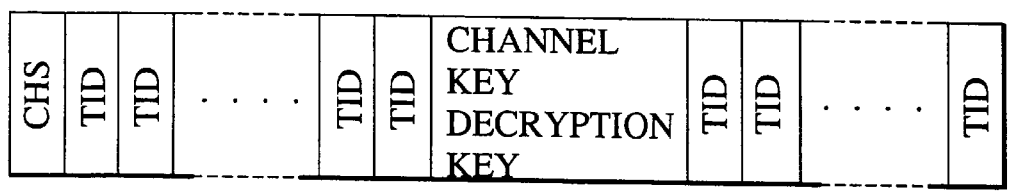
FIG. 50 is a diagram showing another exemplary form of a reception contract information that can be used in the third embodiment of the present invention.

In addition, it becomes possible to transmit more contract information in a single contract information packet by expanding the reception contract information as shown in FIG. 50. Note that FIG. 50 shows only a portion related to the reception contract information in the contract information packet.

The reception contract information shown in FIG. 50 is characterized in that it contains only one channel contract information (CHS), and a plurality of reception device IDs (TID) contained therein are the reception device IDs of those broadcast reception devices which have contracts with the same contract content given by that channel contract information. Namely, instead of recording one channel contract information and one reception device ID in link as in the reception contract information of FIG. 49, the reception contract information of FIG. 50 records one channel contract information and a plurality of reception device IDs in link. In this way, the amount of reception contract information that can be transmitted by a single contract information packet can be increased further.

However, this scheme is not without a problem. For example, in the case where there are many types of channel contract information but the number of contractors corresponding to each type is not so many, the format of FIG. 50 will have a large vacant region so that the efficiency becomes rather poor. Consequently, in the practical implementation of the broadcast reception device, it is generally preferable to use the charging control unit 1106 that can deal with both of the formats of FIG. 49 and FIG. 50. To this end, it suffices to distinguish packets of these two formats using the information identifier and provide processing units corresponding to these two formats.

Figure 77:
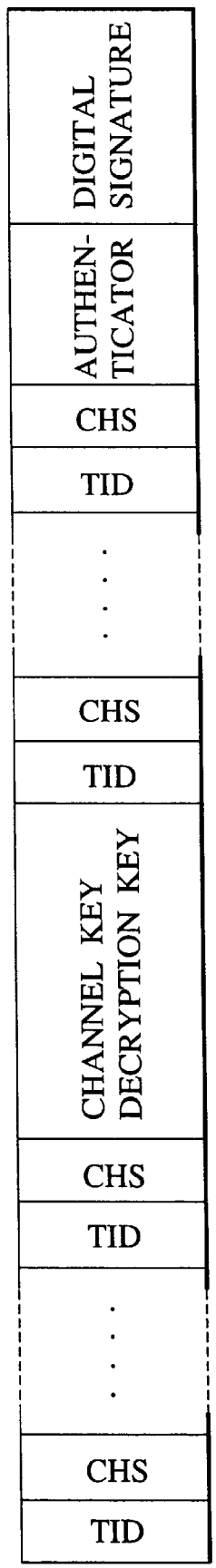
FIG. 77 is a diagram showing an exemplary form of a reception contract information containing an authenticator and a digital signature that can be used in the third embodiment of the present invention.
Figure 78:
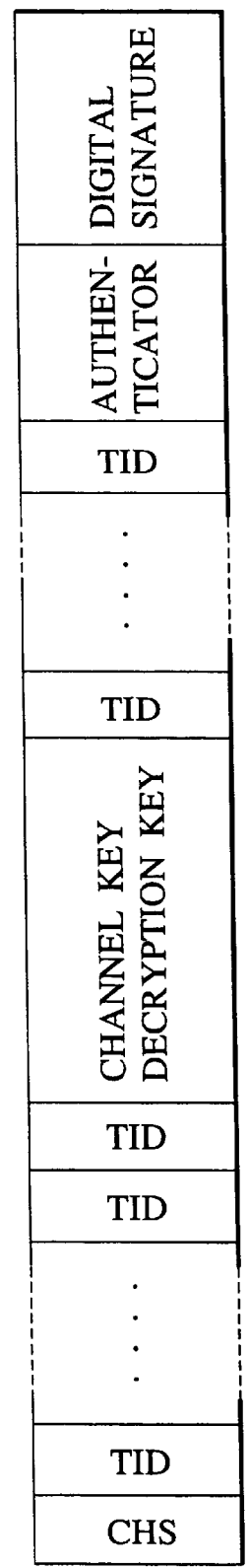
FIG. 78 is a diagram showing another exemplary form of a reception contract information containing an authenticator and a digital signature that can be used in the third embodiment of the present invention.

In the case of containing the authenticator, the reception contract information has a format as shown in FIG. 75, and in the case of containing the digital signature, the reception contract information has a format as shown in FIG. 76. It is also possible to apply the contract information packet format of FIG. 49 or FIG. 50 to these formats, as shown in FIG. 77 and FIG. 78, respectively. Also, as should be apparent, there is no limitation regarding an order of information elements (although it is necessary to have it determined at the designing stage of the reception device), and many variations to the formats shown in FIG. 75 to FIG. 78 can be obtained by changing an order of information elements.

Also, in the case of using these plural formats mixedly, it suffices to distinguish these formats using the information identifier and provide processing units corresponding to these formats, as shown in FIG. 37.

(2) Contract Management Device:

Next, the contract management device on the information delivery side which corresponds to the broadcast reception device in the configuration shown in FIG. 31 will be described.

Figure 70:
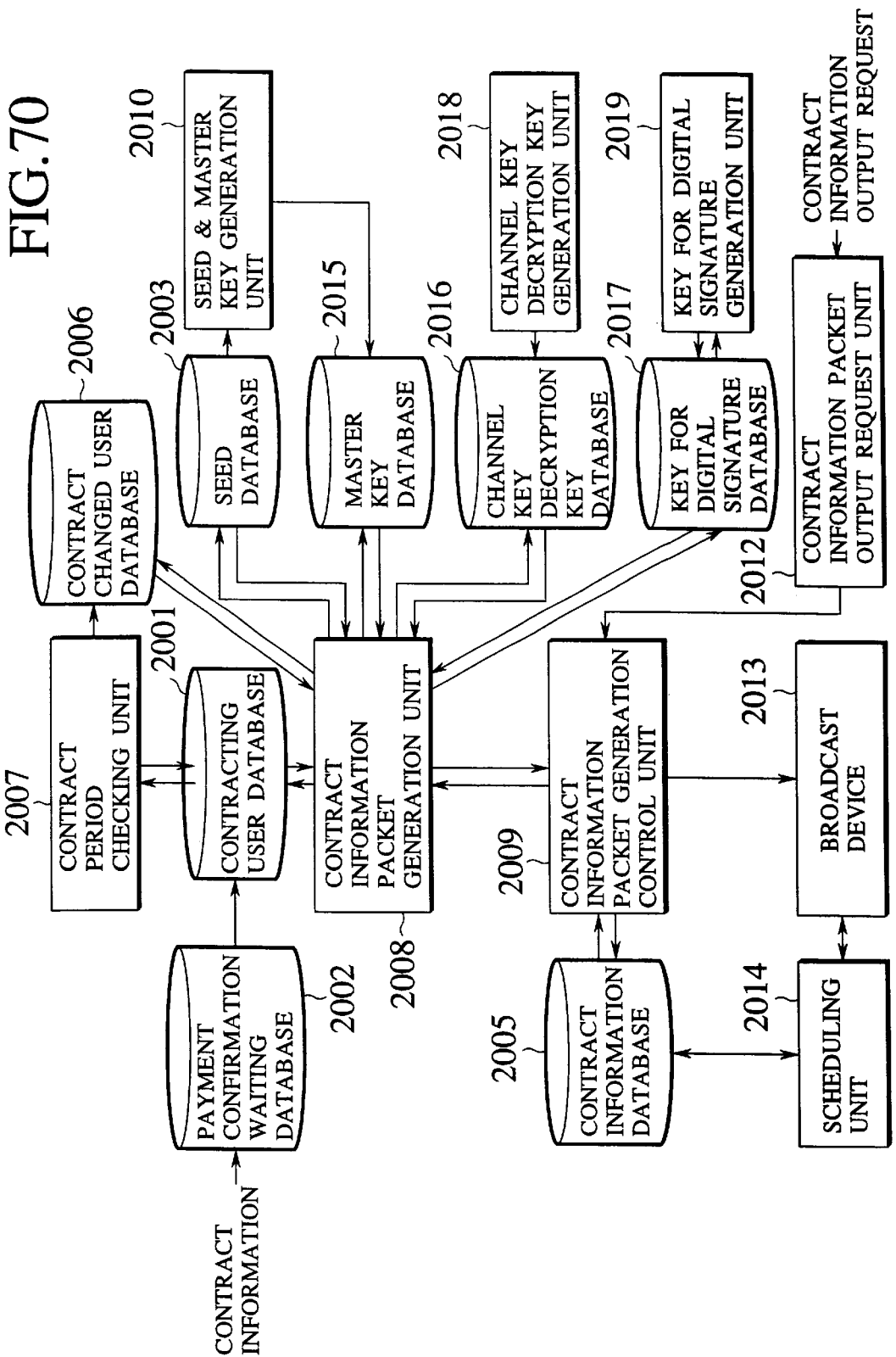
FIG. 70 is a block diagram showing an exemplary configuration of a contract management device according to the third embodiment of the present invention.

FIG. 70 shows an exemplary configuration of the contract management device according to this third embodiment, which realizes all the functions described in this third embodiment. A portion corresponding to any functions which are unnecessary in a practical realization of the system may be omitted from this configuration of FIG. 70.

Note that, in FIG. 70, a contracting user database 2001, a payment confirmation waiting database 2002, a contract period checking unit 2007, a contract information database 2005, a scheduling unit 2014, a broadcast device 2013, a contract information packet output request unit 2012, a seed database 2003, and a seed and master key generation unit 2010 are substantially the same as the contracting user database 1, the payment confirmation waiting database 2, the contract period checking unit 7, the appending information database 5, the scheduling unit 14, the broadcast device 13, the appending information output request unit 12, the seed database 3, and the seed and master key generation unit 10 of FIG. 3 described above, respectively, so that their description will be omitted here and only those portions which are characteristic to this third embodiment will be described below.

Note also that, in FIG. 70, a contract changed user database 2006 will store an information (such as the reception device ID, the channel contract information such as channel numbers, etc.) regarding a user who has changed the contract content within a prescribed period of time (including the case of new subscription).

Figure 72:
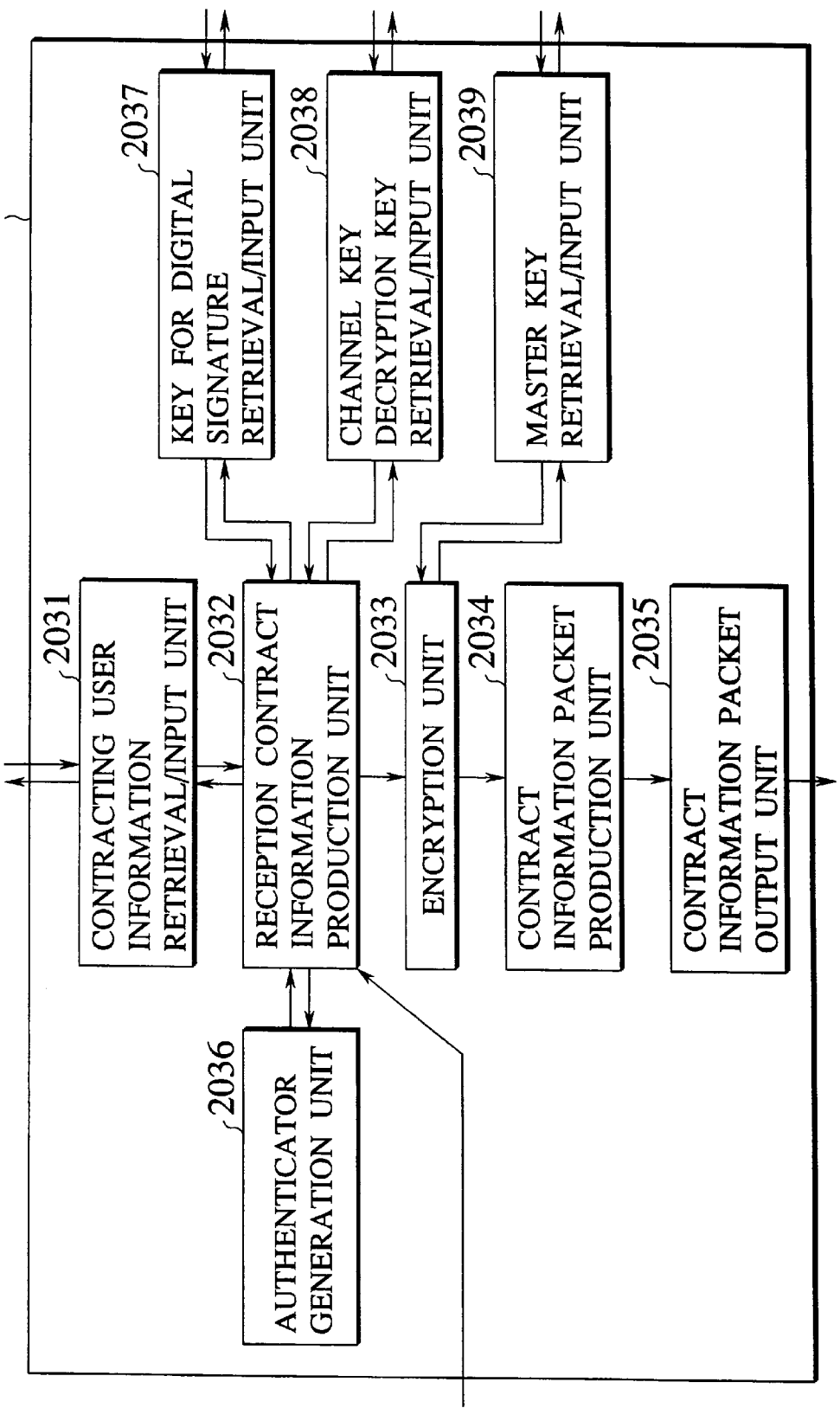
FIG. 72 is a block diagram showing an exemplary configuration of a contract information packet generation unit in the contract management device of FIG. 70.

The characteristic portion of the contract management device shown in FIG. 70 is a contract information packet generation unit 2008. An exemplary configuration of this contract information packet generation unit 2008 is shown in FIG. 72. The configuration and the operation of this contract information packet generation unit 2008 will now be described with reference to the flow chart shown in FIG. 73.

The contract information packet generation unit 2008 starts its operation upon receiving a command from a contract information packet control unit 2009 of the contract management device at a reception contract information production unit 2032 (step S1131). A command to be sent to the reception contract information production unit 2032 can have a content such as "Sequentially produce contract information of contractors who have changed contracts within last two months, which is scheduled to be transmitted on Jul. 15, 1998", for example. When such a command is received, the reception contract information production unit 2032 searches through the contract change user database 2006, and the contracting user database 2001 if necessary, via a contract user information retrieval/input unit 2031, and sequentially extracts information of relevant users (steps S1132 to S1133).

Next, the channel key decryption key corresponding to the transmission timing is retrieved from a channel key decryption key database 2016 via a channel key decryption key retrieval/input unit 2038 (step S1134), and a first intermediate data as shown in FIG. 74 is generated (step S1135).

Next, an authenticator generation unit 2036 generates an authenticator for the first intermediate data (step S1136) and attaches it to the first intermediate data so as to produce a second intermediate data as shown in FIG. 75. In addition, a secret key for digital signature corresponding to the transmission timing is retrieved from a key for digital signature database 2017 via a key for digital signature retrieval/input unit 2037, and the digital signature is produced using that secret key (step S1137). Then, this digital signature is attached to the second intermediate data so as to produce the reception contract information as shown in FIG. 76 (step S1138).

Here, the digital signature may be produced for the first intermediate data alone or for the second intermediate data. In general the latter can realize the stronger security level.

Next, the reception contract information is sent to an encryption unit 2033, where the master key matching the broadcast timing is retrieved from the master key database 2015 via a master key retrieval/input unit 2039 (step S1139), and the reception contract information is encrypted using that master key (step S1140).

A contract information packet production unit 2034 then attaches a channel key decryption key identifier, a master key identifier, and an information identifier to the encrypted reception contract information, so as to produce the contract information packet as shown in FIG. 37, for example (step S1141). In order to produce the contract information packet, it suffices to attach the channel key decryption key identifier, the master key identifier and the information identifier as shown in FIG. 37, where the former two can be obtained from the respective databases, and an identifier assigned in advance to the contract information packet can be attached as the information identifier.

It is also similarly possible to produce the reception contract information (or the first intermediate data) as shown in FIG. 49, or the contracted reception contract information (or the first intermediate data) as shown in FIG. 50. In such a case, however, the processing at the contracting user information retrieval/input unit 2031 becomes complicated. Namely, it is necessary for the contracting user information retrieval/input unit 2031 to search out the contractors who have the same channel contract information.

Here, the compressed contract information as shown in FIG. 50 is effective if the types of contracts are not so many, but when the types of contracts are many it causes an increase of wasteful region so that it is disadvantageous as an amount of transmission increases. For this reason, there is also a need to transmit the format of FIG. 49 and the format of FIG. 50 mixedly depending on the channel contract information. In such a case, it is the reception contract information production unit 2032 that determines which format should be used, and the reception contract information production unit 2032 determines this according to the retrieval result of the contracting user information retrieval/input unit 2031.

For example, when the number of channel contract information that fit to the format of FIG. 49 is 10 and the number of channel contract information that fit to the format of FIG. 50 is 20, it is possible to process them such that, among those contractors for which the reception contract information production condition is met, the format of FIG. 49 is used when the number of contractors who have the same channel contract information is 10 or less, or the format of FIG. 50 is used when the number of contractors who have the same channel contract information is 11 or more.

In addition, the processing on the broadcast reception device side becomes impossible unless the distinction between these two formats is explicitly indicated on the packet, and this can be realized by utilizing the information identifier. Namely, a plurality of information identifiers can be used depending on the format used in the contract information packet. This scheme can obviously be adapted to a variety of formats that can be used by the contract information packet. For example, whether or not to attach the digital signature and whether or not to attach the authenticator are factors independent from which one of the format of FIG. 49 and the format of FIG. 50 is to be used for the contract information, and the information identifier can also be utilized in explicitly indicating which option is chosen for the contract information packet.

Next, the transmission schedule for the contract information will be described. The significance of the present invention lies in that it is possible to guarantee the same safety level with a narrower bandwidth available for the transmission of the contract information, so that the transmission scheme for changing the transmission frequency of the contract information (how frequently the contract information should be transmitted) for different contractors as described here is very significant. Namely, although it depends on the content of the contract change, it is possible to expect the contract changed user to refuse receiving the reception contract information in an attempt to continue to view or listen programs (especially in the case of the disadvantageous contract information). The reception refusal to be considered here is of the simple nature such as that realized by viewing or listen only for a short period of time every day, or that realized by turning the power off for a certain period of time.

From this perspective, if the period for sending the contract information after the contract change is held fixed, there is a possibility for becoming impossible to realize the conditional access. For example, if it is fixedly set that the contract information is to be sent for only one year after the contract change, the contract information can remain without being updated if the power of the broadcast reception device is not turned on at all during one year period after the contract change (because the contract information is not acquired during that period), and after that period it would become possible to continue viewing or listening programs using the old contract information.

On the other hand, if it is set that the reception contract information is to be sent indefinitely after the contract change, the transmission bandwidth cannot be utilized effectively because the reception contract information for the contractor who had already received it would also have to be transmitted repeatedly. For this reason, there is a need to change the transmission frequency of the contract information depending on a time elapsed since the contract change. Exemplary transmission frequencies of the contract information are as follows.

When a time elapsed since the contract change is less than two months: a transmission frequency of once in every 10 minutes;

When a time elapsed since the contract change is between two months and six months: a transmission frequency is once in every 30 minutes;*

When a time elapsed since the contract change is between six months and one year: a transmission frequency is once in every 60 minutes; and When a time elapsed since the contract change is over one year: a transmission frequency is once in every 120 minutes.

In this example, it is transmitted once in every ten minutes for the first two months so as to urge the early contract change. It is expected that the most of the reception devices will make the contract change at this stage, but the transmission is continued thereafter for those reception devices which happened to fail to receive the contract information or which could not receive the contract information because the power was turned off, with gradually decreasing transmission frequencies such as once in every 30 minutes from two months later to six months later, once in every 60 minutes from six months later to one year later, and once in every 120 minutes from one year later. In this way, it is possible to realize the conditional access accurately while saving the broadcast bandwidth.

On the other hand, as for the new contractor, the contractor himself will desire to receive the contract information soon, and even if the contractor fails to receive the contract information (for some reason) there will be a feedback to the broadcast station side in a form of a claim from the contractor so that it suffices to retransmit the contract information by then. Consequently it is meaningless to transmit the contract information over a long period of time, and in this sense it suffices to transmit the contract information for the new contractor at the transmission frequency of about once in every ten minutes only for two months after the new subscription.

As described above, it is preferable to use the transmission schedule which changes the broadcast frequency of the contract information depending on the type of contract (contract change, new subscription, etc.) and the time elapsed after the contract. In the contract management device of this third embodiment, the contract information packet generation control unit makes the adjustment to carry out the transmission at the above noted frequencies, for example.

Referring now to FIG. 51 to FIG. 60, FIG. 71, FIG. 79 and FIG. 80, the fourth embodiment of a conditional access broadcast system according to the present invention will be described in detail.

Figure 51:
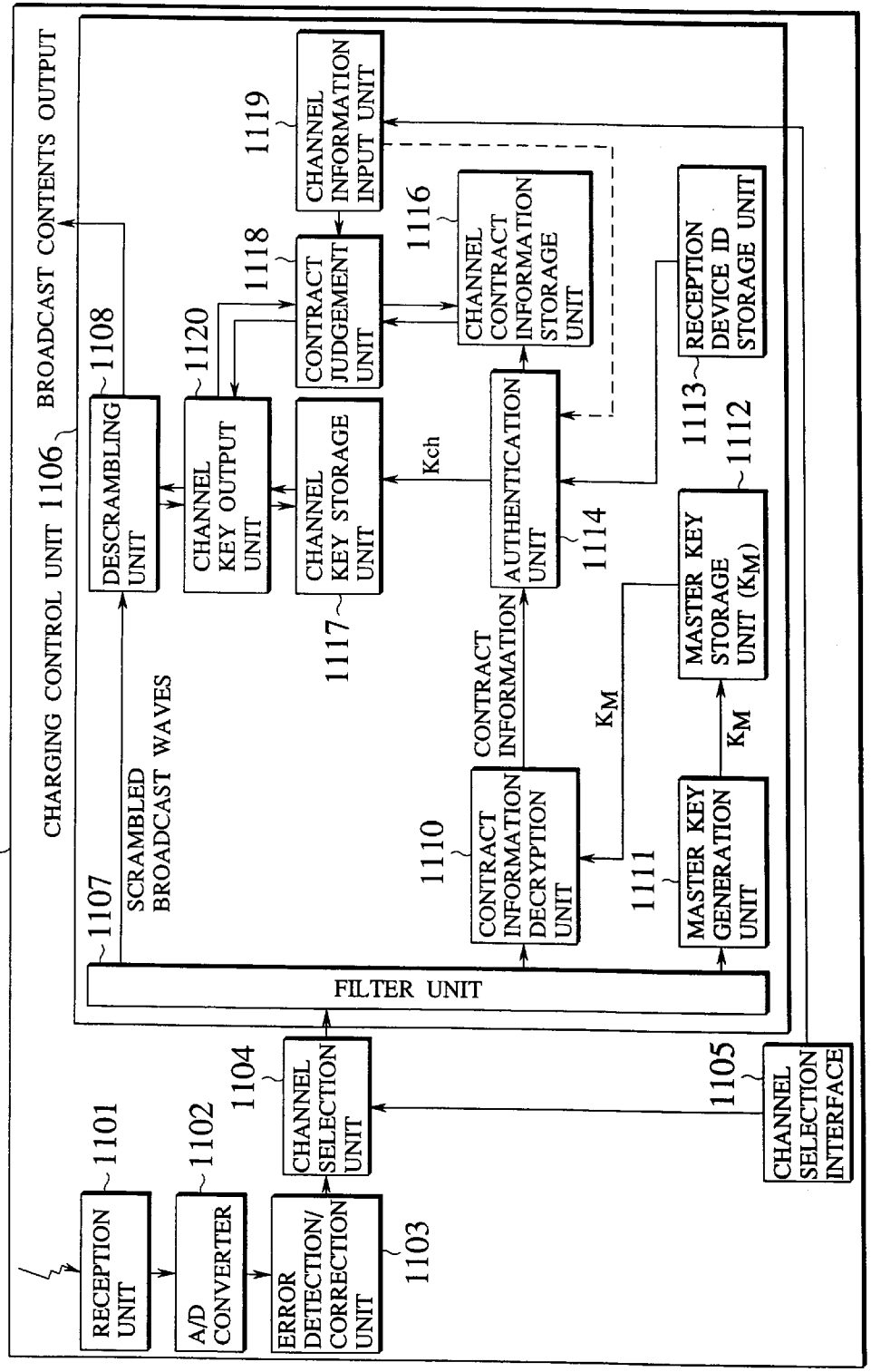
FIG. 51 is a block diagram showing an exemplary configuration of a broadcast reception device according to the fourth embodiment of the present invention.

FIG. 51 shows an exemplary configuration of the broadcast reception device according to this fourth embodiment. This fourth embodiment is a simplification of the third embodiment while maintaining the same level of security. Consequently, those elements which are substantially the same as the corresponding elements of FIG. 31 will be given the same reference numerals in the figures and their description will be omitted.

Figure 52:
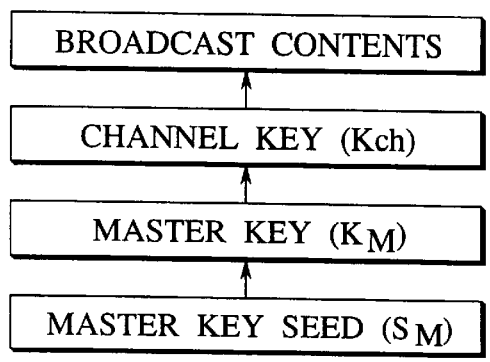
FIG. 52 is a diagram showing three stage key structure used in encrypting broadcast contents in the fourth embodiment of the present invention.

This fourth embodiment essentially differs from the third embodiment in that the channel key decryption unit 1109 of FIG. 31 is omitted. For this reason, as shown in FIG. 52, the key structure for decrypting the encrypted broadcast contents is in three stages.

Figure 53:
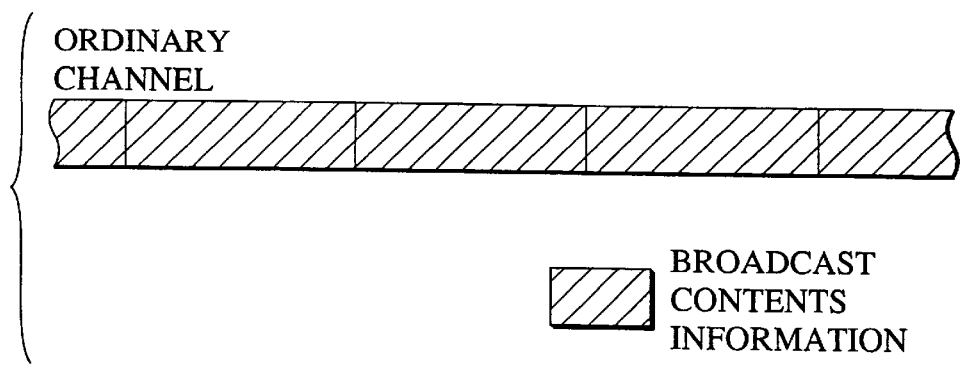
FIG. 53 is a diagram showing an exemplary information structure delivered by an ordinary channel in the fourth embodiment of the present invention.
Figure 54:
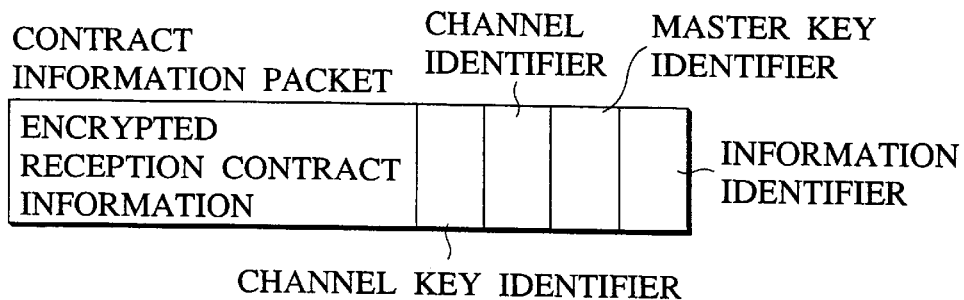
FIG. 54 is a diagram showing an exemplary structure of a contract information packet delivered by a contract information channel in the fourth embodiment of the present invention.

Also, in this fourth embodiment, the channel key is contained in the reception contract information. Consequently, the information on the ordinary channel comprises the scrambled contents alone as shown in FIG. 53. In conjunction with this, the contract information packet to be delivered by the contract information channel becomes as shown in FIG. 54, where the channel key identifier and the corresponding channel identifier are necessary because the channel key is contained in the reception contract information instead of the channel key decryption key.

As shown in FIG. 55, the reception contract information comprises the reception device ID, the channel contract information, and the channel key. The packing similar to that of FIG. 49 described above for the third embodiment is also possible for this reception contract information. Also, in the contract information packet shown in FIG. 54, the channel identifier is placed at a non-encrypted portion so that it is possible to obtain only the contract information corresponding to the channel identifier of the selected channel. In order to prevent this, the channel identifier and the channel key identifier are contained in the reception contract information and this reception contract information as a whole is encrypted as shown in FIG. 57. In this case, the contract information packet has a configuration containing the encrypted reception contract information, the master key identifier and the information identifier as shown in FIG. 56.

Also, when the reception contract information has a configuration shown in FIG. 58, the reception contract information can contain the channel key "0" and the channel key "1", of which one of them can be set as the decryption key of current broadcast contents while the other one can be set as the key that becomes valid next, so that the channel identifier becomes unnecessary.

In addition, similarly as the reception contract information of the third embodiment, it is possible to attach the authenticator or the digital signature to the reception contract information, and in such a case, the same effect as described above for the third embodiment can be achieved. As examples, FIG. 79 and FIG. 80 show the cases where the reception contract information becomes most complicated, that is, the cases where the reception contract information is described in the formats of FIG. 49 and FIG. 50 respectively and the two channel keys are contained as shown in FIG. 58. There is also no limitation on an order of information elements similarly as in the third embodiment, and an order can be changed for each data. Also, in the case of using these plurality of formats mixedly, it suffices to distinguish them using the information identifier.

Now, at a time of receiving the contract information, the contract information packet is separated at the filter unit 1107 and sent to the contract information decryption unit 1110. Then the encrypted reception contract information contained therein is decrypted using the corresponding-master key, and the reception device ID contained in the reception contract information is retrieved sequentially (if there are plural reception device IDs), and when the ID of this reception device is found, the channel contract information corresponding to it is stored into the channel contract information storage unit 1116. At the same time, regardless of whether the reception device ID is that of this reception device or not, the channel key contained in the reception contract information is written into a memory (the channel key storage unit 1117 of FIG. 51), in correspondence to a combination of the channel identifier and the channel key identifier indicated by that reception contract information, as shown in FIG. 59.

The channel key output unit 1120 retrieves the corresponding channel key from the channel key storage unit 1117 according to the judgement of the contract judgement unit 1118 in response to a request from the descrambling unit 1108, and outputs it to the descrambling unit 1108.

Here, as shown in FIG. 59, all the acquired channel keys are stored along with the channel identifiers in the channel key storage unit 1117. However, this is not absolutely necessary because the number of channels that can be viewed or listened simultaneously is at most one. For this reason, it is also possible to refer to the currently viewed or listened channel number at the authentication unit 1114, and store only the necessary channel key into the channel key storage unit 1117. In such a case, the channel key storage unit 1117 stores the channel key and its identifier as shown in FIG. 41. When this structure is adopted, it is necessary to clear the interior of the channel key storage unit 1117 at a time of the channel change, because the channel key of the channel before the channel change is in general different from the channel key of the channel after the channel change and the channel key of the channel before the channel change would remain valid such that incomprehensible broadcast contents would be outputted unless the channel key storage unit is cleared. In this way, at a time of the channel change, it is necessary to clear the channel key storage unit 1117 and newly acquire the channel key from the channel contract information, so that it takes some processing time until the descrambling but the memory capacity of the channel key storage unit 1117 can be small, and there will be no need to increase the memory capacity even when the number of channels increases.

In order to realize such a scheme, there is a need for the authentication unit 1114 to acquire the channel number from the channel information input unit 1119, so that a data flow as indicated by a dashed line in FIG. 51 is additionally necessary.

By adopting the scheme of this fourth embodiment, apart from the merit of being able to reduce the key structure by one stage compared with the third embodiment, the following merit can also be obtained. Namely, suppose that the contractor who had contracted all the channels for one month has cancelled all the channels next month. In this case, this contractor does not wish to acquire the new reception contract information destined to the own broadcast reception device because all the channels become impossible to view or listen when the new reception contract information is acquired. However, this contractor cannot choose not to acquire all the new reception contract information because the reception contract information contains information necessary in decrypting the broadcast contents.

In the case of the third embodiment, this necessary information was the channel key decryption key $K_H$ but this is common to all the channels so that it suffices to acquire at most one reception contract information at a timing at which the channel key decryption key $K_H$ is changed. If the channel key decryption key $K_H$ is to be changed once every day, it suffices to acquire just one reception contract information each day, and the possibility for this one reception contract information to contain the contract information for the own broadcast reception device is low so that it is quite possible for this contractor to continue viewing or listening for a long period of time without receiving the reception contract information destined to the own broadcast reception device.

In contrast, in this fourth embodiment, the necessary information is the channel key itself, and the channel key is different for different channels, so that it is necessary to change it frequently in view of the safety. For this reason, there is also a need to acquire the reception contract information quite frequently as well, and a probability for not receiving the reception contract information destined to the own broadcast reception device can be lowered considerably.

Note however that there is also a significant reason to consider the positive use of the four stage key structure of the third embodiment. If there are many channels (1000 channels for example), the channel key of the desired channel can be acquired only after a considerable number (1000 at worst) of the reception contract information are acquired and decrypted at a time of reception start or at a time of the channel change. This causes such a considerable delay in the reception timing that it is not very practical, and moreover, if the reception error occurs, it would become necessary to wait until the decryption of another 1000 of the reception contract information is over. This problem can be resolved by the four stage key structure of the third embodiment. Namely, in the case of the four stage key structure, there is a key common to all the broadcast reception devices called the channel key decryption key, and all the channel keys can be decrypted using this channel key decryption key so that it is possible to realize the decryption within a certain time regardless of the number of channels.

Figure 60:
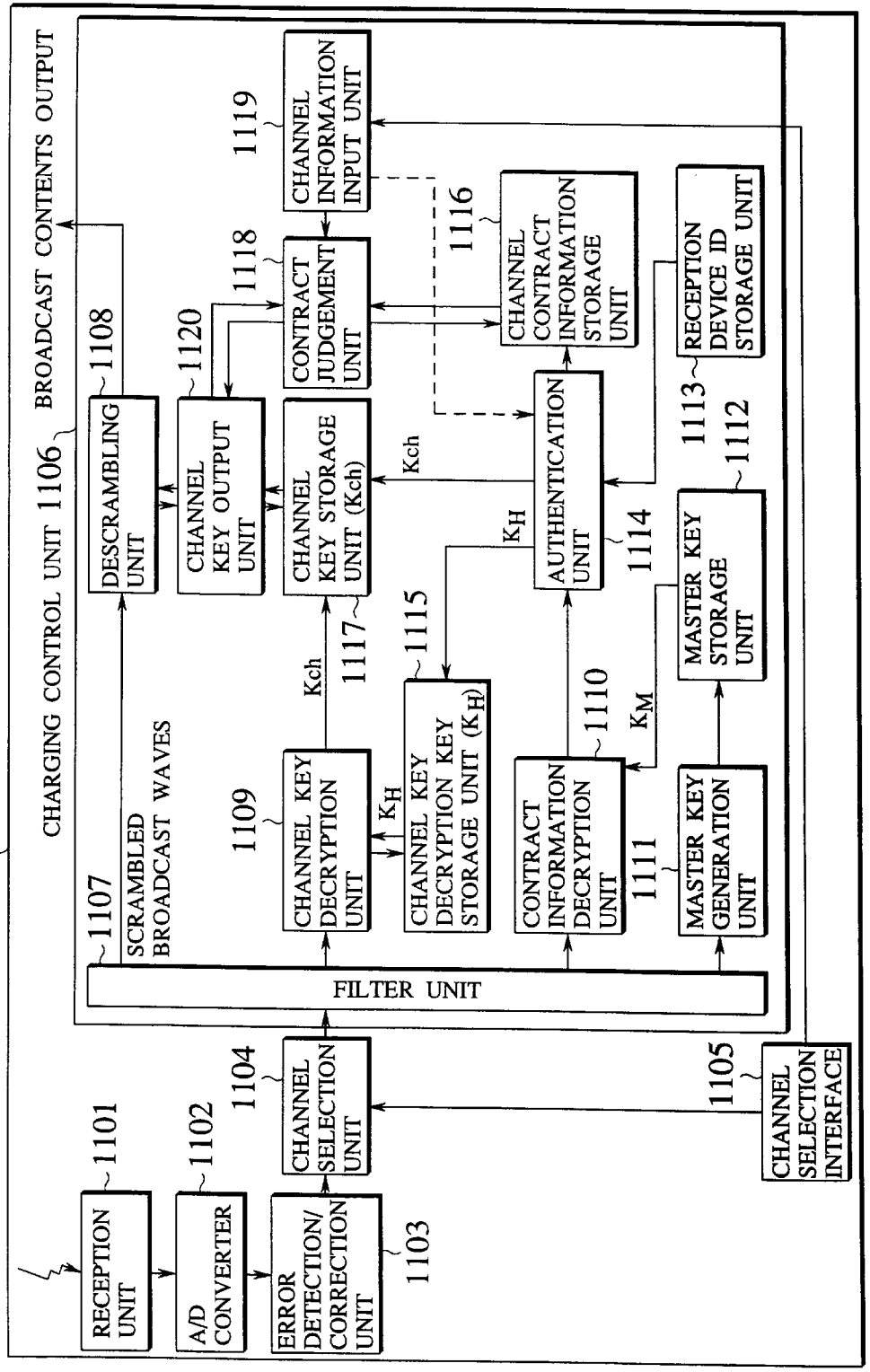
FIG. 60 is a block diagram showing a modified configuration of a broadcast reception device according to the fourth embodiment of the present invention.

FIG. 60 shows an exemplary configuration of the broadcast reception device which takes advantages of both of these schemes. Here, the contract information packet and the reception contract information are provided in two formats, where one format is as shown in FIG. 37 and FIG. 38 of the third embodiment while another format is as shown in FIG. 54 and FIG. 55 of the fourth embodiment. The difference between these two formats is judged by the information identifier in the packet, and when the reception contract information contains the channel key decryption key, the authentication unit 1114 sends it to the channel key decryption key storage unit 1115, whereas when the reception contract information contains the channel key, the authentication unit 1114 sends it to the channel key storage unit 1117.

Here the broadcast station (contract management device) side makes adjustment such that the channel key information will be sent by the ordinary channel separately when the channel key decryption key is contained in the reception contract information, or the channel key information will not be sent otherwise. As a result, it is possible to operate consistently even when circuits for both schemes are mixedly present.

(2) Contract Management Device.

Next, the contract management device on the information delivery side which corresponds to the broadcast reception device according to this fourth embodiment will be described.

Figure 71:
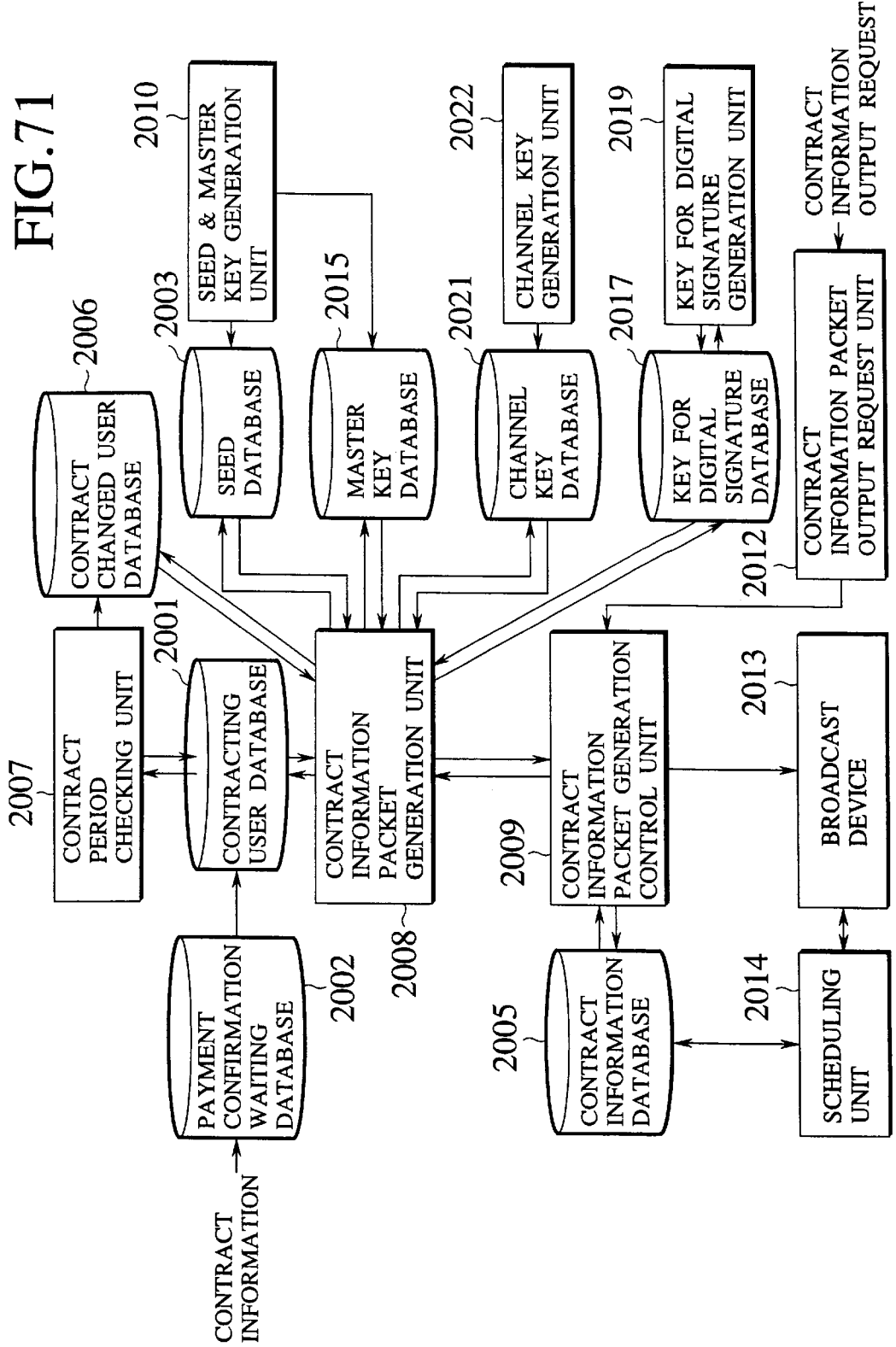
FIG. 71 is a block diagram showing an exemplary configuration of a contract management device according to the fourth embodiment of the present invention.

FIG. 71 shows an exemplary configuration of the contract management device according to this fourth embodiment, which realizes all the functions described in this fourth embodiment. A portion corresponding to any functions which are unnecessary in a practical realization of the system may be omitted from this configuration of FIG. 71.

Note that, in the contract management device shown in FIG. 71, those elements which are substantially the same as the corresponding elements in the contract management device of the third embodiment shown in FIG. 70 will be given the same reference numerals and their description will be omitted.

In FIG. 71, the channel key decryption key database 2016 and the channel key decryption key generation unit 2018 of FIG. 70 are replaced by a channel key database 2021 and a channel key generation unit 2022 respectively, and the operation of the channel key database 2021 and the channel key generation unit 2022 of FIG. 71 are similar to that of the channel key decryption key database 2016 and the channel key decryption key generation unit 2018 of FIG. 70 described above except that each occurrence of the channel key decryption key should be replaced by the channel key.

Referring now to FIG. 61 to FIG. 67, the fifth embodiment of a conditional access broadcast system according to the present invention will be described in detail.

Figure 61:
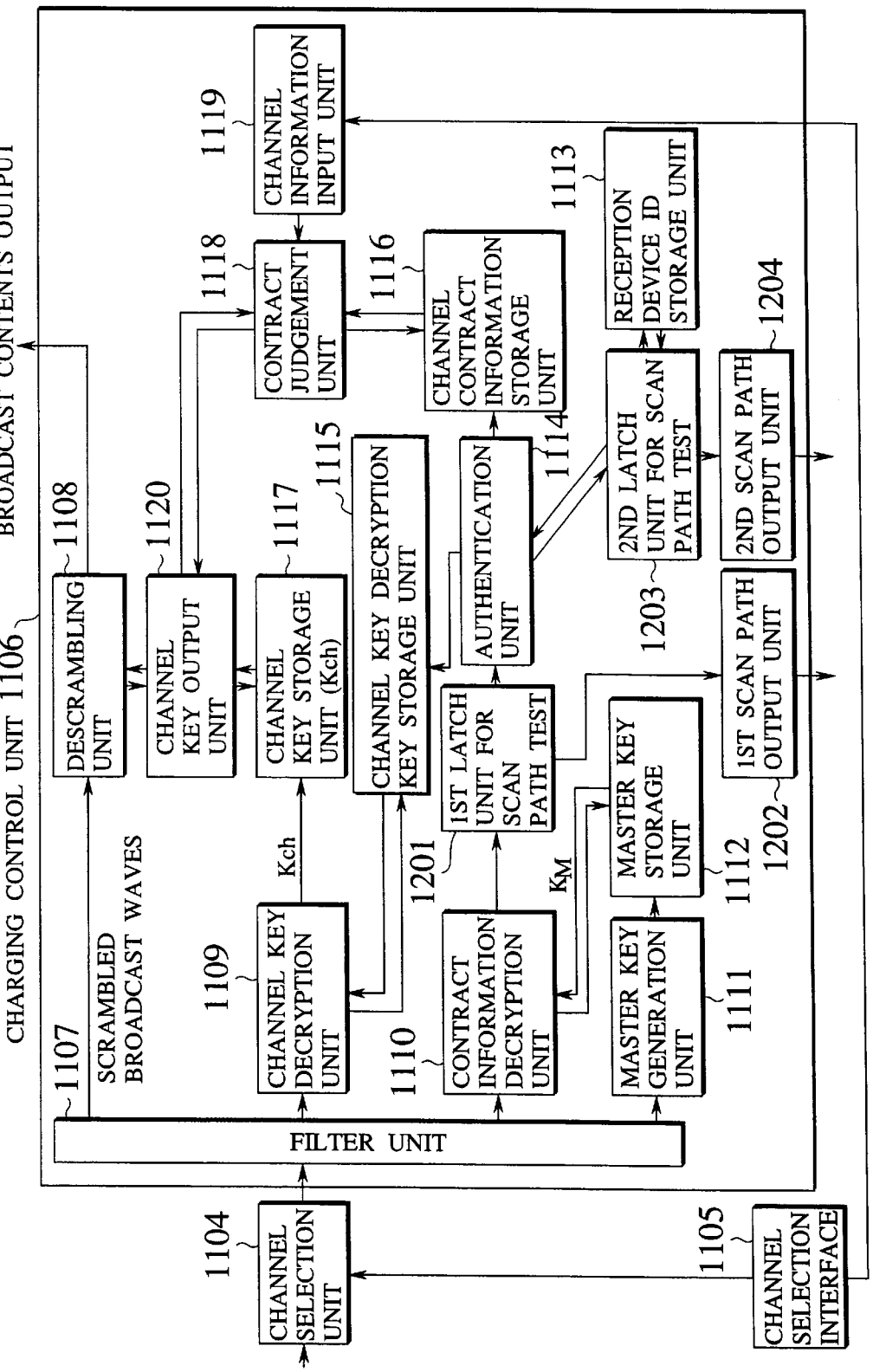
FIG. 61 is a block diagram showing an exemplary configuration of a broadcast reception device according to the fifth embodiment of the present invention.

This fifth embodiment is directed to a configuration of a latch unit for scan path test in the charging control unit 1106 at the broadcast reception device, which is commonly utilizable in the conditional access broadcast system of the first to fourth embodiments described above. FIG. 61 shows an exemplary configuration of the broadcast reception device according to this fifth embodiment.

In the conditional access broadcast system, because of its structure, there is a possibility for the system as a whole to break down such that it becomes impossible to charge effectively, when the secret information (especially a key and an algorithm for the master key generation) inside the charging control unit 1106 is revealed. Also, if the descrambled broadcast contents outputted in the broadcast reception device of FIG. 31, for example, are recorded by the user somehow, it would become possible in principle to reproduce them as many times as the user wishes so that it is not desirable. From this perspective, the charging control unit 1106 and an MPEG decoder which utilizes the output of the charging control unit 1106 should preferably be formed by an integrated chip.

On the other hand, at a time of manufacturing an integrated chip, it is difficult to produce the correct chip at once, so that there is a need to monitor the intermediate result through test pins or the like. Also, these test pins will remain even in the finished product, so that they can provide an opportunity for a person trying to analyze this chip to observe the decryption process albeit the intermediate result only, and thereby provide a situation which is convenient for the cryptoanalysis of the encryption algorithm or the decryption key. This fifth embodiment is devised in order to resolve this problem.

To this end, as shown in FIG. 61, first and second latch units for scan path test 1201 and 1203 and first and second scan path output units 1202 and 1204 are to be added to the broadcast reception device of the first to fourth embodiments.

The first and second latch units for scan path test 1201 and 1203 carry out the operation to capture data flowing therethrough and sending it to the respective first and second scan path output units 1202 and 1204.

(1) First Latch Unit for Scan Path Test (Test Output of the Reception Contract Information):

FIG. 62 show an exemplary basic configuration of the first latch unit for scan path test 1201. The configuration and the operation of this first latch unit for scan path test 1201 will now be described with reference to the flow chart shown in FIG. 63.

In the first latch unit for scan path test 1201, the output from the contract information decryption unit 1110 is received at an input unit 1301 (step S1101), and that data is sent to an authentication unit 1302 after a data format change or the like is carried out (if necessary). The authentication unit 1302 then makes a judgement as to whether it is allowed to output that data or not (step S1102). When it is judged that output of that data is allowed, that data is sent to an output unit 1305 (step S1103), and the output unit 1305 sends this data to the first scan path output unit 1202 (step S1104). The first scan path output unit 1202 then outputs this data outside the charging control unit 1106 such that this data will be displayed on a display unit such as a display device which is provided outside the charging control unit 1106 (step S1105).

After the step S1105 or when it is judged that the decrypted reception contract information is not to be outputted at the step S1102, this decrypted reception contract information is outputted as it is to the authentication unit 1114 that is provided outside the first latch unit for scan path test 1201 (step S1106).

Here, the operation of the authentication unit 1302 is important. In the following, in order to describe the operation of the authentication unit 1302, the input data format for the charging control unit 1106 will be described first.

First, for the sake of simplicity, the most simple way of realization will be described. As the information identifier contained in the configuration of the contract information packet for the third and fourth embodiments (see FIG. 37 and FIG. 54), an identifier for indicating that it is the reception contract information which is allowed to be the scan path output is provided in addition to the ordinary identifier (for indicating the reception contract information). Then, by judging this information identifier at the authentication unit 1302, whether that data should be outputted to the first scan path output unit 1202 or not is determined.

The scan path output is necessary basically at a time of designing or at a time of shipping from the factory, so that it can be safely assumed that the information identifier for allowing the scan path output will not be transmitted by broadcast waves, and therefore it is quite difficult for the general user to analyze what this information identifier is.

Next, an exemplary case of judging whether it is the contract information packet containing the reception contract information which is allowed to be the scan path output or not according to the authentication information corresponding to the contract information packet will be described. FIG. 64 shows a format of the contract information packet to be entered into the contract information decryption unit 1110 in this case.

This format differs from that of FIG. 37 in that the authentication information is added after the encrypted reception contract information. Of course, the format of FIG. 54 can also be modified similarly as in FIG. 64. Note that, in order to distinguish this packet from the contract information packet in the ordinary format (without the authentication information), it is possible to set up another information identifier for that purpose. Else, when the common information identifier is to be used, in order to use the uniform format, the authentication information in the ordinary contract information packet can be set as "NULL" and any packet with "NULL" as the authentication information can be interpreted as the ordinary contract information packet. Note here that the latter case is easy to implement but also associated with a drawback that the amount of data increases.

As the authentication information, the encrypted reception contract information (or its hash value) applied with the digital signature can be considered. Here the hash value of data is like a digest of data which expresses data of arbitrary length in a given length (120 bits for example), but a digest here does not imply a summary of the content itself and it can be regarded as data converted into a given length by applying some one-way random function called hash function (a mathematical function whose inverse function is difficult to obtain). There are several known such hash functions including MD5 and SHA1. Data to which the digital signature is to be attached must be set in a given length of 64 bits or 120 bits that corresponds to one block of the encryption. For this reason, the reception contract information will be multiplied with the hash function if necessary.

Now, the operation of the first latch unit for scan path test 1201 including a checking process for receiving the authentication information and the encrypted reception contract information along with the decrypted reception contract information and checks the digital signature as the authentication information, will be described with reference to the flow chart of FIG. 65.

The input unit 1301 receives the authentication information and the encrypted reception contract information along with the decrypted reception contract information (step S1121), and the authentication unit 1302 multiplies the hash function (according to the need) to the (entered) encrypted reception contract information first in order to check the digital signature (step S1122). On the other hand, the digital signature as the authentication information is decrypted using the public key stored in advance in the authentication unit 1302 (step S1123), and compared with the above hash value. If they coincide (step S1124), the authentication information can be regarded as proper, so that the data output is carried out similarly as the steps S1103 to S1105 of FIG. 63 (steps S1125 to S1127).

If they do not coincide at the step S1124, it is judged that this authentication information is improper, and the data output is not carried out. After the step S1127 or when the authentication information and the hash value do not coincide at the step S1124, the decrypted reception contract information is outputted as it is to the authentication unit 1114 which is provided outside the first latch unit for scan path test 1201 (step S1128).

Here, the digital signature using the public key cryptosystem is the data body (the hash value here) encrypted using the secret key. In the public key cryptosystem, what is encrypted using the secret key can only be decrypted using a key different from the secret key called public key. For this reason, the digital signature decrypted using the public key should become equal to the original hash value. Also, based on the safety of the public key cryptosystem, it can be safely assumed that an only person who can produce data that can be decrypted using the public key is a person who knows that secret key, so that the data obtained by encrypting the hash value using the secret key is referred to as the digital signature of the data. Here the significance of employing the digital signature using the public key cryptosystem lies in that the digital signature cannot be produced using only information contained in the charging control unit 1106 so that it becomes practically impossible for a general user to produce data which can cause the latch units for scan path test 1201 and 1203 to output.

Also, the digital signature can be realized using the secret key cryptosystem. In such a case, the hash value is encrypted using the secret key, and it is checked by decrypting it using the secret key so that the secret key must be concealed in the latch unit. However, the secret key cryptosystem has a characteristic that it is faster than the public key cryptosystem, and the secret key to be used is concealed in the tamper resistant hardware called charging chip, so that it is quite difficult to read it out. For this reason, the digital signature using the secret key can be also effective.

In order to check the encrypted digital signature, the first latch unit for scan path test 1201 receives the encrypted reception contract information that is otherwise unnecessary as its input. In order to avoid this, it is possible to verify the digital signature at the contract information decryption unit 1110 and send the verification result to the first latch unit for scan path test 1201. Namely, the major part of the authentication unit 1302 of the first latch unit for scan path test 1201 can be carried out by the contract information decryption unit 1110 instead. In this scheme, however, the data that urges the latch unit to output is always the same so that it is easier to induce the malicious use by a third person.

In this regard, it is also possible to apply the digital signature to the output of the contract information decryption unit 1110 at the contract information decryption unit 1110 when the signature is verified at the contract information decryption unit 1110. In this scheme, the above noted problem of the malicious use can be prevented, but the extra processing will be required. Which scheme is to be adopted should be determined according to the nature of application.

Next, the data to be outputted from the first latch unit for scan path test 1201 will be described. In all the examples described above, it is assumed that a raw data sequence (a sequence of 0 and 1), that is the decrypted contract reception information itself, is to be outputted. However, it is safer if the data sequence is also encrypted. Namely, using a configuration in which the data outputted from the first latch unit for scan path test 1201 (which may be outputted unconditionally) is encrypted so that it can only be decrypted by a display device equipped with the decryption key, it becomes quite difficult to analyze the configuration of the charging control unit 1106 from the output of this latch unit 1201.

Figure 66:
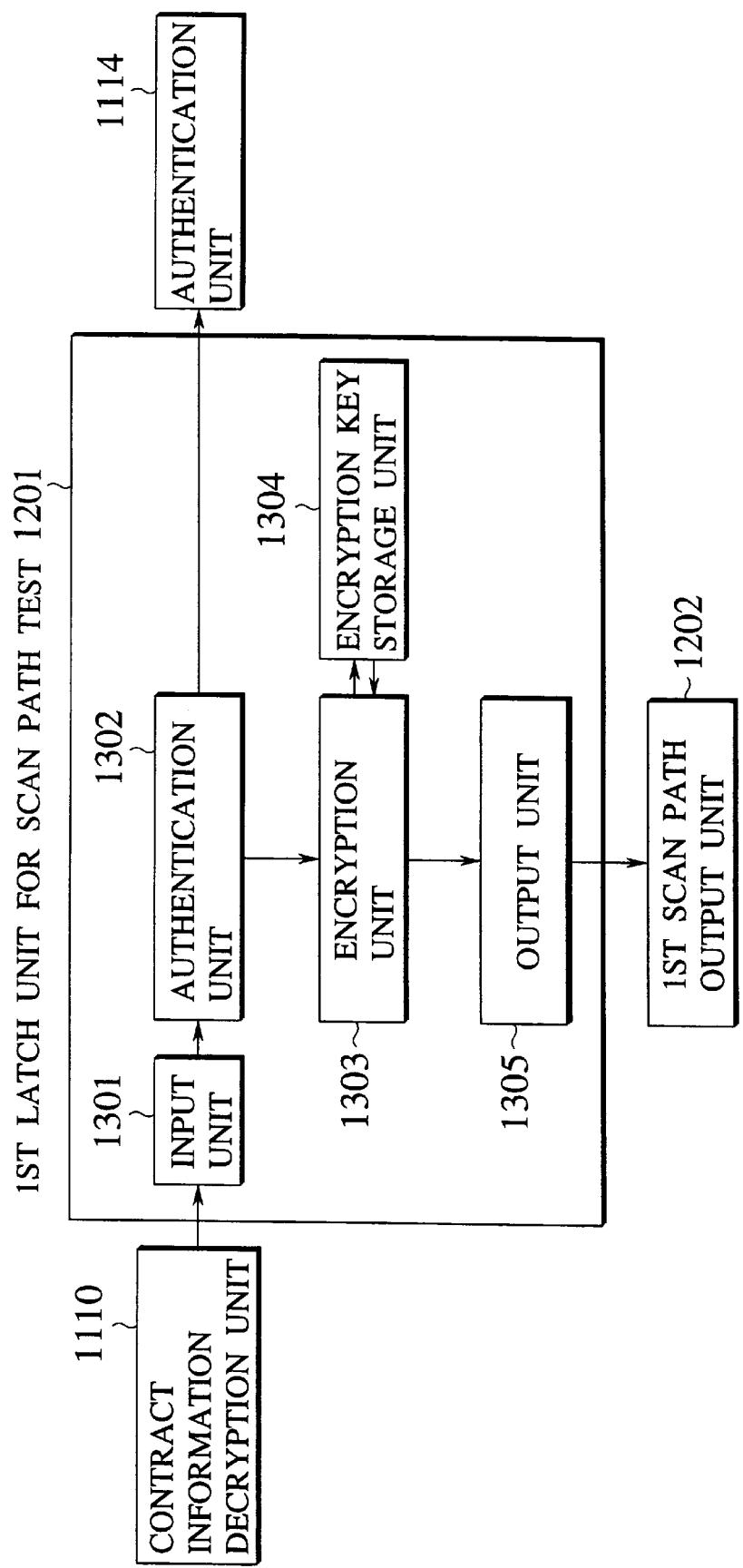
FIG. 66 is a block diagram showing another exemplary configuration of a first latch unit for scan path test in the broadcast reception device of FIG. 61.

FIG. 66 shows an exemplary configuration of such a first latch unit for scan path test 1201. In FIG. 66, it becomes even safer if the public key cryptosystem is introduced into an encryption unit 1303 so as to carry out the encryption using the public key, because the encrypted output data can only be decrypted using the secret key which is not contained in the charging control unit 1106. However, in practice, it is probably more likely to use the secret key cryptosystem from a viewpoint of processing time. In such a case, there is a need to conceal the secret key in an encryption key storage unit 1304, because otherwise the secret key can be revealed and the output content can be revealed by decrypting the encrypted output data by a third person.

(2) Second Latch Unit for Scan Path Test (Test Output of the Reception Device ID):

Next, the second latch unit for scan path test 1203 of FIG. 61 will be described. The operation of the second latch unit for scan path test 1203 is basically the same as that of the first latch unit for scan path test 1201 described above, but in contrast to the first latch unit 1201 in which data simply passes in one direction so to speak, the second latch unit 1203 also carries out the reading of the reception device ID from the reception device ID storage unit 1113 and latches that result so that its configuration is somewhat more complicated.

Figure 67:
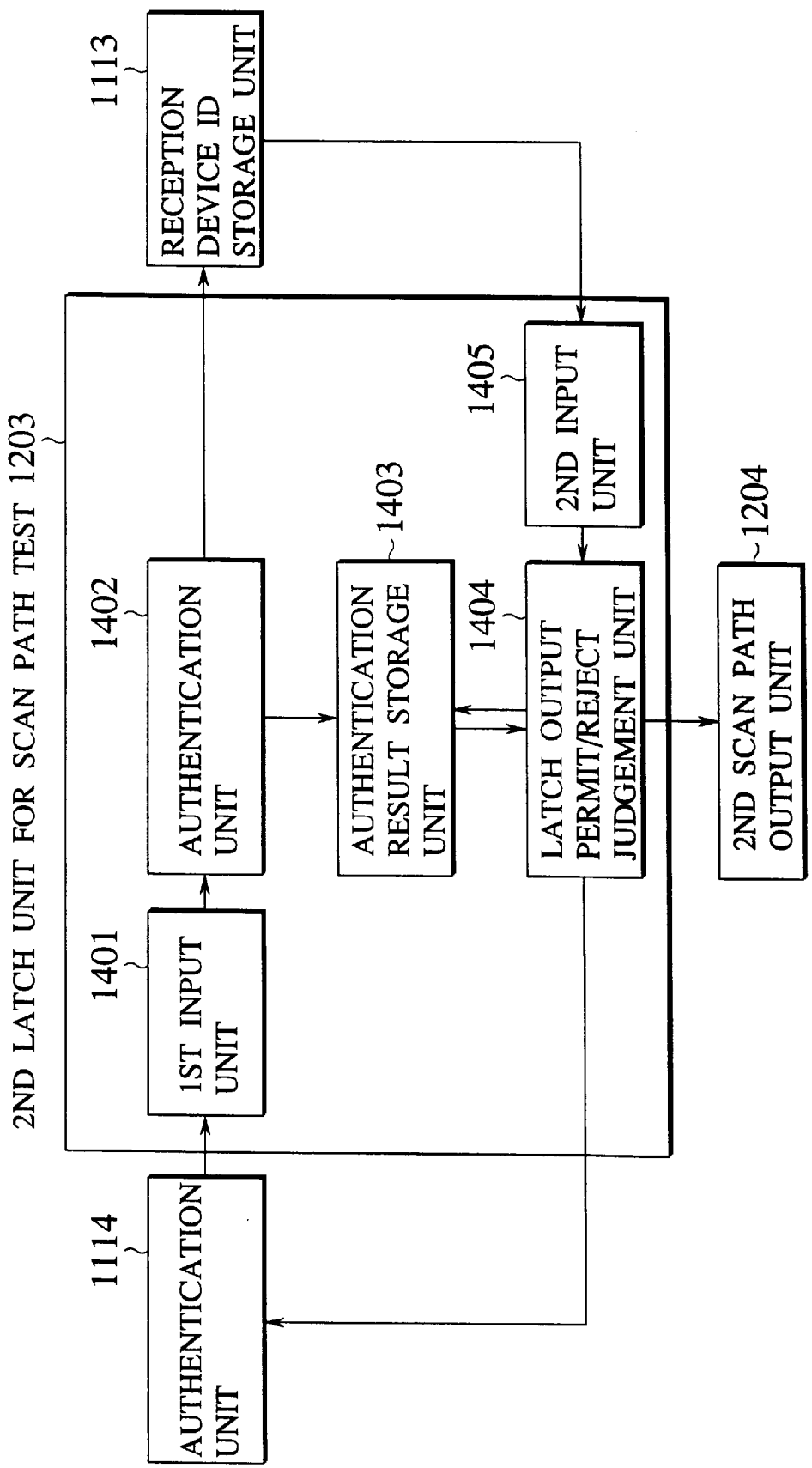
FIG. 67 is a block diagram showing an exemplary configuration of a second latch unit for scan path test in the broadcast reception device of FIG. 61.

This second latch unit 1203 is provided in order to check whether or not the reception device ID is properly stored in the reception device ID storage unit 1113 formed by a non-volatile memory, for example. FIG. 67 shows an exemplary configuration of the second latch unit for scan path test 1203.

The data from the authentication unit 1114 is received at a first input unit 1401 of the second latch unit for scan path test 1203, and sent to an authentication unit 1402. The authentication unit 1402 then carries out the authentication regarding whether the latch output is allowed or not for the input, similarly as the authentication unit 1302 of the first latch unit 1201 described above.

The authentication result is stored in an authentication result storage unit 1403. On the other hand, a command for requesting the output of the reception device ID is sent from the authentication unit 1402 to the reception device ID storage unit 1113. Upon receiving this, the reception device ID storage unit 1113 outputs the reception device ID, and enters it into a second input unit 1405. The reception device ID is then sent to a latch output permit/reject judgement unit 1404, where the authentication result stored in the authentication result storage unit 1403 is referred, and if it is authenticated, the reception device ID is outputted to the second scan path output unit 1204.

Note that the latch output permit/reject judgement unit 1404 outputs the reception device ID received from the reception device ID storage unit 1113 to the external authentication unit 1114 regardless of whether it is authenticated or not at the authentication unit 1402.

By adding the encryption unit 1303 and the encryption key storage unit 1304 as shown in FIG. 66 at a stage subsequent to the latch output permit/reject judgement unit 1404, it also becomes possible to output the reception device ID in an encrypted form similarly as described above.

Figure 81:
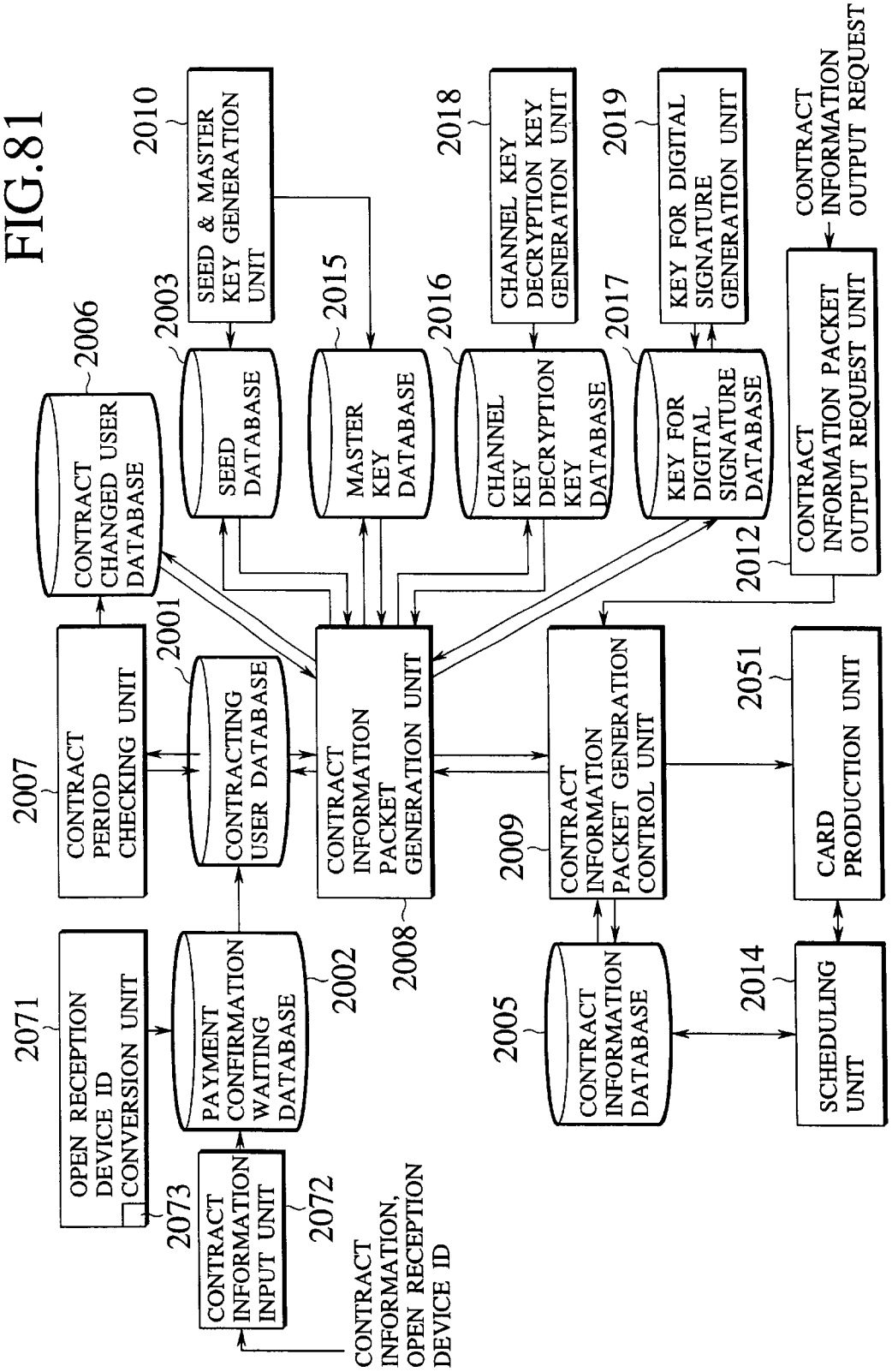
FIG. 81 is a block diagram showing an exemplary configuration of a contract management device according to the sixth embodiment of the present invention.
Figure 82:
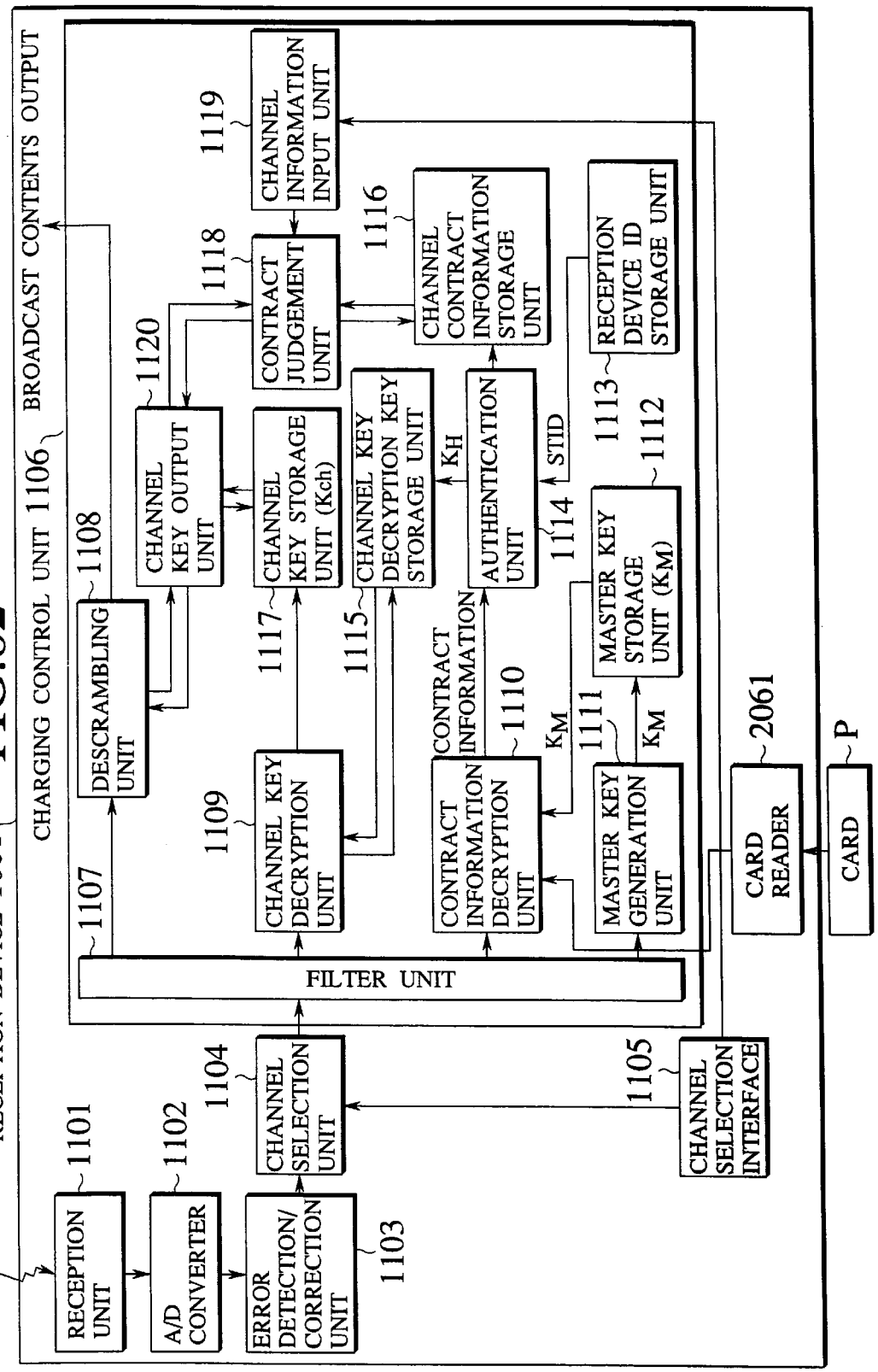
FIG. 82 is a block diagram showing an exemplary configuration of a broadcast reception device according to the sixth embodiment of the present invention.

Referring now to FIG. 81 and FIG. 82, the sixth embodiment of a conditional access broadcast system according to the present invention will be described in detail.

(1) Overview of the Broadcast System:

This sixth embodiment differs from the third to fifth embodiments in that, instead of delivering the reception contract information to the broadcast reception devices by broadcast, the reception contract information is recorded in a portable card shaped recording medium (referred to simply as a card hereafter) P such as a magnetic card for example, and this card P is delivered by the home delivery service or the mail to the user. The contracting user can receive the contracted channels by operating the broadcast reception device to read the information recorded in the received card P.

Here, the contrast management device (see FIG. 81) and the broadcast reception device (see FIG. 82) which correspond to the contract management device (see FIG. 70) and the broadcast reception device (see FIG. 31) of the third embodiment will be described as an example, but this sixth embodiment can be similarly applied to the contract management device and the broadcast reception device of the other embodiments. Namely, in the contract management device according to this sixth embodiment, the broadcast device 2013 of the contract management device of the third to fifth embodiments is replaced by a card production unit 2051, or the card production unit 2051 is added. The card production unit 2051 is made to write the encrypted reception contract information into the card P of the contracting user. Also, in the broadcast reception device according to this sixth embodiment, the encrypted reception contract information read out from the card P inserted into a card reader 2061 is entered into the contract information decryption unit 1110.

(2) Contract Management Device:

FIG. 81 shows an exemplary configuration of the contract management device according to this sixth embodiment, where the elements identical to those in FIG. 70 are given the same reference numerals and their description will be omitted. Namely, in FIG. 81, the broadcast device 13 of FIG. 70 for delivering the reception contract information of each reception device through the terrestrial or satellite broadcast is replaced by a card production unit 2051, or a card production unit 2051 is provided in addition and set to be switchable appropriately according to the need.

The reception contract information according to the contract period of the reception device corresponding to the card P is recorded into that card P by the card production unit 2051 and delivered to the contracting user.

Figure 73:
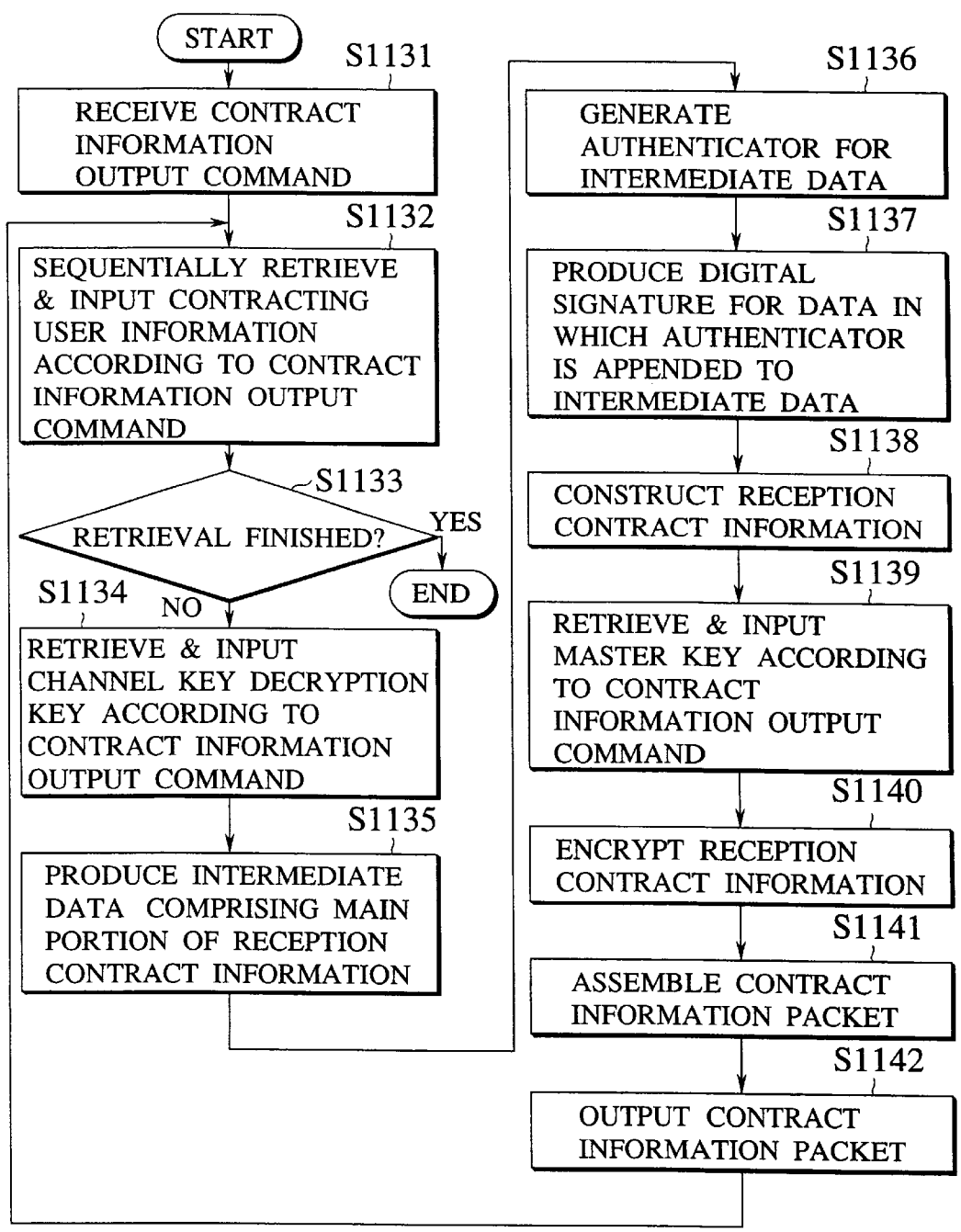
FIG. 73 is a flow chart for a processing in the contract information packet generation unit of FIG. 72.

When the master key is to be updated every month with respect to the contracting users who have the contract for four months from Dec. 1, 1997, for example, it is necessary in the contract management device of FIG. 70 described above to produce the reception contract information every month so that it is necessary to retrieve the valid channel-key decryption key and the valid master key and carry out the processing of the flow chart of FIG. 73 every month. In contrast, in the contract management device of FIG. 81, it suffices to write the reception contract information corresponding to the channel key decryption keys of the contracted channels for coming four months in the card P for example and deliver the card to the user, without using the broadcasting. In this way, it becomes unnecessary to deliver the reception contract information every month so that it is convenient for both the broadcast station side and the user side in a sense that tediousness can be reduced.

Now, in order to produce the reception contract information, it is necessary for the contract management device to know the reception device ID of the broadcast reception device purchased by the contracting user. Of course, this reception device ID is written in the tamper resistant reception device ID storage unit 1113 in each broadcast reception device so that it cannot be read out from the external. Consequently, there is a need to provide a way to input the reception device ID of the broadcast reception device purchased by the contracting user into the contract management device.

To this end, one way of inputting the reception device ID of the purchased broadcast reception device into the contract management device will now be described.

Namely, an open reception device ID (which is an identifier in one-to-one correspondence to the reception device ID and which may be obtained by encrypting the reception device ID itself, for example) of the purchased broadcast reception device is printed on a casing or a package box of that broadcast reception device, for example. Then, as shown in FIG. 81, a contract information input unit 2072 and an open reception device ID conversion unit 2071 are additionally provided in the contract management device.

At a time of making contract, the contract information of the user and the open reception device ID of the broadcast reception device purchased by that user are to be entered at the contract information input unit 2072. For this input, a scanner or the like may be used, for example, but it is not limited to any specific manner.

The open reception device ID conversion unit 2071 stores in advance a conversion table 2073 indicating correspondences between the open reception IDs and the reception device IDs.

The open reception device ID entered at the contract information input unit 2072 is given to the open reception device ID conversion unit 2071, where the open reception device ID is converted into the reception device ID by referring to the conversion table 2073 (that is, by retrieving the reception device ID corresponding to the open reception device ID from the conversion table 2073), and the obtained reception device ID is given to the payment confirmation waiting database 2002.

On the other hand, the contract information entered at the contract information input unit 2072 is given to the payment confirmation waiting database 2002. The payment confirmation waiting database 2002 then registers this contract information in correspondence to the reception device ID received from the open reception device ID conversion unit 2071.

The subsequent operation with respect to the payment confirmation waiting database 2002 is the same as that for the payment confirmation waiting database 2 of FIG. 3.

(3) Reception Device:

FIG. 82 shows an exemplary configuration of the broadcast reception device according to this six embodiment, where the elements identical to those in FIG. 31 are given the same reference numerals and their description will be omitted. Namely, in FIG. 82, the card reader 2061 for reading out the encrypted reception contract information from the card P produced at the contract management device that is provided at the broadcast station side as shown in FIG. 81 is additionally provided, and the encrypted reception contract information read out from the card P at the card reader 2061 is entered into the contract information decryption unit 1110.

The subsequent operation is the same as in the third embodiment described above.

As described above, according to the present invention, it is possible to realize the conditional access while maintaining the same level of safety even when the broadcast bandwidth available to transmission of information related to the conditional access is narrow or when the number of contractors increased beyond the expectation.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A broadcast reception method, comprising:
   storing a master key commonly provided with respect to a plurality of broadcast reception devices and one reception device ID uniquely assigned to said broadcast reception device;
   receiving encrypted contents information delivered from a broadcast station by broadcast;
   decrypting encrypted reception contract information using the master key and the encrypted contents information using a channel key, the encrypted reception contract information being received from the broadcast station and containing at least a contract information for controlling decryption of the encrypted contents information and a reception device ID in correspondence; and
   selectively acquiring one contract information corresponding to a reception device ID that coincides with said one reception device ID, from the encrypted reception contract information that is decrypted, and controlling whether or not to give the channel key to the decrypting operation according to said one contract information.

2. The broadcast reception method of claim 1, wherein the channel key is received from the broadcast station, separately from the reception contract information, and the channel key is not given in the decrypting unless the reception contract information is received.

3. The broadcast reception method of claim 1, wherein an encrypted channel key is received from the broadcast station, separately from the reception contract information, and the encrypted channel key is not decrypted unless the reception contract information containing a channel key decryption key for decrypting the encrypted channel key is received.

4. The broadcast reception method of claim 1, wherein one part of the channel key is received from the broadcast station, separately from the reception contract information, and the channel key is not obtained from said one part unless the reception contract information containing a remaining part of the channel key is received.

5. The broadcast reception method of claim 1, wherein the channel key is contained in the encrypted reception contract information so that the channel key cannot be obtained unless the encrypted reception contract information is received.

6. The broadcast reception method of claim 1, wherein the receiving further receives ordinary broadcast waves containing the encrypted contents information and contract broadcast waves containing the encrypted reception contract information, and the channel key is obtained by decrypting an encrypted channel key contained in the ordinary broadcast waves or the contract broadcast waves using the master key, while the contract information is obtained by decrypting the encrypted reception contract information contained in the contract broadcast waves using the master key.

7. The broadcast reception method of claim 1, wherein the receiving further receives ordinary broadcast waves containing the encrypted contents information and contract broadcast waves containing the encrypted reception contract information which contains a channel key decryption key for decrypting an encrypted channel key, and the channel key decryption key and the contract information are obtained by decrypting the encrypted reception contract information contained in the contract broadcast waves using the master key, while the channel key is obtained by decrypting the encrypted channel key contained in the ordinary broadcast waves or the contract broadcast waves using the channel key decryption key.

8. The broadcast reception method of claim 1, wherein the receiving further receives ordinary broadcast waves containing the encrypted contents information and one part of the channel key and contract broadcast waves containing the encrypted reception contract information which contains a remaining part of the channel key, and the remaining part of the channel key and the contract information are obtained by decrypting the encrypted reception contract information contained in the contract broadcast waves using the master key, while the channel key is obtained from said one part of the channel key contained in the ordinary broadcast waves and the remaining part of the channel key.

9. The broadcast reception method of claim 1, wherein the receiving further receives ordinary broadcast waves containing the encrypted contents information and contract broadcast waves containing the encrypted reception contract information which contains the channel key, and the channel key and the contract information are obtained by decrypting the encrypted reception contract information contained in the contract broadcast waves using the master key.

10. The broadcast reception method of claim 1, wherein the receiving further receives data in which an authenticator is attached to each information element which is necessary in decrypting the encrypted contents information and for which an accuracy of content is required, and further comprising:

authenticating each information element using a corresponding authenticator and invalidating each information element for which authentication fails.

11. The broadcast reception method of claim 1, further comprising:

verifying a digital signature contained in the encrypted reception contract information, and accepting the contract information contained in the encrypted reception contract information which has the digital signature that is verified as proper.

12. The broadcast reception method of claim 1, further comprising:

controlling whether or not to permit test output of internal data, either by checking an identifier indicating a test encrypted reception contract information that is attached to the encrypted reception contract information, or by verifying a digital signature attached to the encrypted reception contract information.

13. The broadcast reception method claim 1, further comprising:

reading the encrypted reception contract information from a card shaped recording medium recording the encrypted reception contract information.

14. The broadcast reception method of claim 1, further comprising:

changing a type of processing to be applied to the encrypted reception contract information according to an identifier indicating a type of information which is contained in the encrypted reception contract information.

15. The broadcast reception device of claim 1, wherein the storing, the decrypting, and the selectively acquiring are performed within a single chip.

16. A contract management method, comprising:

managing contract information for controlling decryption of encrypted contents information delivered from a broadcast station by broadcast, with respect to a plurality of broadcast reception devices each of which decrypts the encrypted contents information according to the contract information; and delivering to said plurality of broadcast reception devices a reception contract information containing at least the contract information and a reception device ID in correspondence, the reception device ID being uniquely assigned to each broadcast reception device, by encrypting the reception contract information using a master key which is commonly provided with respect to said plurality of broadcast reception devices.

17. The contract management method of claim 16, wherein each broadcast reception device is controlled such that a channel key for decrypting the encrypted contents information is not given to a decryption unit for decrypting the encrypted contents information unless the contract information for own broadcast reception device is received, and further comprising delivering the channel key to said plurality of broadcast reception devices, separately from the reception contract information.

18. The contract management method of claim 16, wherein each broadcast reception device is controlled such that an encrypted channel key for decrypting the encrypted contents information is not decrypted unless the contract information for own broadcast reception device is received, and further comprising delivering the reception contract information which also contains a channel key decryption key for decrypting the encrypted channel key.

19. The contract management method of claim 16, wherein each broadcast reception device is controlled such that a channel key for decrypting the encrypted contents information is not obtained unless the contract information for own broadcast reception device is received, and further comprising delivering the reception contract information which also contains one part of the channel key and delivering a remaining part of the channel key to said plurality of broadcast reception devices, separately from the reception contract information.

20. The contract management method of claim 16, wherein each broadcast reception device is controlled such that a channel key for decrypting the encrypted contents information is not obtained unless the contract information for own broadcast reception device is received, and further comprising delivering the reception contract information which also contains the channel key.

21. The contract management method of claim 16, further comprising delivering the reception contract information by recording an encrypted reception contract information in a card shaped recording medium and delivering the card shaped recording medium to each broadcast reception device.

22. The contract management method of claim 16, further comprising selectively delivering the reception contract information of those broadcast reception devices for which the contract information has been changed.

23. The contract management device of claim 16, further comprising changing a form by which the reception contract information is delivered, depending on a number of broadcast reception devices to which the reception contract information is to be delivered.

* * * * *